US012013382B2

(12) United States Patent
Wirth et al.

(10) Patent No.: US 12,013,382 B2
(45) Date of Patent: Jun. 18, 2024

(54) COMPACT AND MODULAR CAPILLARY LIQUID CHROMATOGRAPHY SYSTEM

(71) Applicant: Trajan Scientific Australia Pty Ltd, Victoria (AU)

(72) Inventors: Hans-Jürgen Wirth, Ruppach-Goldhausen (DE); Boy Midas H. Firme, Victoria (AU); Lewellwyn Joseph Coates, Victoria (AU); Shing Chung Lam, Victoria (AU); Andrew Arthur Gooley, Victoria (AU)

(73) Assignee: Trajan Scientific Australia Pty Ltd, Victoria (AU)

( * ) Notice: Subject to any disclaimer, the term of this patent is extended or adjusted under 35 U.S.C. 154(b) by 0 days.

(21) Appl. No.: 18/211,179

(22) Filed: Jun. 16, 2023

(65) Prior Publication Data

US 2023/0408465 A1 Dec. 21, 2023

(30) Foreign Application Priority Data

Jun. 17, 2022 (AU) ................. 2022901656

(51) Int. Cl.
*G01N 30/74* (2006.01)
*B01D 15/14* (2006.01)
(Continued)

(52) U.S. Cl.
CPC ............. *G01N 30/74* (2013.01); *B01D 15/14* (2013.01); *B01D 15/163* (2013.01); *G01N 30/20* (2013.01);
(Continued)

(58) Field of Classification Search
None
See application file for complete search history.

(56) References Cited

U.S. PATENT DOCUMENTS 9,163,618 B2 * 10/2015 Wikfors ................. G01N 30/32
10,900,938 B2   1/2021 Iovanni et al.
(Continued)

FOREIGN PATENT DOCUMENTS

CN       100371710 C    2/2008
CN       104833741 B    8/2016
(Continued)

OTHER PUBLICATIONS

International Search Report and Written Opinion received in International Application No. PCT/AU2023/050537, mailed Sep. 27, 2023, in 22 pages.
(Continued)

*Primary Examiner* — Kristina M Deherrera
*Assistant Examiner* — Gedeon M Kidanu
(74) *Attorney, Agent, or Firm* — Procopio, Cory, Hargreaves & Savitch LLP

(57) ABSTRACT

A reconfigurable capillary liquid chromatography system includes a solvent delivery manager including a first solvent pump assembly including a first pump housing or mount. A base module is further provided including a base module housing which is user accessible, or a base module bracket, and an injection valve for sample injection to a liquid chromatography column. The injection valve has an inlet port for receiving a sample and the injection valve is mounted in or on the base module housing or the base module bracket. The solvent delivery manager is configured to deliver solvent to the injection valve. A reconfigurable control system is also provided for controlling the reconfigurable capillary liquid chromatography system. The system is selectively user configurable to removably add any one or more additional components to the system such that the base module including the base module housing or bracket, the first pump housing or mount, and the user selected additional (Continued)

components fit within a predetermined system envelope, the additional components including any one or more of the following; a second solvent pump assembly having a second pump housing or mount, such that the selected second pump assembly is removably mountable on or within the base module housing or bracket for incorporation within the solvent delivery manager; a third pump assembly for a sample delivery module, the third pump assembly having a third pump housing or mount, such that the selected third pump assembly is removably mountable on or within the base module housing or bracket; a sample delivery module which is adapted for fluidic connection to the injection valve, wherein the selected sample delivery module is removably mountable on or within the base module housing or bracket; and an optical detector module having a detector housing or mount, such that the selected optical detector housing or mount is removably mountable on or within the base module housing or bracket. The control system is reconfigurable according to the user selected additional components.

9 Claims, 38 Drawing Sheets

(51) Int. Cl.
  *B01D 15/16* (2006.01)
  *G01N 30/02* (2006.01)
  *G01N 30/20* (2006.01)
  *G01N 30/32* (2006.01)

(52) U.S. Cl.
  CPC ....... *G01N 30/32* (2013.01); *G01N 2030/027* (2013.01); *G01N 2030/326* (2013.01)

(56) References Cited

U.S. PATENT DOCUMENTS

| | | | |
|---|---|---|---|
| 11,143,639 | B2 | 10/2021 | Xie et al. |
| 2005/0214130 | A1* | 9/2005 | Yang ................ F04B 13/00 417/415 |
| 2009/0205409 | A1* | 8/2009 | Ciavarini ............ G05D 11/132 73/61.56 |
| 2013/0048095 | A1* | 2/2013 | Wikfors .............. F04B 23/06 137/7 |
| 2014/0104605 | A1 | 4/2014 | Hanlon et al. |
| 2015/0047422 | A1* | 2/2015 | Berg .................. G01N 30/16 73/61.56 |
| 2018/0052140 | A1* | 2/2018 | Yokoi ............. G01N 35/00871 |
| 2019/0017872 | A1 | 1/2019 | Brunson et al. |

FOREIGN PATENT DOCUMENTS

| | | |
|---|---|---|
| EP | 2 124 036 A1 | 11/2009 |
| WO | 2006/052644 A2 | 5/2006 |

OTHER PUBLICATIONS

Alltesta Brochure, "Innovative Yet Intuitive HPLC", Novel Analytical Chromatographic System, SIELC, date unknown, https://sielc.com/product/alltesta-gradient-automated-analyzer, in 16 pages.
Axcend Focus LC®, "High-Performance Liquid Chromatography (HLPC)", https://axcendcorp.com/axcend-focus, printed Sep. 1, 2023, in 11 pages.
Chatzimichail, Stelios, et al., "Hand-portable HPLC with broadband spectral detection enables analysis of complex polycyclic aromatic hydrocarbon mixtures", Communications Chemistry, (2021)4:17, https://doi.org/10.1038/s42004-021-00457-7 | www.nature.com/commschem, in 15 pages.
Hemida, Mohamed, et al., "Miniature Multiwavelength Deep UV-LED-Based Absorption Detection System for Capillary LC." Analytical Chemistry 92.20 (2020): 13688-13693, in 6 pages.
Hemida, Mohamed, et al., "Small-Footprint, Field-Deployable LC/MS System for On-site Analysis of Per, and Polyfluoroalkyl Substances in Soil.", Analytical Chemistry 93.35 (2021): 12032-12040, in 9 pages.
Hemida, Mohamed, et al., "Small footprint liquid chromatography-mass spectrometry for pharmaceutical reaction monitoring and automated process analysis", Journal of Chromatography A, vol. 1656, Oct. 25, 2021, in 10 pages.
International-type Search Report received from the Australian Patent Office in related Application No. 2022901656, dated Mar. 20, 2023, in 12 pages.
Lam, Shing Chung, et al., "Miniature and Fully Portable Gradient Capillary Liquid Chromatography", Analytica Chimica Acta, vol. 1101, Mar. 8, 2020, 199-210, in 12 pages.
Lucidity miniGC brochure, Gas Chromatograph, Jul. 2021, https://luciditysystems.com/products/gc-fid/, in 12 pages.
Qiang, Fu, et al., "Development of Portable Micro Liquid Chromatography", Chinese Journal of Chromatography 39.9 (2021): 1030-1037 (including a machine translation in English), in 15 pages.
Trajan Scientific and Medical, "MAST—Modular Analytical Separation Technology", Hummingbird prototype Presented at HPLC 2019 in Milan, TP-0240-G_A0_Portrait © Trajan Scientific Australia Pty Ltd Jun. 2019, www.trajanscimed.com, https://cdn.shopify.com/s/files/1/0767/9441/files/TP-0240-G.pdf?72, in 1 page.
Waters Corporation, "PATROL UPLC Process Analysis System, Take Control of Your Bottom Lin with Real-Time LC", https://www.waters.com/nextgen/au/en/products/chromatography/chromatography-systems/patrol-uplc-process-analysis-system.html, (2023), in 11 pages.
Bio-Rad Laboratories, Inc. Bulletin, "NGC™ Chromatography Systems, Comprehensive Solutions for Protein Purification", Bulletin 6286, Rev A, 12-0963, 1212, Sig 1211, Mar. 9, 2013, in 14 pages.
Bio-Rad Laboratories, Inc. Bulletin, "NGC™ Chromatography Systems, Comprehensive Solutions for Protein Purification", Bulletin 6286, Ver F, 17-0695, 0817, Sig 1216, Dec. 8, 2017, in 14 pages.

\* cited by examiner

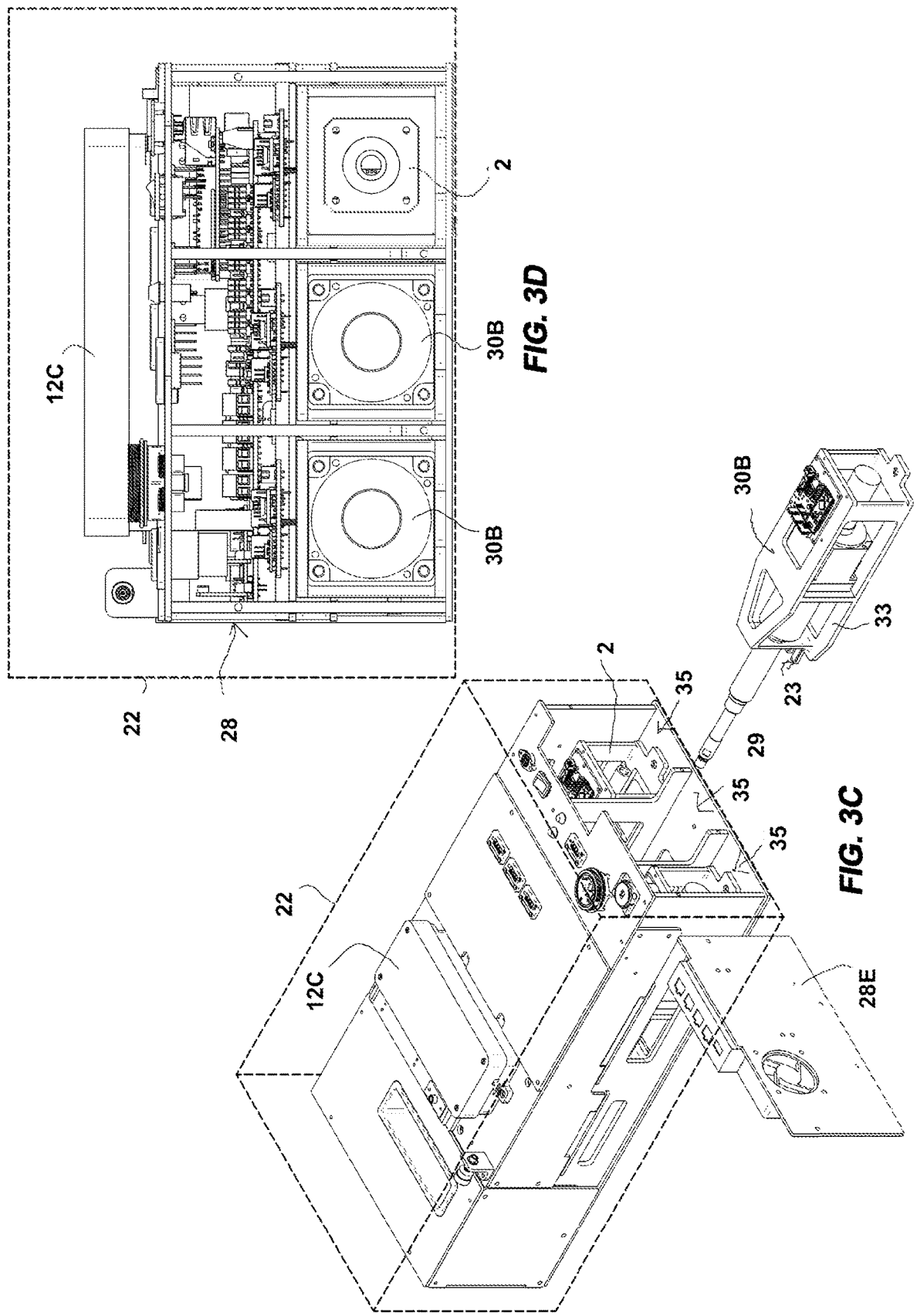

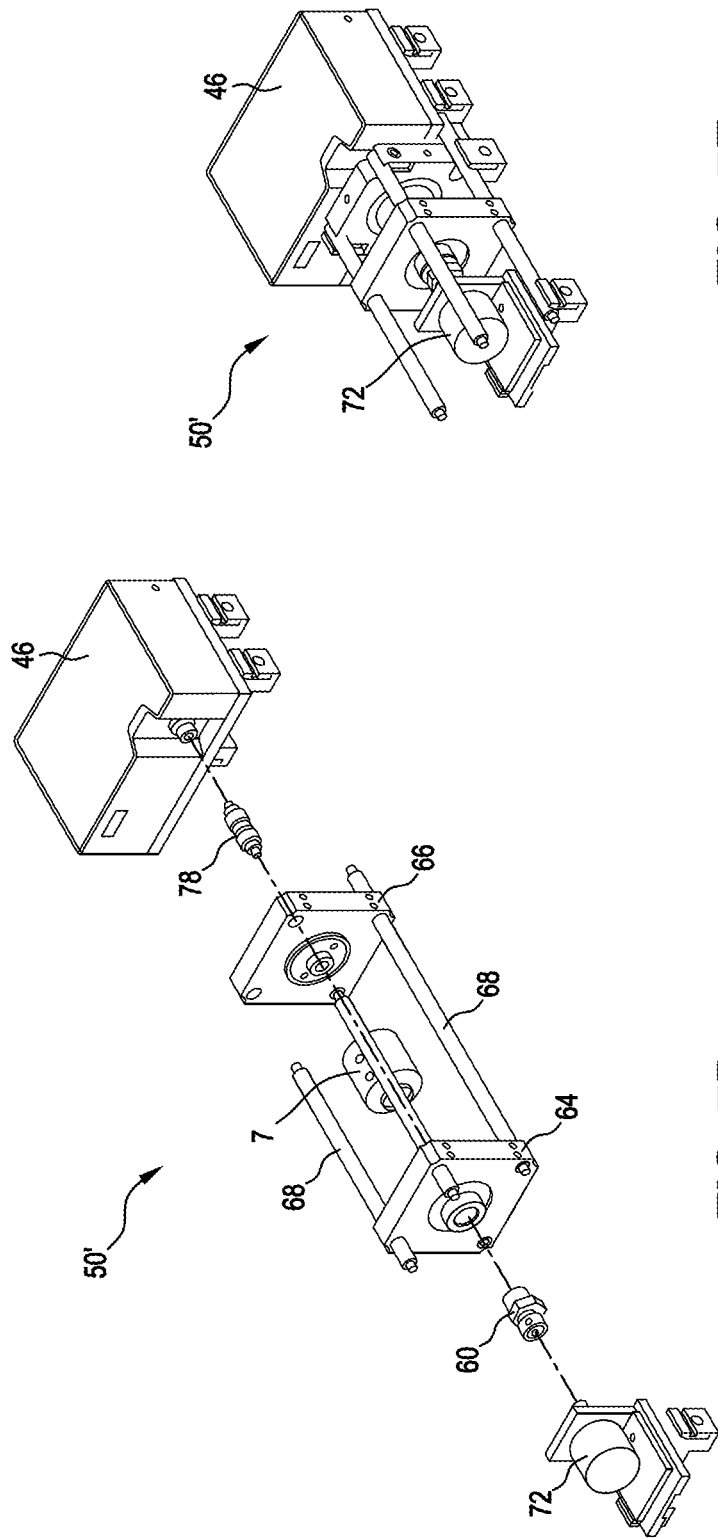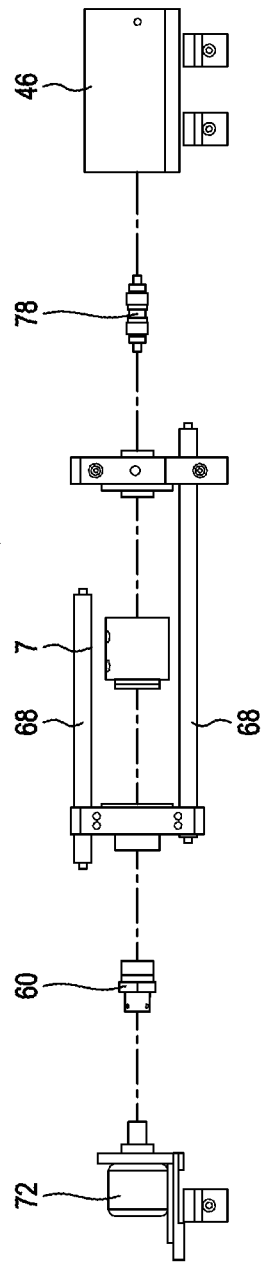

VOLUME ENCLOSURE ENVELOPE

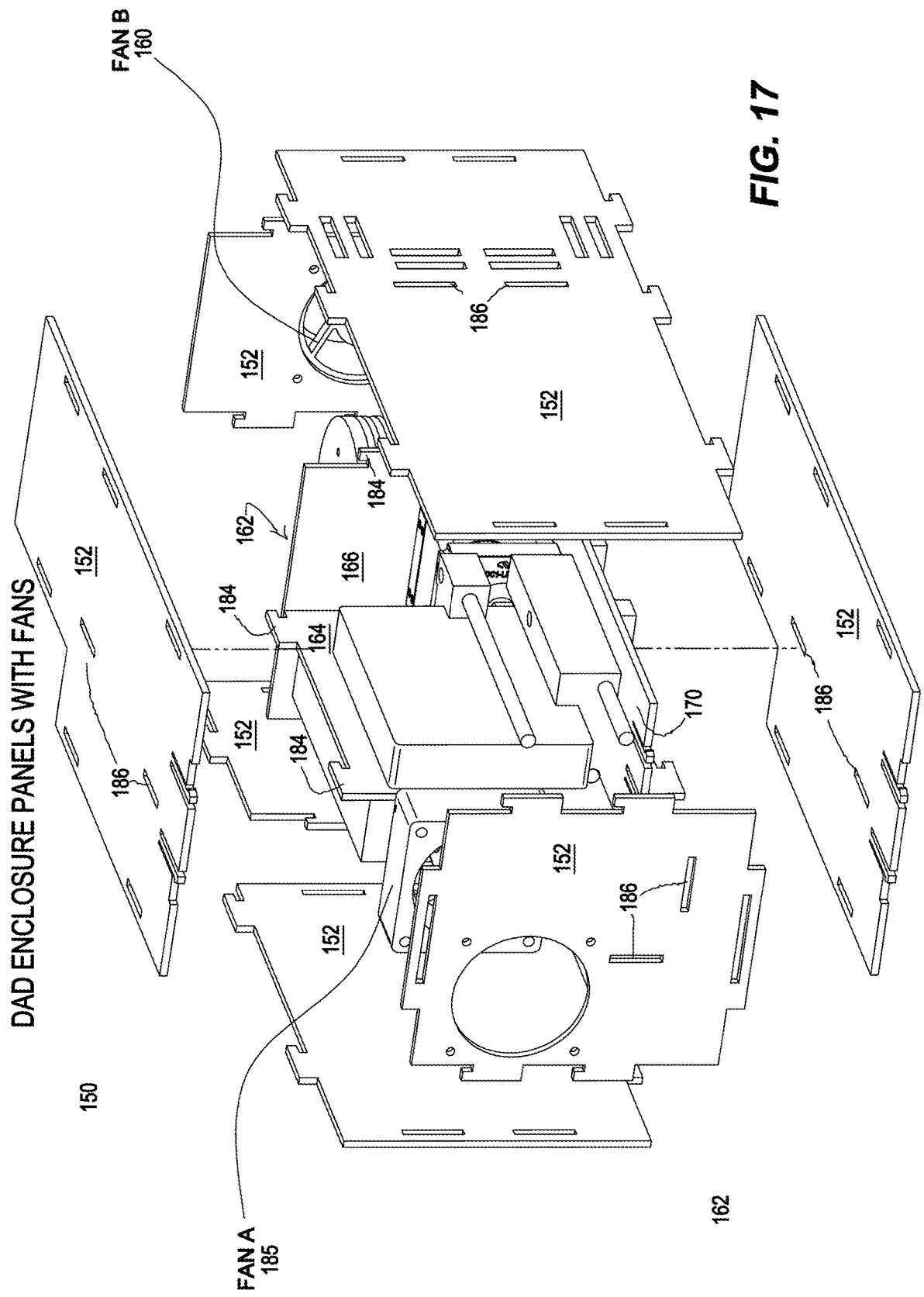

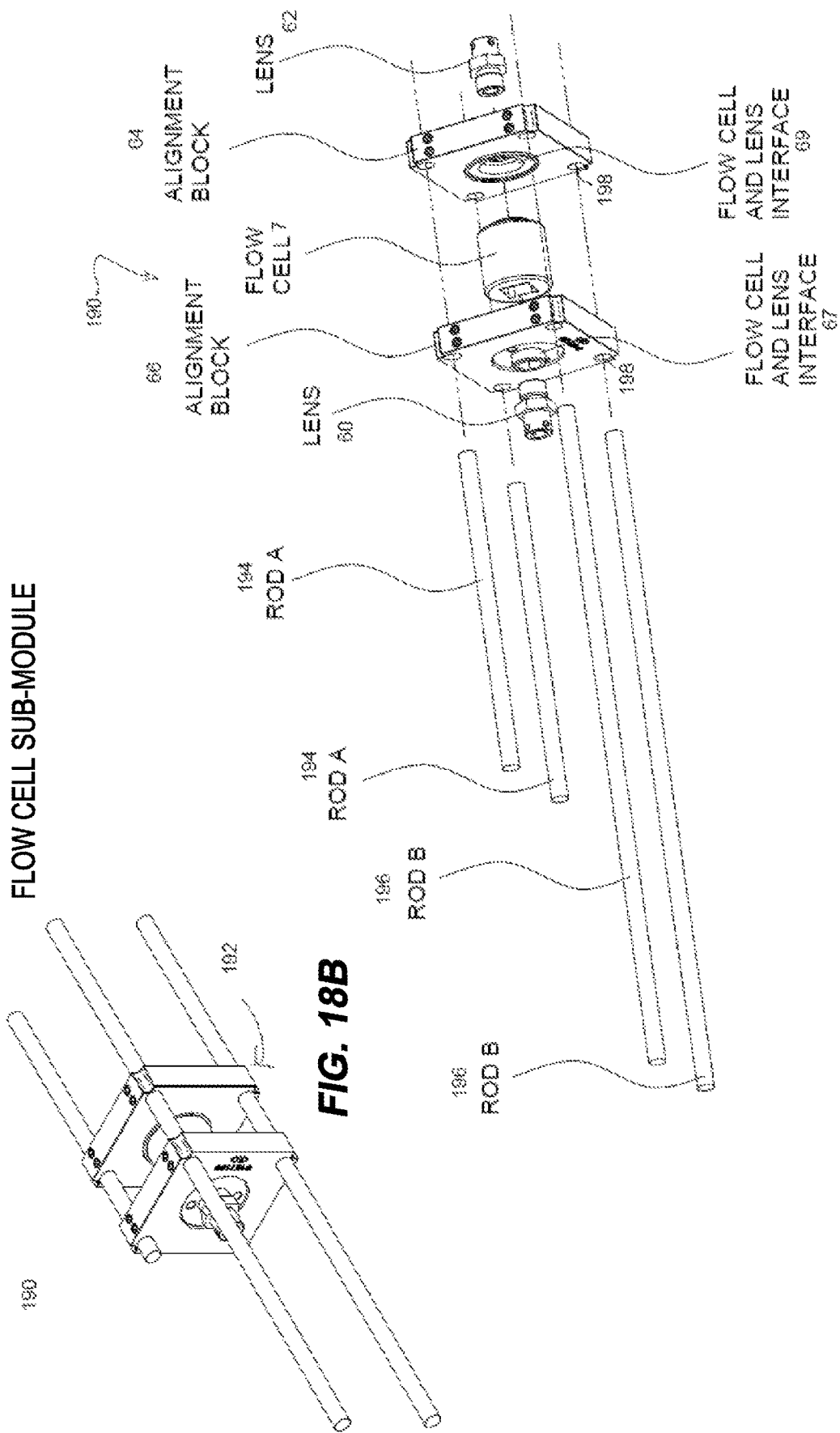

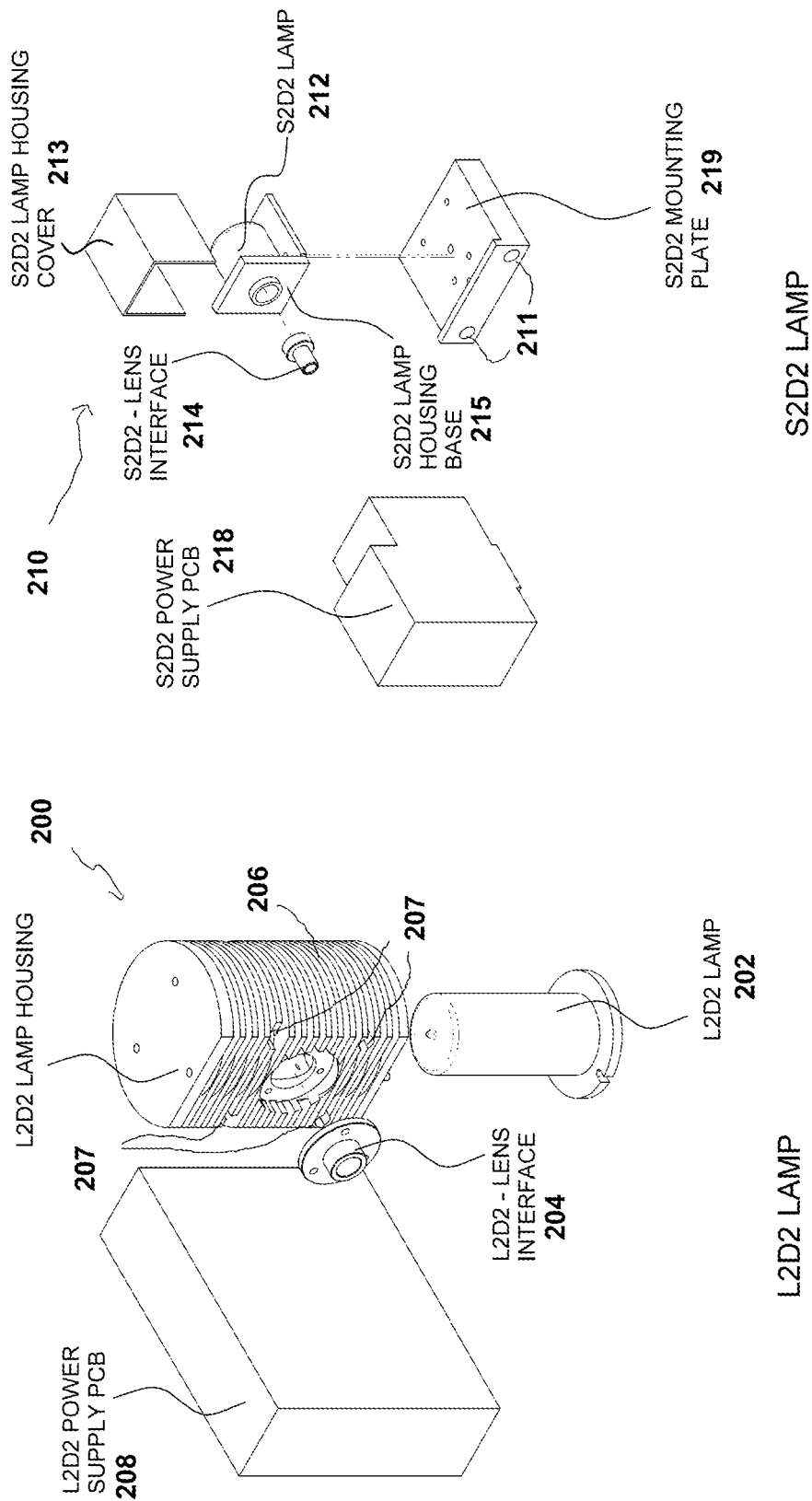

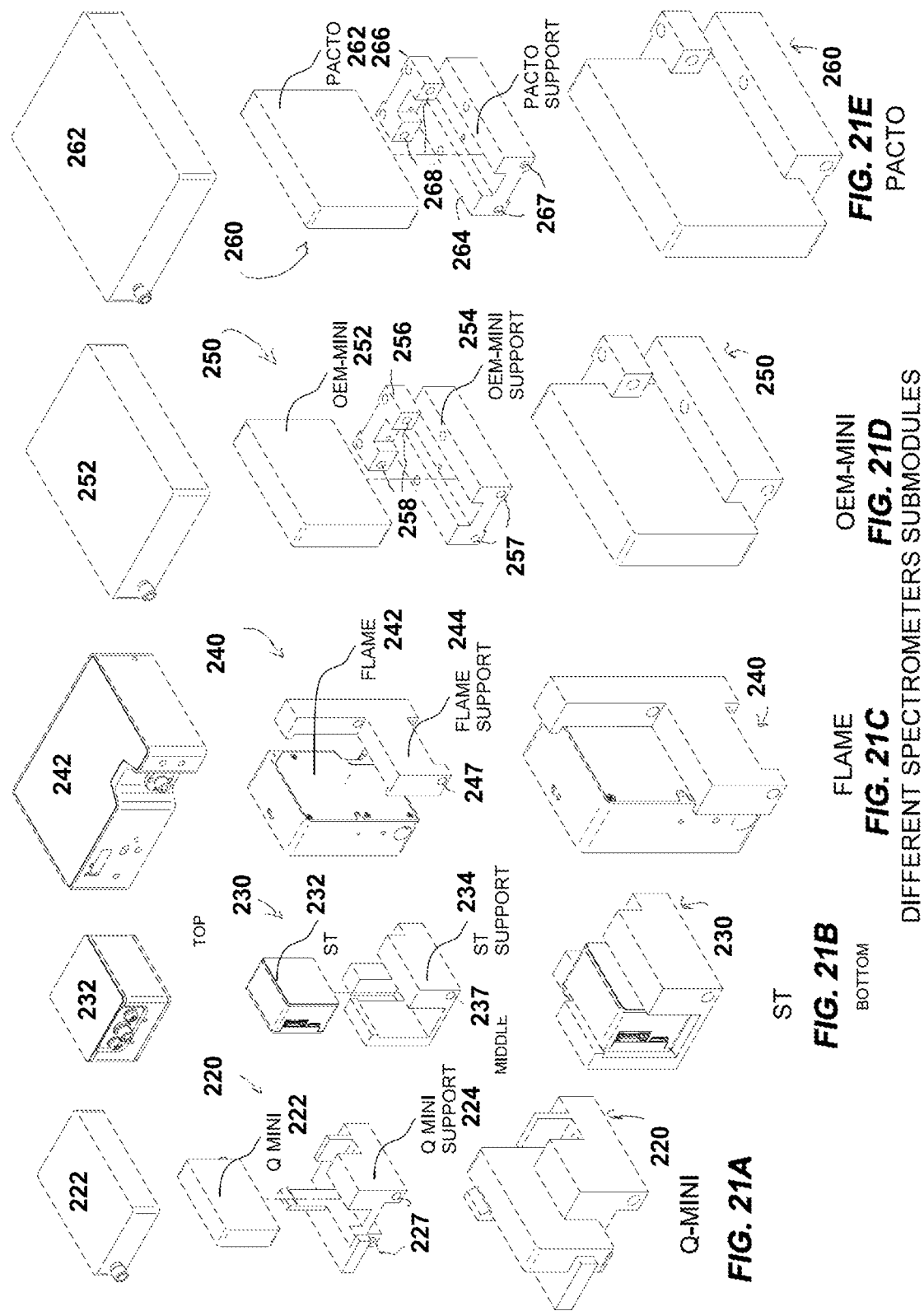

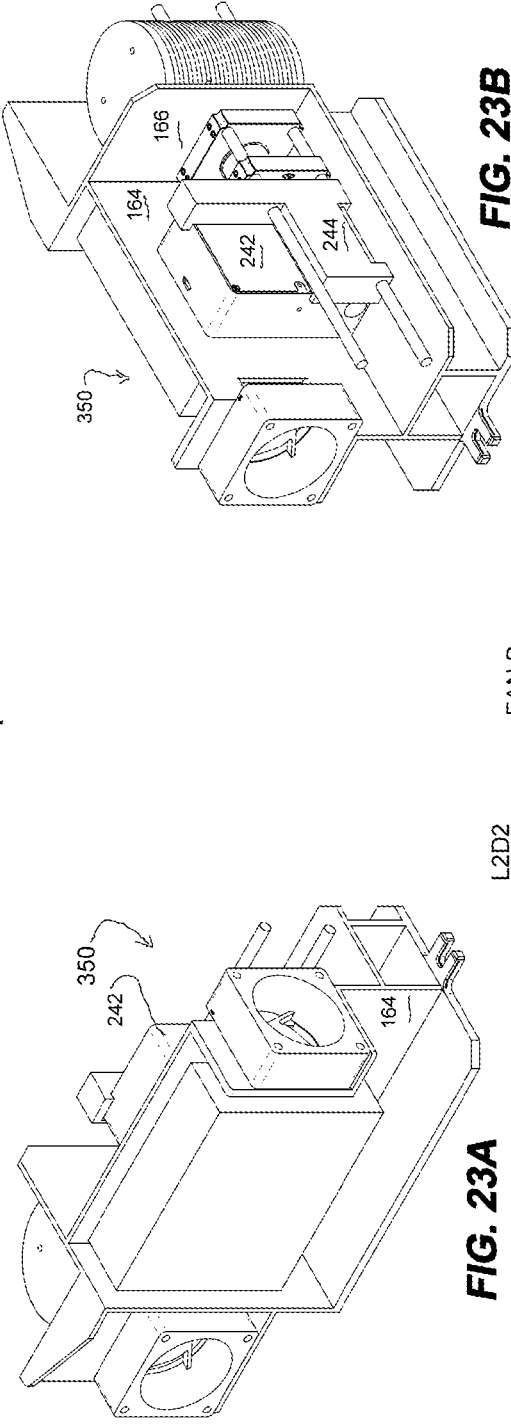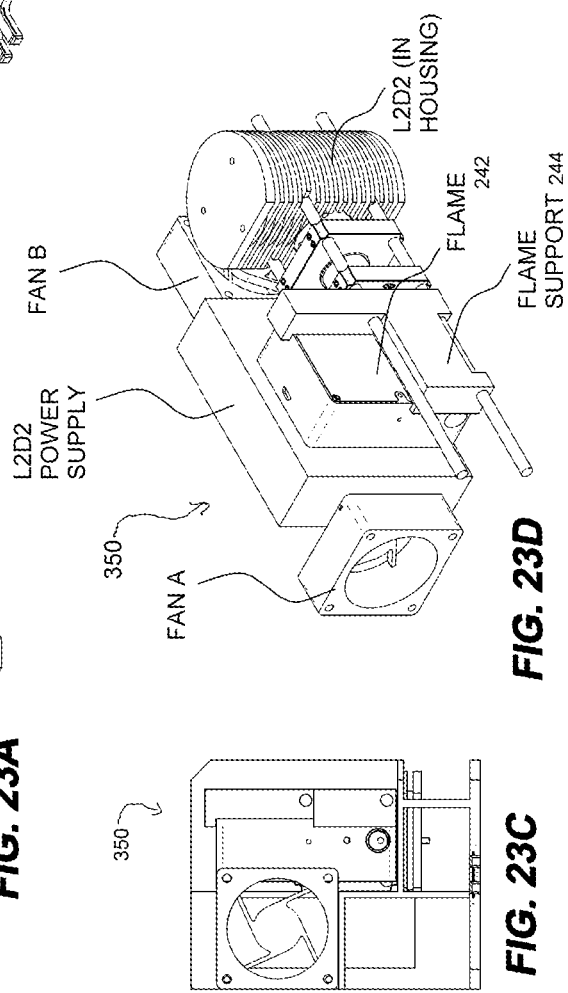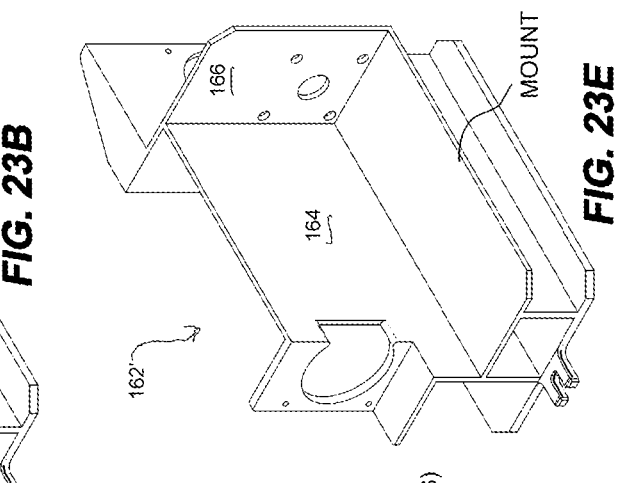

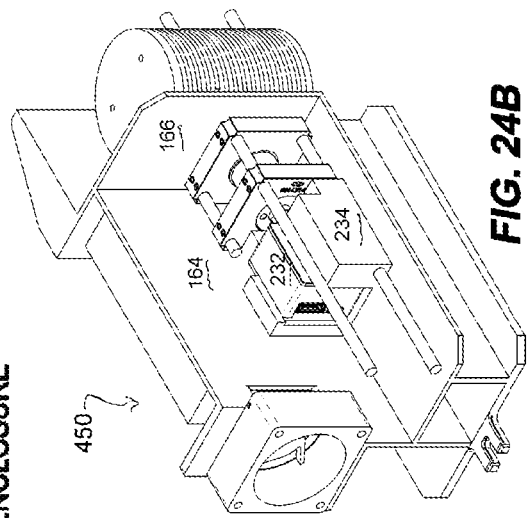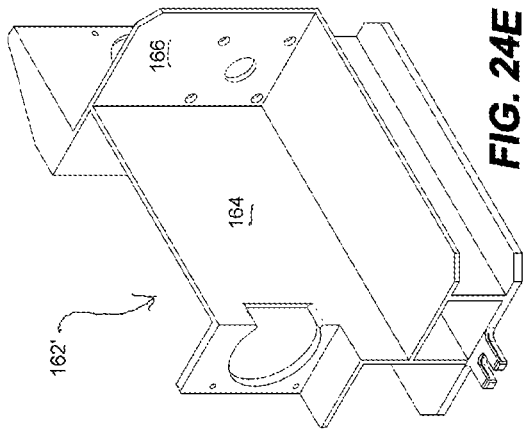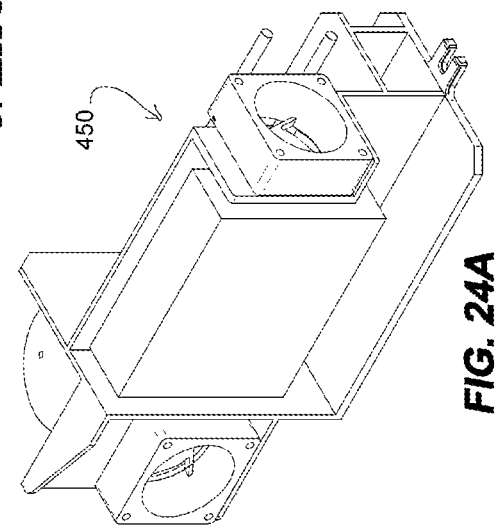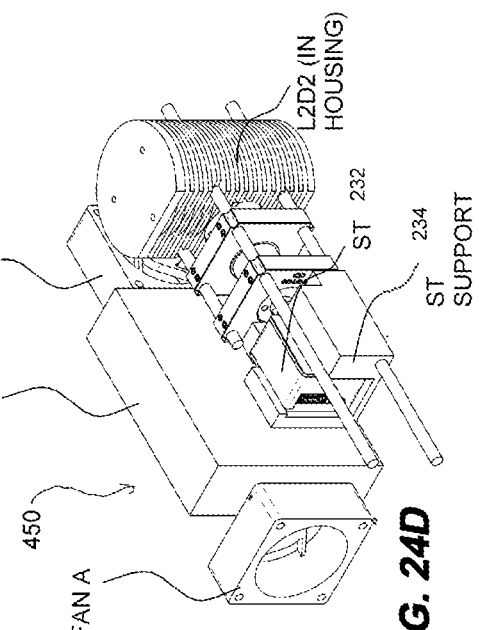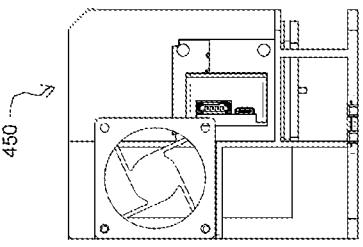

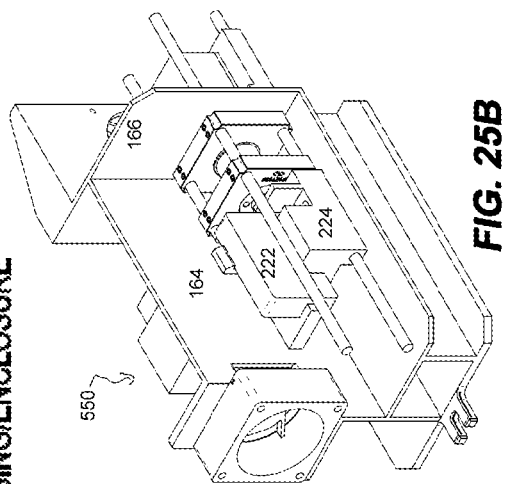
FIG. 25A
FIG. 25B
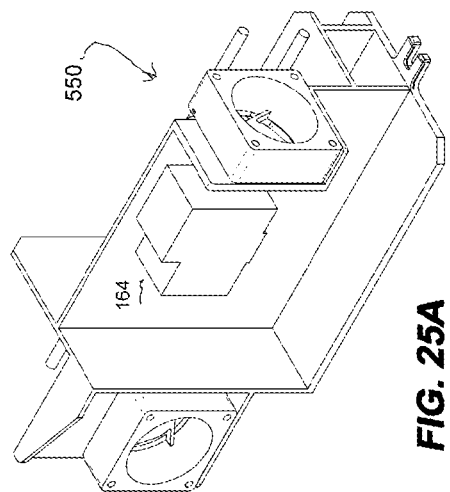
FIG. 25C
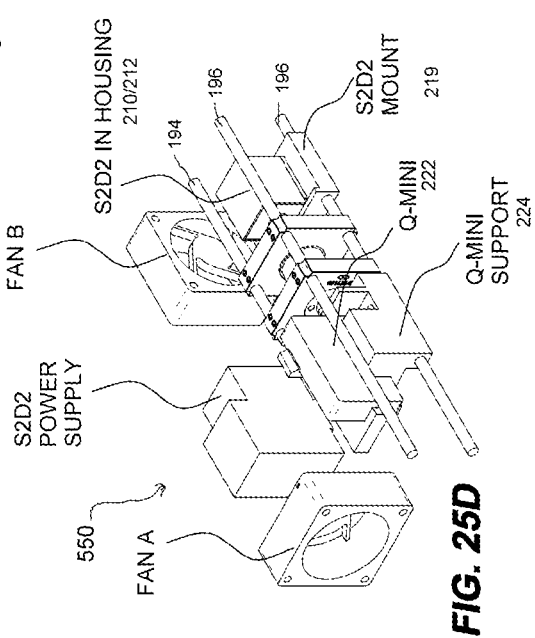
FIG. 25D
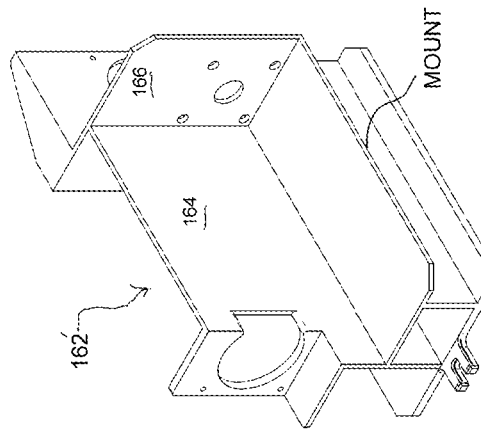
FIG. 25E

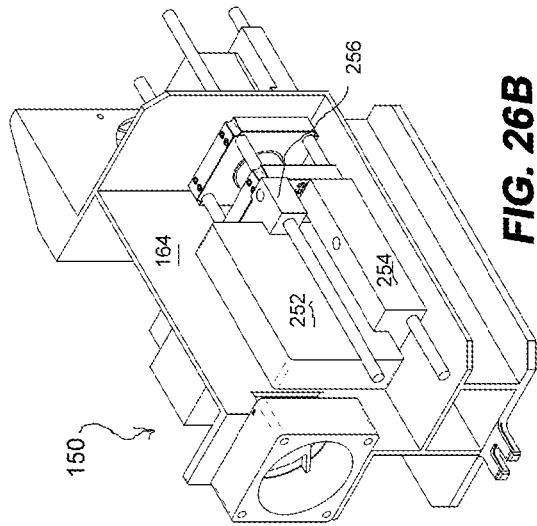
FIG. 26B
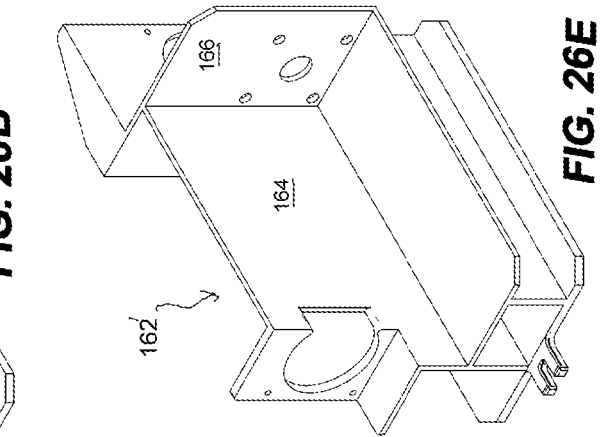
FIG. 26E
OEM MINI - S2D2 ON MOUNT, NOT IN HOUSING/ENCLOSURE
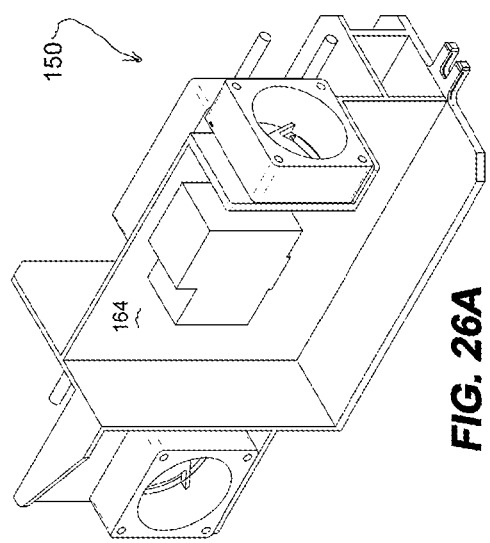
FIG. 26A
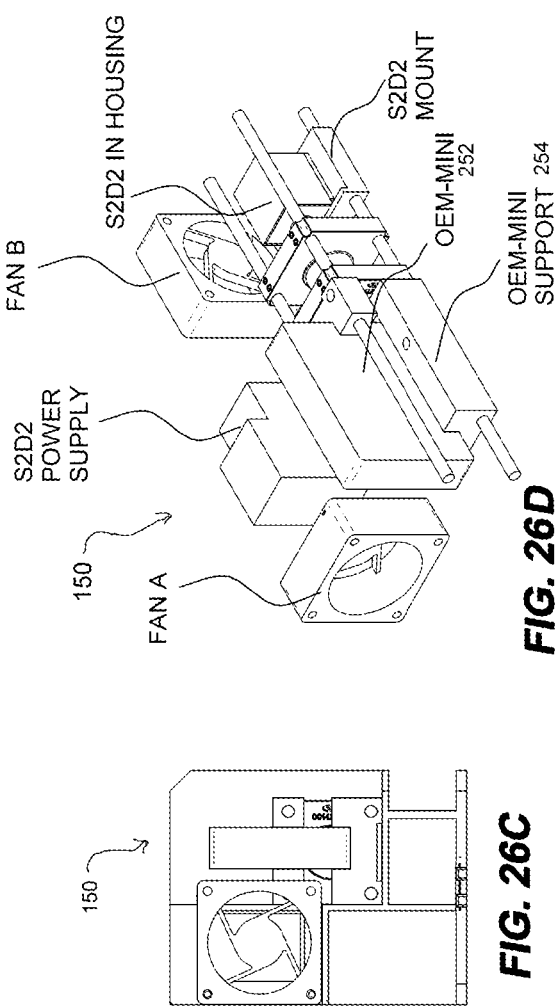
FIG. 26D
FIG. 26C

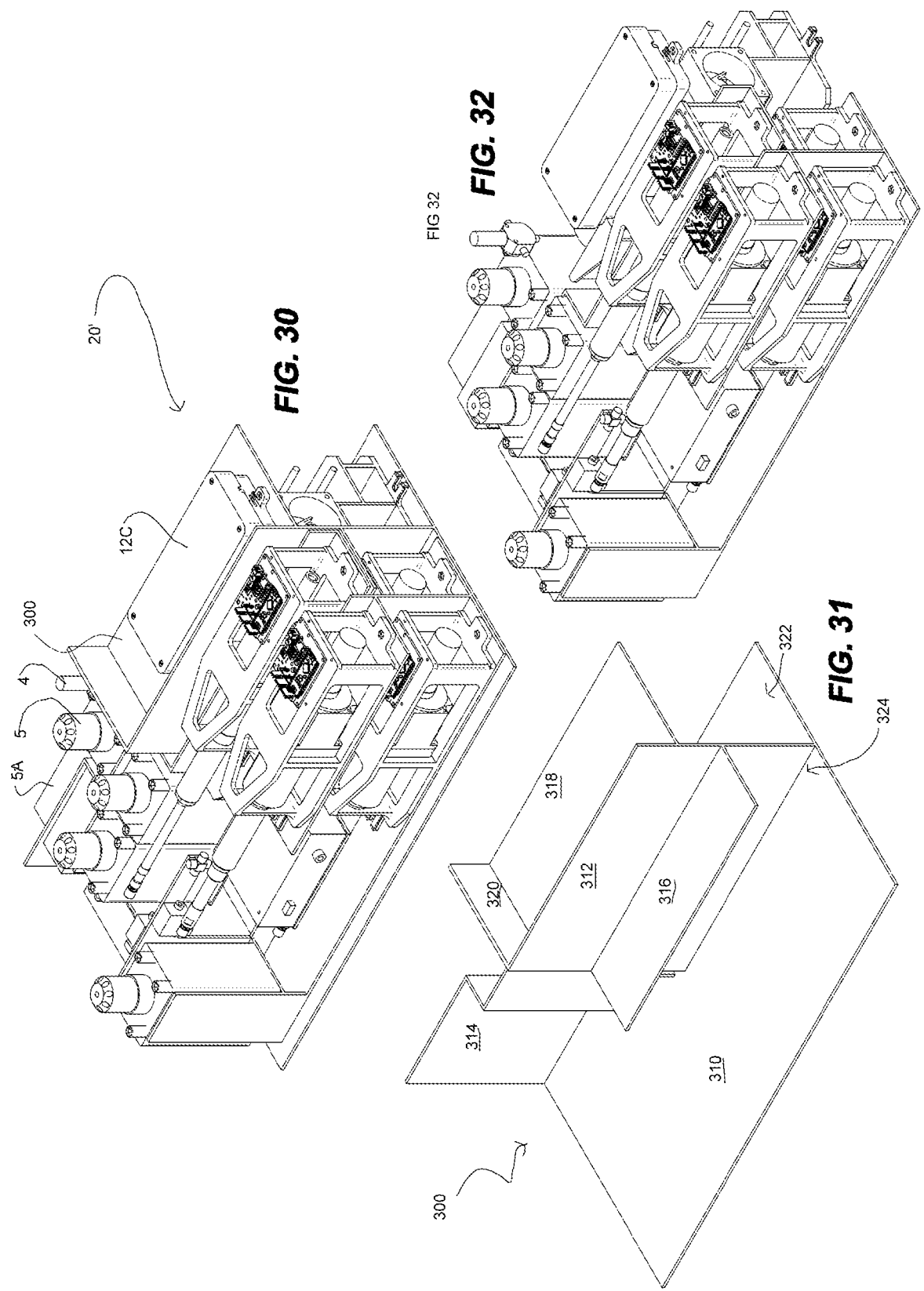

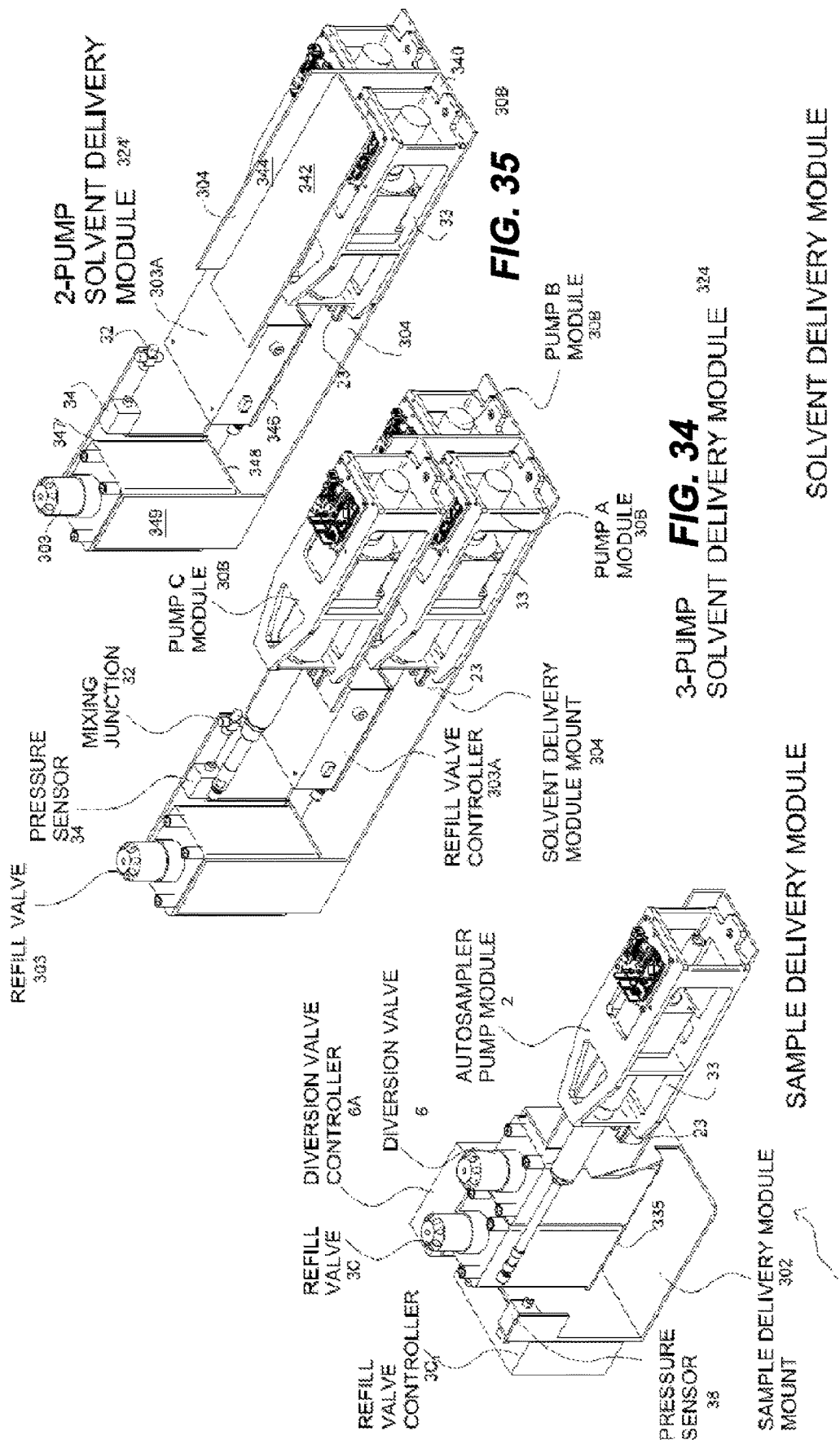

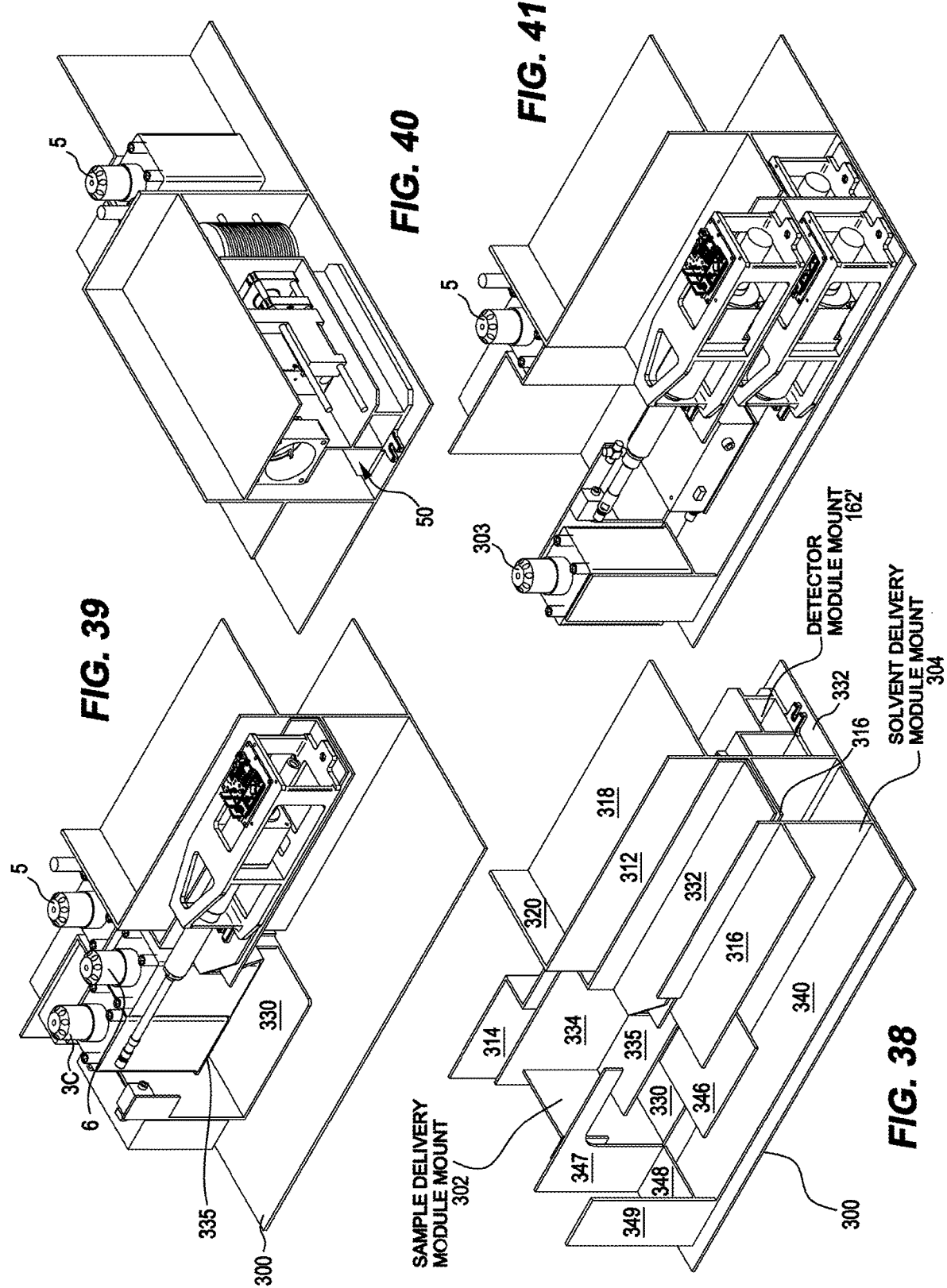

COMPACT AND MODULAR CAPILLARY LIQUID CHROMATOGRAPHY SYSTEM

CROSS-REFERENCE TO RELATED APPLICATIONS

This application claims priority to Australian Patent Application No. 2022901656, filed Jun. 17, 2022, the contents of which are incorporated herein by reference.

FIELD OF THE INVENTION

The present invention relates to liquid chromatography including a liquid chromatography system(s) and methods for configuring or reconfiguring liquid chromatography systems. In particular, although not exclusively, the invention relates to capillary chromatography. The invention also relates to an optical detector module for liquid chromatography including method(s) for configuring or reconfiguring an optical detector module in a liquid chromatography system. While the invention is described in connection with the pharmaceutical industry, the invention is not limited thereto. For example, another field of application includes environmental monitoring of soil and water, for persistent pollutants, just to name one other application. However there are many more.

BACKGROUND OF THE INVENTION

A need in the pharmaceutical industry is "reaction monitoring" which is the measurement of the active pharmaceutical ingredient (API) and the separation of that API from its impurities beside the reactor. The purpose of reaction monitoring is to ensure that the reaction substrates are exhausted, leaving minimally acceptable impurities.

Typically, the pharmaceutical company's research and development department validates that a particular monitoring system, such as a liquid chromatography system, is suitable for reaction monitoring. Once a particular system is approved and found suitable for monitoring a particular reaction then that system (and method) may be implemented globally at the pharmaceutical company's various production sites.

One of the problems with existing monitoring systems is firstly the complexity-laboratories today, from the pharmaceutical industry to the environmental testing industry, have invested heavily in sophisticated analytical instrumentation. That equipment requires specialized operators and often each instrument is put to a dedicated use only utilizing a fraction of its total capability. The investment and need for operator expertise often results in a centralized laboratory environment. That means that samples must be brought to the laboratory from their source and await their scheduling for instrument time.

In many cases, a minimally viable separation may be all that is necessary for the process chemist to study the reaction time course and confirm the purity of the API. However, there is no significant difference in the percent coefficient of variance between minimally viable separation and high-end separation i.e. the tabulated data is the same, although the peaks are more defined in high-end separation. Complexity also adds to space requirements. In other words, the more complex a system is, with an ability to perform a wide variety of tasks, the more likely that system will have a larger footprint.

Concerning the space requirements, it is desirable to have the monitoring system co-located with the reactor as there is a need for the rapid generation of an analytical result to drive a decision. However, the reaction takes place typically in a fume hood and many high-end systems will not fit in a fume hood. They are simply too big. Their location adjacent the fume hood may be cause obstruction or be otherwise cumbersome or risky in a laboratory setting.

Another drawback with some existing systems is speed of turnaround for separation results. For example, high-performance liquid chromatography typically takes 25 minutes to complete. On the other hand, ultra-performance liquid chromatography (UPLC) takes 2.5 minutes. While fast, UPLC leads to other difficulties and/or complexity. UPLC typically runs at 200-700 µL per minute. For instance, the Waters Patrol system uses 600 µL per minute. UPLC has much smaller particles in the column and typically operates at a higher backpressure from 5000-10,000 psi. Operating at higher pressures results in more complexity and expense. For example, higher pressures require high performance seals in the pumps and valves.

Given that UPLC has high flow rates of solvent, this means that high volumes of solvent will be required. With high volumes of solvent, you need large containers of solvent and waste storage capacity. This has two negative consequences. Firstly, large bottles of solvent have an impact on the size of the UPLC apparatus and rules out miniaturization. Additionally, large bottles of solvent create storage hazards as they are an explosion risk.

One of the drawbacks of existing systems is that they are integrated column systems. In other words, an integrated column is non-substitutable for another. Having access to an integrated column limits the field of research. Pharmaceutical customers don't want to be locked out of flexibility in being able to select the column most suited to the research. For example, a pharmaceutical company may wish to try up to at least 10 different columns and potentially as many as 30 different columns.

Furthermore, many of the prior art HPLC systems are manufacturer configured modules. For instance, a prior art system may include a pump module, an autosampler module and a detector module, all arranged within a unit. The functionality of each unit is preset by the manufacturer and does not permit user reconfiguration of the modules within the unit. If a user wants additional features such as to change from high-pressure system to a low pressure system, then a different pump unit altogether may be required. This unit would be stacked on top of the original unit. Furthermore, if a user wants a different kind of detector then it may be necessary to acquire a different detector unit. This unit would be stacked on top of the original unit. Accordingly, the user must acquire an additional unit for each additional function that the user is needing for the system. As a result, unit upon unit (typically arranged in a stack) becomes bulky and non-portable. Such arrangements, suitable for a benchtop do not lend themselves to transportation or compact environments such as laboratory hoods.

Furthermore, attempts at integration or miniaturization can often lead to more drawbacks. For instance, a liquid chromatography column may be provided on a chip or cartridge that can be inserted into the instrument. This "chip column" is a channel etched into silicon, with the channel packed with particles whereas the cartridge can be a custom-packed capillary column. The connections are often customised and can be complex in their configuration limiting the user's capacity to troubleshoot leaks.

In other prior art, Thermo Fisher Scientific have developed a cartridge concept known as EASY-Spray™ HPLC Columns. This is a standard capillary column with an emitter tip. However customers complained that if the tip got blocked they had to throw the whole (expensive) column away. Manufacturers can't control what substance customers put into the system and tips can be blocked quite readily due to inappropriate substances being used. In this device, if the tip gets blocked then this becomes an expensive mistake.

An object of at least a preferred embodiment of the present invention is to provide a specific analytical result and delivering the result where the action needs to be taken. An alternative object of the present invention is to provide miniaturization, compactness or reduced space requirements for a liquid chromatography system and methods related thereto, without big sacrifices in system performance such as resolution and turn-around time. Yet another alternative object of the present invention is to provide portability for a liquid chromatography system and methods related thereto. Yet another alternative object is to provide enhanced flexibility for the user of a liquid chromatography system and methods related thereto.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

As used herein, except where the context requires otherwise, the term "comprise" and variations of the term, such as "comprising", "comprises" and "comprised", are not intended to exclude further additives, components, integers or steps.

SUMMARY OF THE INVENTION

A. Modularity—Base Module and Reconfigurable Solvent Delivery Manager

In accordance with a further aspect of the present invention, there is provided, a reconfigurable capillary liquid chromatography system including:
- a solvent delivery manager including a first solvent pump assembly including a first pump housing or first pump mount;
- a base module including a base module housing or base module bracket, and an injection valve for sample injection to a liquid chromatography column, wherein the injection valve is mounted within the base module housing or on the base module bracket, and the first pump housing or mount is removably mounted within the base module housing or on the base module bracket; and
- a control system to control the liquid chromatography system;
- wherein the solvent delivery manager is configured to deliver solvent to the injection valve and the solvent delivery manager is user reconfigurable for user selection of the components of the solvent delivery manager, whereby the first solvent pump assembly is user substitutable for a user selected alternative first solvent pump assembly having a first alternative pump housing or mount, and the alternative first pump housing or mount is removably mountable within the base module housing or on the base module bracket, in place of the first pump housing or mount; and
- wherein the control system is pre-configured to accept control of the user selected components and is reconfigurable according to the user selected component(s) of the solvent delivery manager.

Preferably, the base module housing is user accessible for user substitution of selected components. Preferably, the base module components and components of the solvent delivery manager are housed in or mounted on a common user accessible housing to permit the user to change between configurations. For example, the base module housing may be housed within or configured within a protective housing such as a Pelican Case. Preferably, the components of the reconfigurable capillary liquid chromatography system fit within the predetermined envelope. The predetermined envelope may be 500×300×200 (mm). The predetermined envelope may be 500 L×300 W×200H (mm). This facilitates portability of the LC system. Accordingly, the casing may fit within the dimensions of the predetermined envelope.

Suitable fluidic and electronic connections may be provided to enable reconfiguration. Typical connectors include industry standard ProteCol PEEK Fingertight HPLC Fittings as supplied by Trajan Scientific and Medical.

A fluidic connection may be provided to connect the solvent delivery manager to the injection valve.

The first solvent pump assembly may be one of a high-pressure pump and a low-pressure pump and the alternative substitutable first solvent pump assembly may be the other of the high-pressure pump and low-pressure pump. In a starter system purchased by a customer, the first solvent pump assembly may be a low-pressure pump. The customer may wish to upgrade the system to a high-pressure solvent pump and may subsequently purchase the first alternative solvent pump assembly and accordingly substitute out the first solvent pump assembly for the first alternative pump assembly. Accordingly, the first solvent pump assembly may be withdrawn from its mounted position within the base module housing and the first alternative solvent pump assembly may be inserted into that position.

The base module housing may include a slot or opening to receive the first solvent pump assembly or the first alternative solvent pump assembly. The first solvent pump assembly may be engaged in its mounted position within the base module housing by one or more engagement features provided on the first solvent pump mount or housing. The engagement may be in the form of a clip or snap fit connection. Optionally, a fastener may be employed to secure the first solvent pump assembly in position. Likewise, the first alternative solvent pump assembly may be engaged in a similar manner.

The first solvent pump housing or mount may be constructed as a framework to protect one or more components of the pump assembly. However, alternative configurations are possible including a mount the form of a base plate where the components are mounted on the base plate. Another potential configuration may include a fully enclosed housing or casing for the pump assembly.

The first alternative solvent pump housing or mount may be of a similar or identical form to the first solvent pump housing or mount. This makes the units interchangeable within their mounted position in the base module housing.

The base module may also include a fluidic connection (most preferably a T-junction static mixer) which is reconfigurable, such that the solvent delivery manager may comprise any of the following configurations: the first solvent pump assembly only; the first solvent pump assembly and a second solvent pump assembly; or the first solvent pump assembly, the second solvent pump assembly and a third solvent pump assembly. The third solvent pump assembly may have any of the features described elsewhere for the first solvent pump assembly and the second solvent pump assembly. Any of the first, second or third solvent pump assemblies may be a third-party pump assembly such as the Alltesta™ Mini Syringe Pump Dimensions (WHL) 63×167× 128 mm.

The base module may further include a column oven. The column oven may be accommodated within the base module housing or mounted on the base module housing. However, the base module housing with the column oven is suitably accommodated within the predetermined envelope.

The reconfigurable system may accommodate a user-selected and substitutable liquid chromatography column with the control system being reconfigurable according to the selected liquid chromatography column. To facilitate substitution of various liquid chromatography columns, the connectors for the liquid chromatography column may comprise industry standard 10-32 threads and torque limiting connection systems such as MarvelXACT (IDEX Health & Science).

Preferably any of the solvent pumps are a syringe pump.

The solvent delivery manager may also be reconfigurable to include the second solvent pump assembly including a second solvent pump housing or mount. Preferably, the second solvent pump housing or mount is removably mountable within the base module housing and is user substitutable for an alternative second solvent pump assembly. Preferably, the second alternative solvent pump assembly includes a pump housing or mount.

The second solvent pump housing or mount may be of a similar or identical form to the first solvent pump housing or mount. Likewise, the second alternative solvent pump housing or mount may be of a similar or identical form to the second solvent pump housing or mount.

The base module housing may include a slot or opening to receive the second solvent pump housing or mount or the second alternative solvent pump housing or mount, as selected by the user. Accordingly, the base module housing may include adjacent slots or openings to receive respective pump assemblies. The base module housing may include up to four adjacent slots or openings to receive respective pump assemblies.

The solvent delivery manager is configurable to have one pump assembly only for isocratic elution. Two pump assemblies e.g. first and second solvent pump assemblies may be provided for gradient elution with a binary gradient. Three pump assemblies may be provided for gradient elution with ternary gradient.

Additionally, the basic module may include a mixer to mix the solvents from the first solvent pump assembly and the optional second solvent pump assembly, and third solvent pump assembly. The mixer may be in the form of a static mixer. The simplest form of a static mixer may comprise a T-junction. Alternatively, the mixer may be in the form of a dynamic mixer. The mixer may have an associated pressure sensor. In a preferred form of the invention, the static mixer and associated pressure sensor, the purge valve and the injection valve are mounted within the base module housing, and the first pump housing or mount is removably mounted within the base module housing.

The basic module may further include a purge valve. The purge valve is preferably disposed between the mixer and the injection valve. The purge valve may be operable to deliver solvent to waste or the injection valve, according to the predetermined operation of the system.

The reconfigurable capillary liquid chromatography system may accommodate a user selected and substitutable flow cell which is adapted for fluidic connection to the output of the liquid chromatography column. The control system is preferably reconfigurable according to the selected flow cell.

The flow cell is preferably selected from any of the following 500 nL, 180 nL, 80 nL, 45 nL and 12 nL, all of which are a common path length, for example 10 mm. Suppliers include Agilent Technologies, ThermoFisher Scientific and Waters. The flow cell is preferably mounted within an optical detector module. The optical detector module includes a housing or mount which is mountable within the base module housing. Accordingly, the base module housing may be provided with a slot or opening for receipt of the optical detector module. The optical detector module may include engagement features cooperable with corresponding engagement features on the base module housing, for example by a snap fit or clip engagement.

Preferably, the solvent delivery manager and the base module are received in a user-accessible housing for user substitution of selected components.

The liquid chromatography system may be high-performance. However, this is not essential and differentiates our approach from the standard HPLC model. The performance of the system needs to meet the expectations of solving the separation problem rather than developing an instrument to a specification which might exceed what is necessary for solving the problem. Accordingly, the design approach is to provide an instrument capable of meeting specific user-specified requirements. The design approach enables the customer to achieve something HPLC-like which is also miniature and compact.

Preferably, the control system is reconfigurable to modify a reconfigurable data storage medium, such as a config file, relating to the user-selected components/modules. The control system may incorporate a master-slave architecture wherein the master controller incorporates the reconfigurable data storage medium and the slaves, linked to the master, are the interface for control instructions to the various modules and/or components. Accordingly, the control system may be programmed to look for/recognise the user-selected modules and/or components and update the reconfigurable data storage medium. The control system may be implemented in Arduino protocol and architecture such as Arduino boards.

The controller may be local or remote such as cloud-based. Where local, the controller may be part of the base module.

Control software may be provided locally to the controller or remote such as cloud-based. Preferably, the control software required to operate according to any of the user selected components is pre-determined. In the case of the software being provided locally to the controller, such as incorporated into the master unit, the software may be pre-loaded.

Preferably, the control system is user reconfigurable via user inputs to modify the reconfigurable data storage medium such as the config file. The control system preferably includes a user interface configured to provide a user prompt to enter the user selection of the components/modules such as those of the solvent delivery manager, the control system being pre-programmed to control any of the range of selected components/modules.

Alternatively, the control system could reconfigure itself based upon recognition of the user selected components. You could send a ping to each sub-controller and wait for an answer (let's say 500 ms). If an answer is received the module is there, if not than not.

The control system may also include a laboratory communications interface.

A connection kit may be provided for fluidic connections of the components.

Any features described in connection with other aspects of the invention may be applicable to this aspect.

In accordance with a further aspect of the present invention, there is provided, a method of reconfiguring a capillary liquid chromatography system which includes a solvent delivery manager including a first solvent pump assembly including a first pump housing or first pump mount; a base module including a base module housing, or a base module bracket, and an injection valve for sample injection to a liquid chromatography column wherein the injection valve is mounted within the base module housing or on the base module bracket, and the first pump housing or mount is removably mounted within the base module housing or on the base module bracket; and a control system pre-configured to control the system; the method comprising:

reconfiguring the solvent delivery manager by substituting the first solvent pump assembly for an alternative user selected first alternative solvent pump assembly having a first alternative pump housing or mount which is removably mountable within the base module housing, or on the base module bracket, in place of the first pump housing or mount, and wherein the solvent delivery manager is configured to deliver solvent to the injection valve;

wherein the control system is pre-configured to accept control of the user selected components, the method further comprising reconfiguring the control system according to the user selected component(s) of the solvent delivery manager.

The control system may be reconfigured by means of a user interface.

Any features described in connection with other aspects of the invention may be applicable to this aspect.

B. Modularity—Base Module and Selectable Sample Delivery Module

In accordance with a further aspect of the present invention, there is provided, a reconfigurable capillary liquid chromatography system including:

a solvent delivery manager including a first solvent pump assembly;

a base module including a base module housing or a base module bracket and an injection valve for sample injection to a liquid chromatography column, wherein the injection valve has an inlet port for receiving a sample, and the injection valve is mounted on or in the base module housing or base module bracket, the solvent delivery manager being configured to deliver solvent to the injection valve; and a reconfigurable control system for controlling the liquid chromatography system;

wherein the liquid chromatography system is configured to incorporate a user-selected sample delivery module from a range of predetermined sample delivery modules, each of the predetermined sample delivery modules including a diversion valve adapted for fluidic connection to the injection valve, wherein at least one module of the range is removably mountable within the base module housing, or on the base module bracket;

wherein, the control system is pre-programmed to control any of the range of sample delivery modules, the control system being operable according to the pre-programming corresponding to the user selected sample delivery module.

Preferably, the reconfigurable control system includes a user interface for user indication of the selected sample delivery module.

At least one of the range of predetermined sample delivery modules may include a sample pump assembly including a sample pump housing or mount, the sample pump housing or mount being removably mountable within the base module housing, or on or to the base module bracket.

The liquid chromatography system may be adapted for fluidic connection to a reactor by one or more sampler conduits, Typically the sample delivery module takes the sample from the reactor, dilutes it and filters it prior to moving it to the chromatography system (typically by positive pressure from a pump or gas source). Known third party reactor sample delivery modules which are separate modules and may be user-selected include EasySampler (Mettler Toledo), SRS (Snapdragon Chemistry) and Sample Dilution (D&M Continuous Solutions). The fluidic connection to the injection valve may be via a diversion valve provided as part of the sample delivery module. Alternatively, the sample delivery module may be in the form of a sample delivery manager which is provided within the LC system. This on-board manager may however have the removable sample pump housing or mount.

The liquid chromatography system may also be selectively operable in a manual injection mode in which the system is configured for manual delivery of the sample to the injection valve. The liquid chromatography system may be selectively operable in sampler mode or manual injection mode. The control system user interface may facilitate selection of the sampler mode or manual injection mode.

Preferably, the base module and the sample delivery module are integrated in a common user accessible housing to permit the user to physically change between configurations. A solvent delivery manager may also be disposed in the common user accessible housing.

The control system may be reconfigurable via user inputs to modify a config file. (The master Arduino knows which modules it needs to find).

The user interface may be operable to provide a user prompt to enter the user selection of the sample delivery module or, in the alternative the manual injection mode. Alternatively, the control system could reconfigure itself based upon recognition of the user selected components.

Preferably, configuring the system for manual delivery includes connecting a manual delivery conduit to the inlet port of the injection valve. On the other hand, configuring the system for sampler mode may include connecting said one more sampler conduits such that the sample delivery module is connected to the inlet port of the injection valve. The sample delivery module may include a diversion valve which is connected to the injection valve. All samples may come to the liquid chromatography system through the diversion valve whether manually or from the reactor.

Preferably, physically changing the configuration includes disconnecting the manual delivery conduit and connecting the one or more sampler conduits to the injection valve and vice versa. A connection kit may be provided for fluidic connections.

Preferably, the diversion valve within the sample delivery module is operable to alternatively: pass the fluid sample to waste; pass the fluid sample to the injection valve. The diversion valve may be further operable to pass cleaning fluid through to the injection valve. The injection valve may be operable to pass the cleaning fluid through to waste.

A fluidic connection may be provided for connecting the solvent delivery manager to the injection valve. The solvent pump assembly may be a syringe pump.

The sample pump assembly may be a syringe pump. The sample pump assembly may be substitutable for an alternative sample pump assembly. The sample pump assembly and/or the alternative sample pump assembly may be selectable from a range of available sample pump assemblies. Each sample pump assembly in the range may vary according to the syringe volume which can be 25 uL, 50 uL, 100 uL or 250 uL.

Any features described in connection with other aspects of the invention may be applicable to this aspect.

In accordance with a further aspect of the present invention, there is provided, a method of reconfiguring a capillary liquid chromatography system which includes: a solvent delivery manager including a first solvent pump assembly; a base module including a base module housing or a base module bracket, and an injection valve for sample injection to a liquid chromatography column, wherein the injection valve has an inlet port for receiving a sample and the injection valve is mounted on or in the base module housing or base module bracket, the solvent delivery manager being configured to deliver solvent to the injection valve; and a reconfigurable control system for controlling the liquid chromatography system; the method including:

selecting a sample delivery module which is adapted for fluidic connection to the injection valve, the sample delivery module being selectable from a range of available sample delivery modules each of the predetermined sample delivery modules including a diversion valve adapted for fluidic connection to the injection valve and at least one module of the range being removably mountable within the base module housing, or on the base module bracket and wherein the control system is pre-programmed to control any of the range of sample delivery modules;

incorporating the user-selected sample delivery module into the liquid chromatography system; and interfacing with a user interface of the control system to input the user-selected sample delivery module.

Any features described in connection with other aspects of the invention may be applicable to this aspect.

Preferred—Sample Delivery Module has Diversion Valve Operable in Charge Mode and Delivery Mode Preferably, the sample delivery module includes a diversion valve having an inlet port for receiving a fluid sample under pressure, a waste port for exit of the sample to waste, and an outlet port, and the diversion valve is operable in charge mode, to receive a fluid sample under pressure and discharge the fluid sample to waste, and also operable in delivery mode to divert the fluid sample to the outlet port of the diversion valve. The outlet port may be connectable to an injection valve of a high performance liquid chromatography system. In the method of configuring a liquid chromatography system, wherein the system includes an sample delivery module including a diversion valve having an inlet port for receiving a fluid sample under pressure, a waste port for exit of the sample to waste, and an outlet port, wherein the diversion valve is operable in charge mode, to receive a fluid sample under pressure and discharge the fluid sample to waste, and also operable in delivery mode to divert the fluid sample to the outlet port of the diversion valve; the method may include connecting the sample delivery module to a high performance liquid chromatography system.

Preferred—Sample Delivery Module with Diversion Valve Having a Cleaning Mode

Preferably, the sample delivery manager may have a diversion valve having a sample inlet port for receiving a fluid sample under pressure, a waste port, a flushing port and an outlet port, the diversion valve being operable in a delivery mode to connect the sample inlet port to the outlet port, and in a cleaning mode to connect the flushing port to the outlet port.

In the method of configuring a liquid chromatography system, wherein the system includes and injection valve and a sample delivery manager including: a diversion valve having a sample inlet port for receiving a fluid sample under pressure, a waste port, a flushing port and an outlet port; wherein the diversion valve is operable in a delivery mode to connect the sample inlet port to the outlet port, and in a cleaning mode to connect the flushing port to the outlet port, the method may comprise connecting the outlet port of the diversion valve to the injection valve.

The sample delivery manager may be configurable to add a trap column for concentration of analyte, for example for verification of cleaning (of a reactor producing the sample).

The flow rate through the column may lie in the range of 1-50 µL.

Any features described in connection with other aspects of the invention may be applicable to this aspect.

C. Modularity—Add/Subtract Various Optional Components within Predefined Envelope In accordance with a further aspect of the present invention, there is provided, a reconfigurable capillary liquid chromatography system including:

a solvent delivery manager including a first solvent pump assembly including a first pump housing or mount; and a base module including a base module housing which is user accessible, or a base module bracket, and an injection valve for sample injection to a liquid chromatography column, wherein the injection valve has an inlet port for receiving a sample, and the injection valve is mounted in or on the base module housing, or on the base module bracket, the solvent delivery manager being configured to deliver solvent to the injection valve;

a reconfigurable control system for controlling the reconfigurable capillary liquid chromatography system;

wherein the system is selectively user configurable to removably add any one or more additional components to the system such that the base module including the base module housing or bracket, the first pump housing or mount, and the user selected additional components fit within a predetermined system envelope, the additional components including any one or more of the following:

a second solvent pump assembly having a second pump housing or mount, such that the selected second pump assembly is removably mountable on or within the base module housing, or on the base module bracket, for incorporation within the solvent delivery manager;

a sample delivery module which is adapted for fluidic connection to the injection valve, wherein the sample delivery module is removably mountable on or within the base module housing or on the base module bracket;

a third pump assembly for a sample delivery module, the third pump assembly having a third pump housing or mount, such that the selected third pump assembly is removably mountable on or within the base module housing or the base module bracket; and an optical detector module having a detector housing or mount, such that the selected optical detector housing or mount is removably mountable on or within the base module housing, or on the base module bracket;

wherein the control system is reconfigurable according to the user selected additional components.

Whichever of the additional components is user-selected, the predetermined system envelope is preferably not breached. The predetermined system envelope may be defined by an external housing or casing. The predetermined system envelope may be defined volumetrically. For instance, the Enabling Technologies Consortium has determined a desired system envelope of 455 L×405 W×355H (18"×16"×14"). Thus, the maximum volume of the predetermined system envelope may be approximately 65,000 cm$^3$. However, we have constructed our system envelope, in a preferred embodiment to be an envelope of 500×300×200 (mm), preferably 500 L×300 W×200H (mm). Accordingly, we can readily achieve a volume of the predetermined system envelope of approximately 30,000 cm$^3$. A preferred range for the volume of the predetermined system envelope is therefore about 25,000 cm$^3$ to about 66,000 cm$^3$. In a more preferred form, the range may be from about 30,000 cm$^3$ to about 65,000 cm$^3$, more preferably from about 30,000 cm$^3$ to about 60,000 cm$^3$, more preferably about 32,000 cm$^3$ to about 60,000 cm$^3$, more preferably about 35,000 cm$^3$ to about 60,000 cm$^3$, more preferably about 35,000 cm$^3$ to about 55,000 cm$^3$, more preferably about cm$^3$ to about 55,000 cm$^3$, more preferably about 40,000 cm$^3$ to about 50,000 cm$^3$.

Dimensionally, the preferred predetermined system envelope is 500×300×200 (mm). The preferred predetermined system envelope may be about 500×about 405×about 355 (mm). Lengthwise, the maximum length may be about 455 mm, about 400 mm, about 350 mm.

As described above, the first solvent pump assembly may include a first pump housing or mount. The first pump housing or mount may be insertable through a slot or opening in the base module housing or bracket such that the mounted first pump housing or mount fits within the predetermined envelope.

Likewise, the second pump housing or mount may be insertable through a slot or opening in the base module housing or bracket. Furthermore, the detector housing or mount may be insertable through a slot or opening in the base module housing or bracket. These are suitably respective slots. The sample delivery module may be insertable through a slot or opening in the base module housing or bracket.

Preferably, the base module bracket is in the form of intersecting wall portions. Preferably, the intersecting wall portions define slots or opening for insertion of any one of the removably mounted modules.

The solvent delivery manager may be incorporated into a solvent delivery module having one or more solvent pump assemblies. The solvent delivery module may be removably mountable on or within the base module housing, or on the base module bracket. Preferably, the solvent delivery module is insertable through a slot or opening in the base module housing or bracket.

Preferably the solvent delivery module, the sample delivery module and the optical detector module are slidable into position in the base module bracket. The solvent delivery module and the sample delivery module may be slidable from opposite directions into assembled position on the base module bracket. Each of the solvent delivery module, the sample delivery module and the optical detector module may have respective mounts. These mounts may be nestable on the base module bracket. Engagement features may be provided on each of the modules to nest the modules on the base module bracket.

The sample delivery module may be adapted for fluidic connection to the injection valve and adapted for fluidic connection to a sample source by one or more sampler conduits. The sample delivery module may be optionally employed since the sample could be delivered directly to the injection valve without the sample delivery module. For example, the sample may be delivered from a reactor, or alternatively from a separate offboard sample delivery module having its own pump.

The sample delivery module may be a discrete module or components thereof may be incorporated into the base module. As a discrete module, the whole sample delivery module may be an additional component that fits within the predetermined system envelope and the control system may be reconfigurable to adopt the discrete sample delivery module.

Further additional components may be provided for user selection. For example, a trap column may be provided for determining the efficacy of cleaning.

The control system may be reconfigurable in the manner described elsewhere for substitutable components. The control system may be user-reconfigurable in accordance with the manner described elsewhere. Alternatively, the control system could reconfigure itself based upon recognition of the user selected components.

Optionally, a fourth pump assembly may be provided for the solvent delivery manager having the features described elsewhere for the fourth pump assembly.

Any features described in connection with other aspects of the invention may be applicable to this aspect.

In accordance with a further aspect of the present invention, there is provided, a method of reconfiguring a capillary liquid chromatography system including: a solvent delivery manager including a first solvent pump assembly having a first pump housing or mount; and a base module including a base module housing which is user accessible, or base module bracket, and an injection valve for sample injection to a liquid chromatography column, wherein the injection valve has an inlet port for receiving a sample and the injection valve is mounted on or within the base module housing or bracket, the solvent delivery manager being configured to deliver solvent to the injection valve; and a control system for controlling the liquid chromatography system; the method of reconfiguring the system including:

selectively adding any one or more of the following additional components to the system such that the base module, including the base module housing or bracket, the first pump housing or pump mount, and the user selected additional components fit within a predetermined system envelope:

a second solvent pump assembly having a second pump housing or mount, such that the selected second pump assembly is removably mountable on or within the base module housing or bracket for incorporation within the solvent delivery manager;

a sample delivery module which is adapted for fluidic connection to the injection valve, wherein the sample delivery module is removably mountable on or within the base module housing or bracket;

a third pump assembly for a sample delivery manager, the third pump assembly having a third pump housing or mount, such that the selected third pump assembly is removably mountable on or within the base module housing or bracket; and an optical detector module having a detector housing or mount, such that the selected optical detector housing or mount is removably mountable on or within the base module housing or bracket; and reconfiguring the control system according to the one or more user selected additional component(s).

Any features described in connection with other aspects of the invention may be applicable to this aspect.

D. Modularity—Add/Subtract Various Optional Components within Base Module

In accordance with a further aspect of the present invention, there is provided, a reconfigurable capillary liquid chromatography system including:

a solvent delivery manager including a first solvent pump assembly; and a base module including a base module housing which is user accessible and an injection valve for sample injection to a liquid chromatography column, wherein the injection valve has an inlet port for receiving a sample, and the injection valve is mounted in or on the base module housing, the solvent delivery manager being configured to deliver solvent to the injection valve;

a reconfigurable control system for controlling the reconfigurable capillary liquid chromatography system;

wherein the system is selectively user configurable to removably add any one or more of the following additional components to the system such that the solvent delivery manager, and the user selected additional components fit within the base module housing:

a second solvent pump assembly having a second pump housing or mount, wherein the selected second pump assembly is removably mountable to fit within the base module housing for incorporation within the solvent delivery manager;

a third pump assembly for a sample delivery manager, the third pump assembly having a third pump housing or mount, wherein the selected third pump assembly is removably mountable to fit within the base module housing; and an optical detector module having a detector housing or mount, wherein the selected optical detector housing or mount is removably mountable to fit within the base module housing;

wherein the control system is reconfigurable according to the user selected additional components.

The user can therefore removably add said additional components and the user can reconfigure the control system accordingly.

The nature of the additional components may be as described elsewhere in the specification, particularly the preceding section.

The reconfigurable control system may be user-reconfigurable. The reconfigurable control system preferably includes a user interface for user indication of the user selected additional component(s). Suitably, the control system is pre-programmed to control any of the user-selectable additional components.

Any features described in connection with other aspects of the invention may be applicable to this aspect.

In accordance with a further aspect of the present invention, there is provided, a method of reconfiguring a capillary liquid chromatography system including: a solvent delivery manager including a first solvent pump assembly; and a base module including a base module housing which is user accessible and an injection valve for sample injection to a liquid chromatography column, wherein the injection valve has an inlet port for receiving a sample and the injection valve is mounted within the base module housing, the solvent delivery manager being configured to deliver solvent to the injection valve; and a control system for controlling the liquid chromatography system; the method of reconfiguring including:

selectively adding any one or more of the following additional components to the system such that the solvent delivery manager, and the user selected additional components fit within the base module housing:

a second solvent pump assembly having a second pump housing or mount, wherein the selected second pump assembly is removably mountable to fit within the base module housing for incorporation within the solvent delivery manager;

a third pump assembly for a sample delivery manager, the third pump assembly having a third pump housing or mount, wherein the selected third pump assembly is removably mountable to fit within the base module housing; and an optical detector module having a detector housing or mount, wherein the selected optical detector housing or mount is removably mountable to fit within the base module housing; and reconfiguring the control system according to the one or more user selected additional component(s).

The method may further comprise reconfiguring the control system through a user interface.

Any features described in connection with other aspects of the invention may be applicable to this aspect, particularly the above aspect for the system.

E. Optical Detector Module

In accordance with yet another aspect of the present invention, there is provided an optical detector module for a capillary liquid chromatography system including:

a detector component mount;

a light source submodule removably mounted on the detector mount;

a flow cell removably mounted on the detector mount;

at least one photodiode or photodiode array submodule removably mounted on the detector component mount; and wherein the light source submodule, the flow cell and at least one photodiode or photodiode array submodule are removably mounted in a predetermined alignment by the detector component mount;

wherein the system is user reconfigurable for user substitution of any one or more of the following substitutable components or submodules: the light source submodule, the flow cell and the at least one photodiode or photodiode array submodule.

The detector component mount may accordingly serve the dual functions of component/submodule mounting as well as alignment of the optical components. The detector component mount may comprise any structure which serves to mount and align the various components of the optical detector module. The detector component mount should be robust to maintain alignment during transit.

The detector mount may include a mounting plate. Alternatively, the detector mount may include a three-dimensional mounting bracket. For example, the mounting bracket may comprise a plurality of mounting surfaces. For example, the mounting bracket may include intersecting wall portions to provide separation between components of the optical detector module, e.g. separation between heat producing components, such as the light source and heat-sensitive optical components, or as another example, a heat-producing power supply and any heat-sensitive optical components. The wall portions of the mounting bracket may also provide mounting surfaces for any of the components listed above or accessories such as fans, power supplies for the light source or photodiode array submodule.

The optical detector module may further include a first collimating lens and a second collimating lens. Preferably, the first and second collimating lenses are arranged in alignment with the flow cell such that light from the light source submodule passes in a straight line through the first collimating lens, the flow cell and the second collimating lens and onto the at least one photodiode or the photodiode array submodule.

Accordingly, the detector component mount may further include an alignment mount for aligning the optical components of the optical detector assembly including the light source submodule, the flow cell, the at least one photodiode or photodiode array submodule and the lenses. The alignment mount preferably maintains the first and second collimating lenses in alignment with the flow cell.

The alignment mount may be fully or partially integrated with the detector mount. However, it is preferred that mounting bracket and/or plate are defined by a component which is discrete from the component(s) defining the alignment mount, although the mounting bracket and/or plate are preferably attached to the component(s) defining the alignment mount.

The control system may be pre-configured to control a preset range of substitutable submodules (including a preset range of substitutable lamps submodules, a preset range of substitutable photodiode array submodules and optionally a preset range of substitutable flow cell submodules). The control system may also be pre-configured to control a preset range of substitutable components, (such as a preset range of substitutable flow cells, a preset range of substitutable collimating lenses, and a preset range of substitutable photodiodes).

The control system may be reconfigurable according to the user selected substitutable submodules or components. The control system may be user-reconfigurable. For instance, this could be by user indication to the control system via a user interface. An example is a pull down menu and the user selects the config file to update. Alternatively, the control system could reconfigure itself based upon recognition of the user selected components.

The optical detector module may further include a housing to house the detector component mount, the light source submodule, the flow cell and the photodiode or the photodiode array submodule. The housing may be user accessible to reconfigure the optical detector module. Accordingly, the housing may be comprised of removably interconnectable housing panels. For instance, the housing may comprise a six-sided enclosure. There may be one panel per side. Alternatively, the housing may be comprised of two panels on any particular side to increase accessibility.

The light source submodule may include a lamp, a lens interface, a lamp support. The Lamp support may be in the form of a base mounting plate for the lamp. Alternatively, the lamp support may be in the form of a housing for the lamp.

All of the lamp, lens interface and lamp support may be preassembled. Accordingly, the light source submodule (as a preassembled unit) could be substituted for an alternative light source submodule, (also a preassembled unit), depending upon user requirements. Additionally, the light source submodule may include a lamp housing, which could optionally function as a heat sink.

In order to align the light source with other optical components, the light source submodule may be engageable with the alignment mount.

Furthermore, the light source may have a power supply, also mounted upon the detector component mount. However, the power supply in the light source submodule may be separately mounted to the mounting bracket of the detector component mount while the light source submodule is mounted via the alignment mount which is attached to the mounting bracket.

The photodiode array submodule may include a photodiode array unit and a support therefor. The photodiode array unit may be user selectable from a predetermined range of available photodiode array units. The control system may be configured or reconfigured according to the selected photodiode array unit. Since each photodiode array unit from the predetermined range is of a different configuration, preferably the support is complementary to the selected photodiode array unit. Accordingly, each photodiode array submodule may include a photodiode array unit from the range and its complementary support.

In order to align the photodiode array with other optical components, the support is engageable with the alignment mount.

The alignment mount may include one or more alignment rods. One or more alignment rods preferably extend through a portion of the light source submodule, and where a photodiode array submodule is provided, through a portion of the photodiode array submodule. For example, the one or more alignment rods preferably extend through the lamp support of the light source submodule and the complementary support of the photodiode array submodule. In this way, the one or more common alignment rods align the light source submodule and the photodiode array submodule. Preferably, two of the alignment rods pass through both the lamp support and the complementary support.

Additionally, the alignment mount may include one or more alignment brackets or blocks. Preferably, there are two alignment brackets arranged at either end of the flow cell, each including an interface for a respective adjacent lens and the flow cell. The one or more alignment rods extend through the alignment brackets to provide alignment of the flow cell, the lenses, the light source submodule and the photodiode array submodule. The alignment mount facilitates user removal of any of the various submodules and reassembly, while facilitating immediate alignment of the new assembly. The flow cell may be positioned by providing a sliding fit with the alignment brackets based on the flowcell OD, and held in place by applying compressive force using the alignment brackets and locking the alignment brackets in position relative to the alignment rods using suitable fasteners, such as grub screws.

In a preferred embodiment, there are a total of four alignment rods, each of which passes through the two alignment brackets. Preferably, the alignment brackets have through apertures in respective corners. Two of these four alignment rods preferably extend through the lamp support and the complementary support.

In another embodiment, a photodiode may be provided instead of the diode array submodule. The photodiode is suitably mounted upon one of the alignment brackets and achieves its alignment through the alignment brackets being aligned by virtue of the alignment rod(s). Similarly, the flow cell achieves its alignment by virtue of being positioned between the two alignment brackets, which are accordingly aligned by virtue of the alignment rod(s).

The first and second collimating lenses may be provided at a predetermined spacing (because the substitutable flow cells are all the same size).

The one or more alignment rod(s) may be located relative to the mounting bracket. For instance, the one or more alignment rod(s) may pass through locating apertures in the mounting bracket, for example in separating wall portion of the mounting bracket. Thereby, the spatial position of the alignment rod(s) relative to the mounting bracket is established. Additionally, the relative spatial position of the alignment rods relative to each other is established.

The alignment rod(s) may serve to achieve the alignment of the light source submodule on one side of said separating wall portion, passing through the separating wall portion to achieve alignment of the flow cell, lenses and the diode array submodule (or the at least one photodiode) on the other side of the separating wall portion.

The optical detector module may be incorporated into the liquid chromatography systems as described above in connection with any of the foregoing aspects.

The detector may further including a rigid optical fibre coupler in alignment with the flow cell, instead of the second collimating lens. For example, a suitable rigid optical fibre coupler many comprise SMA 905 Adapter, 1000 μm SR optical fibre, 31.4 mm; part number SMA-ADP-031-SR, Ocean Optics Inc.

Thus, the interchangeability of components enables the required performance delivery. For example, in the case of an API (active pharmaceutical ingredient) that absorbs at a maximum wavelength at 275 nm, there is no need for more than a detector based upon a 275 nm LED and a single photodiode. On the other hand, if the compound is unknown, then it may be necessary to use an array of photodiodes from 200 nm to 300 nm and a deuterium light source. The array of photodiodes may be provided in an optical spectrometer device.

The photodiode may be substitutable for the alternative of the photodiode array unit (optical spectrometer unit). Preferably, the photodiode array unit (optical spectrometer) and the light source are selected for compatibility.

Any features described in connection with other aspects of the invention may be applicable to this aspect.

In accordance with another aspect of the present invention, there is provided, a method of reconfiguring an optical detector module for a capillary liquid chromatography system including: a detector component mount; a light source submodule removably mounted on the detector mount; a flow cell removably mounted on the detector mount; at least one photodiode or photodiode array submodule removably mounted on the detector component mount; and wherein the light source submodule, the flow cell and at least one photodiode or photodiode array submodule are removably mounted in a predetermined alignment by the detector component mount; the method comprising:

reconfiguring the system by substituting of any one or more of the following substitutable components or submodules: the light source submodule, the flow cell and the at least one photodiode or photodiode array submodule.

In reconfiguring the system, the light source submodule may be removed and substituted for an alternative light source submodule. Similarly, the flow cell may be removed and substituted for an alternative flow cell. Likewise, the at least one photodiode or photodiode array submodule may be removed and substituted for an alternative photodiode or photodiode array submodule.

Each of the substitutable submodules/components may be removably supported by an alignment mount forming part of the detector component mount. When the submodules/components are supported by the alignment mount, the alignment mount maintains the desired alignment. Substituted submodule/components are similarly supported by the alignment mount and also achieve the desired alignment.

Preferably, the alignment mount includes alignment rods. The alignment rods are rigid. The light source submodule may include a lamp support and the diode array submodule may include a complementary support. The supports of the light source submodule and the diode array submodule may intersect with the alignment rods to maintain alignment of the supports and accordingly, the supported components. The supports may slidingly engage with the rods to facilitate assembly and removal. The engagement with the rods, e.g. by suitable fasteners maintains the alignment of the supported component.

Preferably, the alignment mount further includes alignment brackets supporting the flow cell and the lenses, and optionally a lens and rigid coupler combination, and optionally a photodiode. The alignment rods maintain the alignment of the alignment brackets and accordingly the components supported by those alignment brackets.

The method includes selecting the support for the diode array submodule which is compatible with the selected diode array (optical spectrometer).

Any features described in connection with other aspects of the invention may be applicable to this aspect.

It will be understood that the invention disclosed and defined in this specification extends to all alternative combinations of two or more of the individual features mentioned or evident from the text or drawings. All of these different combinations constitute various alternative aspects of the invention.

Further aspects of the present invention and further embodiments of the aspects described in the preceding paragraphs will become apparent from the following description, given by way of example and with reference to the accompanying drawings.

BRIEF DESCRIPTION OF THE DRAWINGS

In order that the invention may be more fully understood, an embodiment will now be described, by way of example, with reference to the figures in which:

FIG. 3C is a perspective view of the liquid chromatography unit, shown semi-closed configuration, illustrating the insertion of the pump modules;

FIG. 3D is an end view illustrating the pump modules in position;

FIGS. 6 (D) and (F) are exploded views of the optical detector module shown in FIGS. 6 (A)-(C);

FIGS. 7 (D) and (F) are exploded views of the optical detector module shown in FIGS. 7 (A)-(C);

FIG. 7 E is a perspective view of the optical detector module shown in FIGS. 7 (A)-(C), with parts removed for the purposes of clarity;

FIG. 17 is an exploded view of the housing for the optical detector module shown in FIG. 16.

FIG. 18A is an exploded view of a flow cell submodule for deployment in the optical detector module.

FIG. 18B is an assembled view of the flow cell submodule shown in FIG. 18A.

FIG. 19 is an exploded view of a first preferred light source submodule.

FIG. 20 is an exploded view of a second preferred light source submodule.

FIGS. 21A-21E TOP ROW are perspective views of five different kinds of mini spectrometers, including the Q-mini, the OI ST, OCEAN INSIGHT FLAME, the AVANTES OEM-MINI, and the PACTO.

FIGS. 21A-21E MIDDLE ROW are exploded views of the five different kinds of mini spectrometers and the complementary support therefor.

FIGS. 21A-21E BOTTOM ROW are perspective views of the five different kinds of mini spectrometers and the complementary support therefor, in assembled configuration.

FIGS. 23A-23C are various perspective views of one kind of mini spectrometer, the FLAME shown in assembled configuration within an optical detector module.

FIG. 23D is a perspective view of one kind of mini spectrometer, the FLAME shown in assembled configuration within an optical detector module, without the mounting bracket.

FIG. 23E is a perspective view of one kind of mini spectrometer, the FLAME shown in assembled configuration within an optical detector module, with the mounting bracket.

FIGS. 24A-24C are various perspective views of one kind of mini spectrometer, the ST shown in assembled configuration within an optical detector module.

FIG. 24D is a perspective view of one kind of mini spectrometer, the ST shown in assembled configuration within an optical detector module, without the mounting bracket.

FIG. 24E is a perspective view of one kind of mini spectrometer, the ST shown in assembled configuration within an optical detector module, with the mounting bracket.

FIGS. 25A-25C are various perspective views of one kind of mini spectrometer, the Q-MINI shown in assembled configuration within a optical detector module.

FIG. 25D is a perspective view of one kind of mini spectrometer, the Q-MINI shown in assembled configuration within an optical detector module, without the mounting bracket.

FIG. 25E is a perspective view of one kind of mini spectrometer, the Q-MINI shown in assembled configuration within an optical detector module, with the mounting bracket.

FIGS. 26A-26C are various perspective views of one kind of mini spectrometer, the OEM MINI shown in assembled configuration within a optical detector module.

FIG. 26D is a perspective view of one kind of mini spectrometer, the OEM MINI shown in assembled configuration within an optical detector module, without the mounting bracket.

FIG. 26E is a perspective view of one kind of mini spectrometer, the OEM MINI shown in assembled configuration within an optical detector module, with the mounting bracket.

FIG. 30 is perspective view of a liquid chromatography system in accordance with the second preferred embodiment of the present invention;

FIG. 31 is a perspective view of a base module bracket for the system shown in FIG. 30;

FIG. 32 is a perspective view of the various modules and components which assemble with the base module bracket of FIG. 31 to form the system of FIG. 30;

FIG. 33 is a perspective view of a substitutable sample delivery module for the system shown in FIG. 30;

FIG. 34 is a perspective view of a substitutable 3-pump solvent delivery module for the system shown in FIG. 30;

FIG. 35 is a perspective view of a substitutable 2-pump solvent delivery module for the system shown in FIG. 30;

FIG. 38 is a perspective view illustrating the base module bracket shown in FIG. 31, together with nested mounts from the sample delivery module shown in FIG. 33, the solvent delivery module shown in FIG. 34 and a selected optical detector module of the type shown in FIG. 23;

FIG. 39 is a partially assembled view showing the sample delivery module of FIG. 33 in assembled configuration;

FIG. 40 is a partially assembled view showing the selected optical detector module of FIG. 23 in assembled configuration;

FIG. 41 is a partially assembled view showing the selected solvent delivery module of FIG. 34 in assembled configuration.

DETAILED DESCRIPTION OF THE EMBODIMENTS

Figure 1:
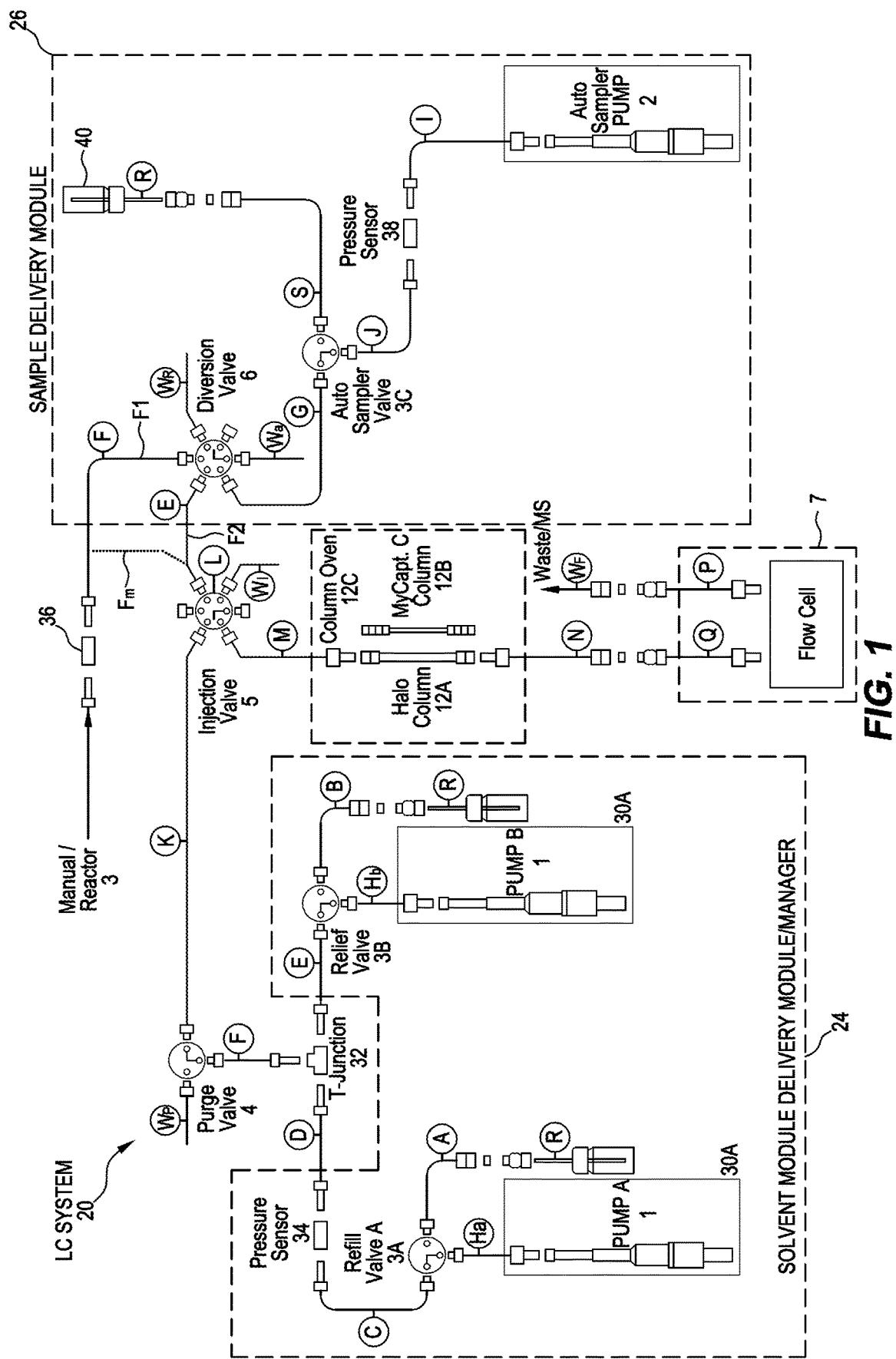
FIG. 1 is a diagram illustrating a liquid chromatography system in accordance with a preferred embodiment of the present invention.

FIG. 1 is a schematic diagram of a liquid chromatography (LC) system 20 according to a preferred embodiment of the present invention. The Figure shows the fluidic connections in the fluid path in the whole LC system 20. The main components of the liquid chromatography system 20 include a sample delivery manager 26 which delivers the sample to an injection valve 5 where it is mixed with a solvent to form the eluent before flowing to the liquid chromatography column 12, which optionally may be provided in a column oven 12C. Following passage through the column 12, the eluate passes to an optional flow cell 7 for further analysis. The solvent is provided to the injection valve 5 by a solvent delivery manager 24. The whole liquid chromatography system 20 includes hardware components and modules (which may also be referred to as the "Instrument") and control aspects implemented through "Software" (but not limited thereto).

The flow cell 7 may be incorporated into an optical detector module 50 as depicted in FIG. 3 and further explained in connection with FIGS. 6 and 7. Alternatively, the flow cell may be incorporated into an optical detector module in the form of an LED detector module 52 also depicted in FIG. 3 and is further explained in connection with FIG. 8. The LED detector module 52 is considered a less expensive option than the optical detector module 50 and can be used for applications where any suitable high power LED is available at the appropriate wavelength above 235 nm, including 235, 240, 245, 250, 255, 260, 265, 270, 275, 280 nm.

Base Module Housing

Depending on which module is user selected, either is able to be inserted into the slot 54 in the side of the base module housing 28 (see FIG. 3). The base module housing 28 is suitably of a size and enabling it to be fitted into a portable container such as a briefcase (not shown) or a protective case carrier (not shown). The portable container therefore defines a predetermined system envelope 22 within which the base module can fit. However, the predetermined system envelope 22 may be a theoretical design constraint.

The system, including the base module housing 28 with its components and some modules is preferably a portable unit, able to be carried by hand. Preferably, the overall weight is less than 20 kg, preferably, the weight range is 15-30, more preferably 10-15 kg.

The liquid chromatography system 20 includes certain components which are associated with the base module housing 28. The components may be housed within the housing 28 or alternatively could be mounted externally thereto (see FIG. 3). The modules/components which will usually be present within the housing 28 include pressure sensor 34, static mixer 32, a solvent delivery manager 24 and the column 12, although the column 12 within the column oven 12C may be provided external to the housing, but attached to the housing 28 as shown in FIG. 3 (left-hand side).

However, the column 12 is not fixed in type in the LC system 20. The user is able to select a suitable column 12 for the intended purpose. For example, the user may select a HALO® column 12A from Advanced Materials Technology Inc. or a MyCapLC™ column 12B from Trajan Scientific and Medical. A column oven 12C is another optional feature at the user's election, depending on the type of liquid chromatography.

Certain optional submodules such as the flow cell module 7 which may be user-selected, may or may not be present within the base module housing 28, depending on the user's choice in configuring the LC system 20. Other substitutable submodules and/or components will become apparent from the following description.

The ability to remove submodules and/or components and substitute other modules and/or components helps contribute to the small form of the LC system 20 associated with the base module housing 28. Accordingly, the user can select only those modules and/or components which are considered appropriate for the API or other application. Accordingly, without unnecessary modules and/or components and without unnecessary functionality that the user does not require, the LC system 20 is constrained in size, and configured to fit within the predetermined envelope 22. However, user operability is not lost because of the communication provided between the control system and the user. For instance, the control system may prompt the user to enter the selected modules and/or components. For instance, the user may be presented with a menu of options via the user interface and the user simply selects from the menu, the selected modules/components, and, if necessary, other control system prompted variables. The control system is pre-programmed with a predetermined range of optional modules and/or components. Once the user has indicated, via the user interface, the selected modules/components, the control system operates accordingly.

The control system may also verify by appropriate communication protocol with the selected modules/components, that these selected modules/components are indeed present in the system 20. The verification process may be an alternative to the user interface. The verification process may be in addition to the user interface.

The components within the base module housing include at least a static mixer 32 and associated pressure sensor 34, a purge valve 4 for the solvent delivery manager 24 and an injection valve 5.

Solvent Delivery Manager 24

There will always be a solvent delivery manager 24 within the base module housing 28. However, the configuration of the solvent delivery manager 24 can vary by substitution of modules within the solvent delivery manager 24. For example, the solvent delivery manager 24 may be set up for a single low pressure pump module such as a first pump module 30A (otherwise referred to as a first solvent pump assembly elsewhere in this specification). With a single pump module 30A/30B, the system 20 can run isocratic elution.

Additionally, with an alternative single pump high pressure module 30B, the system 20 can run isocratic elution at high pressure. Pump module 30B has a larger motor than pump module 30A as shown in FIG. 3.

Furthermore, with first and second low pressure pump modules 30A, the LC system 20 can run a low pressure binary gradient elution.

Furthermore, with a third pump module 30A (see FIG. 3) in addition to the first and second low pressure pump modules 30A, the LC system 20 can run a low pressure ternary gradient elution. However, the LC system can only accommodate 3 pump modules so the adoption of the third pump module 30A to run low pressure ternary gradient elution would be at the expense of the pump module 2 from the sample delivery manager (see FIG. 1). In another embodiment (FIGS. 29-41), the base module housing may accommodate four pump modules in total.

Alternatively, with first and second high pressure pump modules 30B, the LC system can run a high pressure binary gradient elution. Furthermore, with a third pump module 30B, in addition to the first and second pump modules 30B, the LC system 20 can run a high pressure ternary gradient elution. However, the LC system can only accommodate 3 pump modules so the adoption of the third pump module 30B would be at the expense of having the pump module 2 performing its designated functions within the sample delivery manager (labelled 2 in FIG. 1).

Also provided is a static mixer in the form of a T-junction. The first pump module 30A is connected to the T-junction 32 via an associated pressure sensor 34. When the second pump module 30A is not present, the other side of the T-junction is capped off. The T-junction is connected to the purge valve 4. The pressure sensor 34 may be considered part of the base module.

Pump Modules

Each of the pump modules 30A and 30B include pumps 1. As already noted, the LC system 20 can run with high pressure pumps (30B) or low-pressure pumps (30A). Accordingly, it is possible to select a pump module which is a high pressure pump module 30B or a low-pressure pump module 30A. The high pressure pump module includes a high-pressure pump 1, whereas the low pressure pump module includes a low-pressure pump 1. Where two or three pumps are used, all of the pumps are low-pressure pumps or high pressure pumps. The low-pressure pump module 30A is not used in conjunction with the high-pressure pump module 30B. These are alternatives. Both pump modules must be low-pressure or high-pressure. Generally, you cannot mix high-pressure with low-pressure.

The selection of appropriate high or low pressure pump modules enables the user to select the appropriate pressure for solvent delivery. The low-pressure pump module uses Trajan Scientific and Medical's standard glass syringe technology.

It may also be possible to disconnect a pump 1 from within a pump module 30A, 30B and substitute another pump 1.

Each pump module 30A, 30B includes an integrated motor driver such as a TMC2130 (Trinamic Motion Control GmbH). The motor driver is used to control the stepper motor to perform pump aspiration and dispensing. The motor driver may be the same for both types of pump modules 30A and 30B.

Figure 3A:
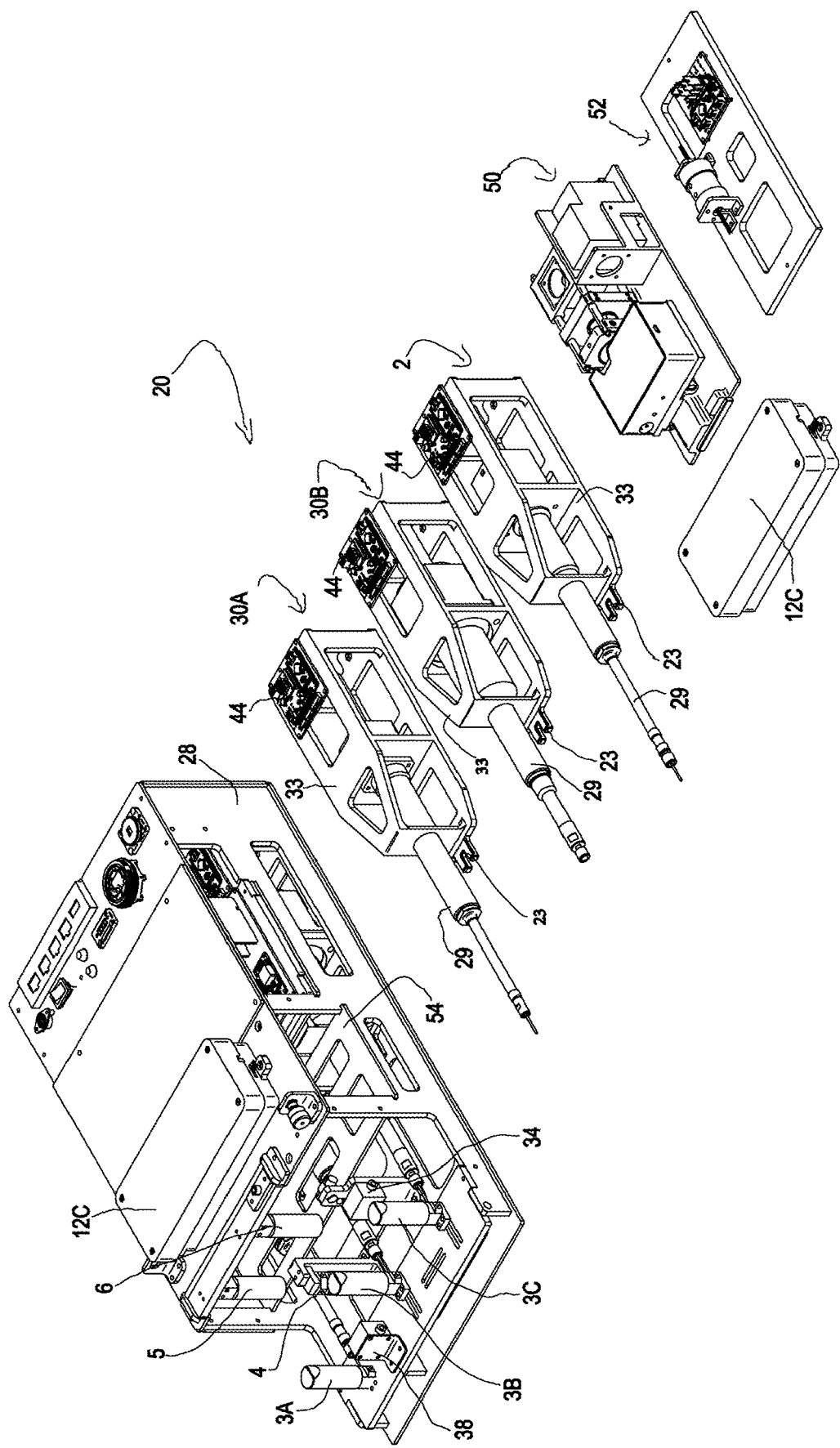
FIG. 3A is a perspective view illustrating the liquid chromatography unit as per the system diagrams of FIGS. 1 and/or 2, according to a preferred embodiment of the present invention, with various substitutable modules located alongside the unit. The liquid chromatography unit is shown in open configuration.

Each pump module 30A, 30B includes a pump housing or mount 33 in the form of a frame around the components of the pump module. As such, each pump module 30A, 30B is a discrete unit separable from the base module housing 28. The pump housing 33 for both the low-pressure pump module 30A and the high-pressure pump module 30B are of the same form as shown in FIG. 3A. Given that the pump is a syringe type pump, it can be seen that the syringe type pump has a forward end 29 projecting through the forward end of the pump housing 33.

Figure 3B:
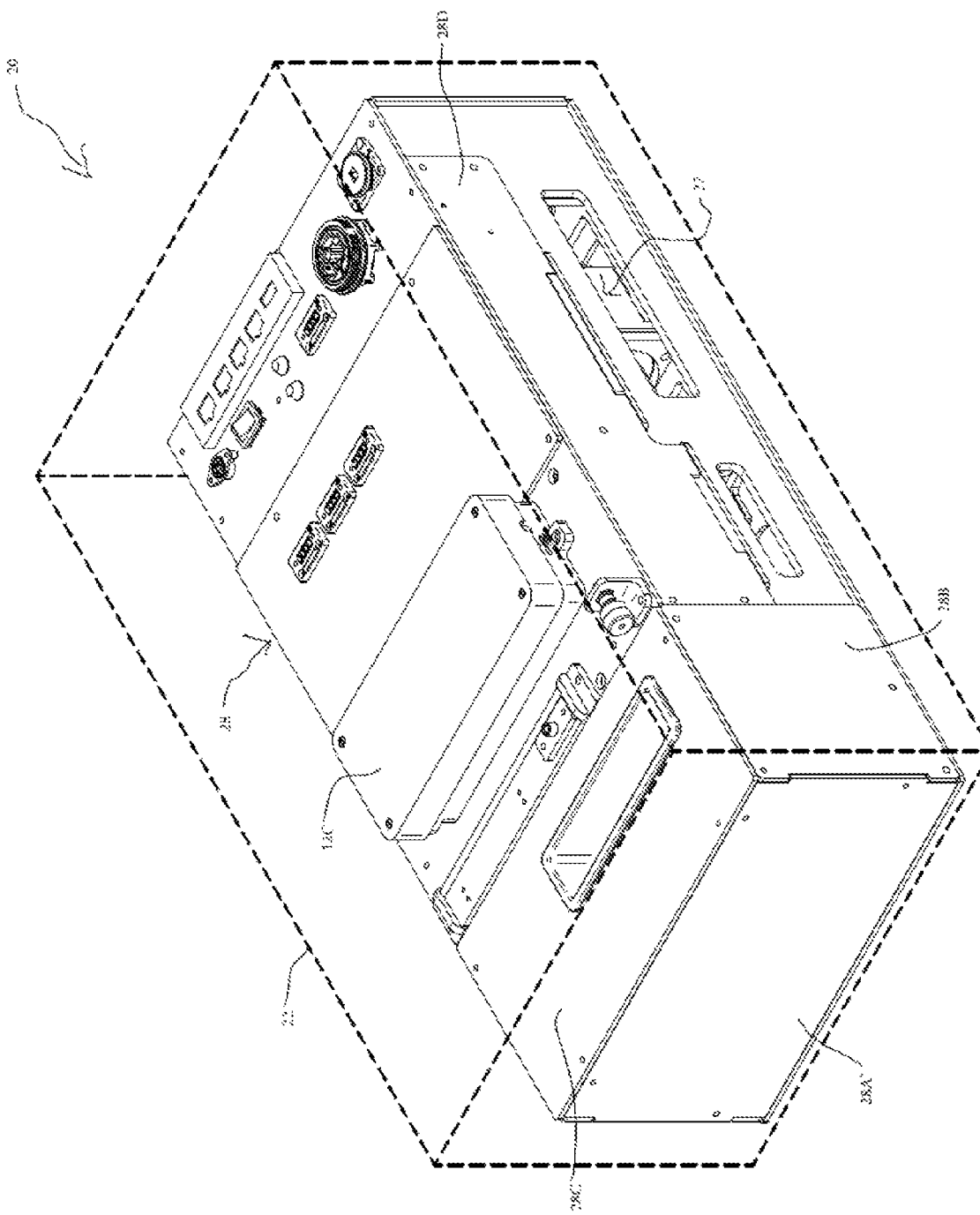
FIG. 3B is a perspective view of the liquid chromatography unit in similar orientation to that of FIG. 3A, except shown enclosed configuration.

FIG. 3B illustrates the base module housing of the liquid chromatography unit 20 in a closed configuration. The base module housing 28 includes removable closures 28A, 28B, 28C, and 28D. Additionally, a cut out 27 on each side of the base module housing 28 provides a handgrip, without extending outside of the predetermined system envelope.

FIG. 3C illustrates the base module housing 28 in a closed configuration, except with a rear removable closure 28E being open. With the rear removable closure 28E being open, the slots 35 are revealed. The slots 35 are defined within the base module housing 28 by means of the sidewalls, top wall and bottom wall of the base module housing 28, together with internal partitions. The slots 35 define the seats for the pump modules, in this case two high-pressure pump modules 30B. The pump modules 30B are inserted into the slots 35 with the projecting portion 29 of the syringe type pump initially directed into the slots 35.

As can be seen from FIGS. 3A and 3C, each of the pump housings 33 is provided with an engagement feature 23. The engagement feature 23 in the form of a pair of forwardly projecting prongs, engages with a complementary engagement feature (not shown) within the base module housing 28. Accordingly, the forward end of the pump housing 33 is secured relative to the base module housing 28. A snap in feature is convenient where the forward end of the pump housing 33 is relatively inaccessible. The rear of each pump housings 33 may be secured with a fastener (not shown) extending through an aperture at the rear of the pump housing 33, the fastener engaging with a threaded aperture in the base module housing 28. Once the pump modules 30B are secured in position, the rear removable closure 28E is secured in position. However, the two high-pressure pump modules 30B may also be removed from the base module housing 28 and replaced by two low-pressure pump modules 30A.

The third slot on the right of FIG. 3D accommodates pump 2.

Referring to FIG. 1, pump 1 draws in the solvent buffer R which passes through the refill valve 3A before coming through the pressure sensor 34, the T-junction 32 and into the purge valve 4. The purge valve 4 is used to fill the lines with solvent buffer R and have the system ready for the next test as is known in the LC field.

Valve Modules

The valve modules 3A, 3B, 3C, 4, 5, 6 include a motor and a stator. 3A, 3B, 3C and 4 are 3-port valves. The injection valve 5 and the diversion valve 6 are 6-port valves. The valves may be provided by LabSmith but to those skilled in the art, HPLC valves from IDEX and VICI are suitable.

Figure 2:
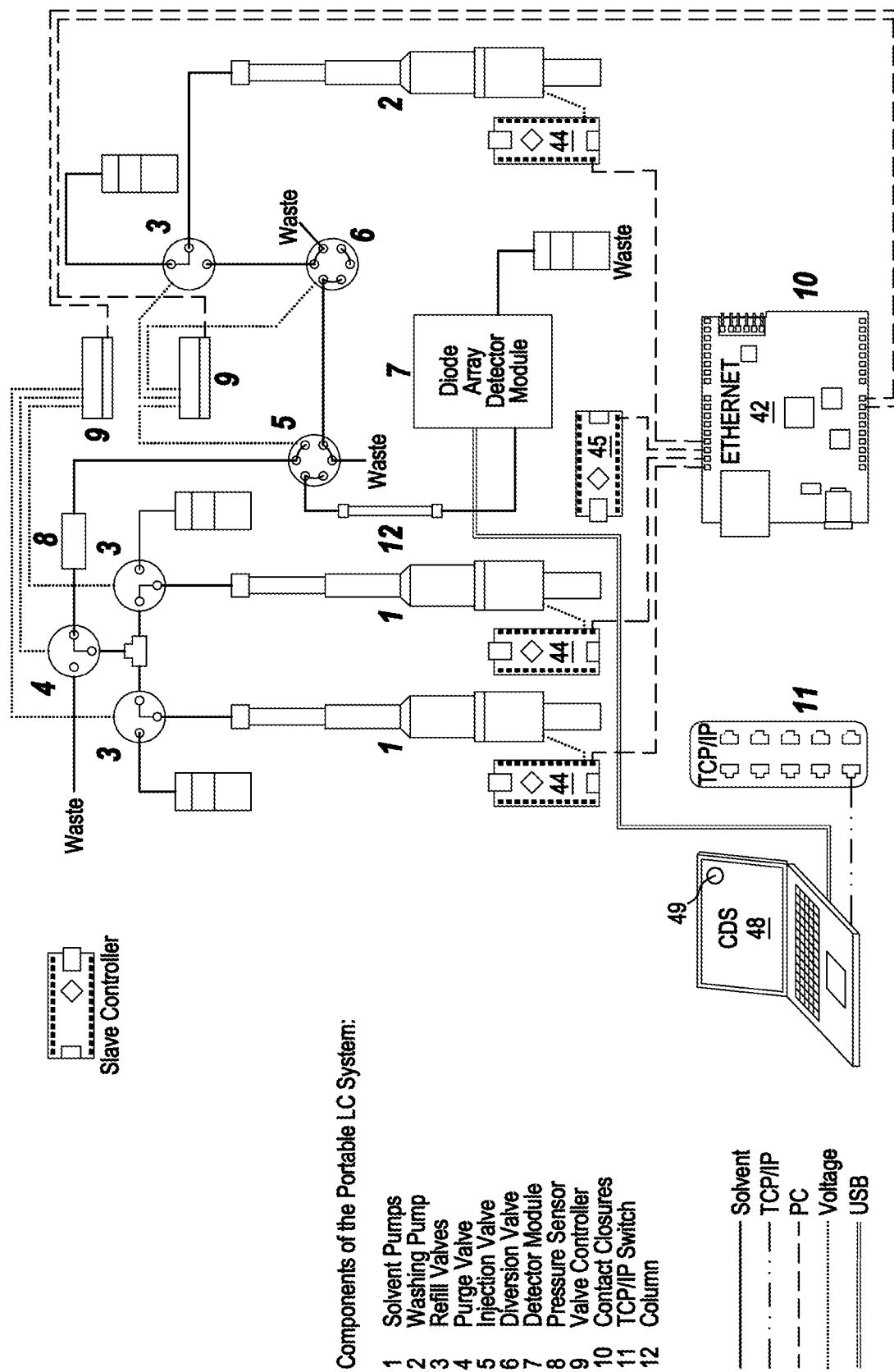
FIG. 2 is a diagram illustrating a liquid chromatography system, similar to FIG. 1, except with additional information of the fluidic, data and electrical connections.

The valves 3A, 3B, 3C, 4, 5, 6 are rotary valves driven by valve controller 9 (see FIG. 2). The controllers 9 send an electronic signal to the motor associated with the rotary valve. On initiation (turning on) the controllers 9 tell the motors to turn the valves to the home position.

The current LC system 20 can run eight valves in total. For example, it is possible to add an additional valve which enables the system to perform additional functions such as an 8-port auto-sampler valve for introducing standards and calibrants. For example see the embodiment of FIG. 29-41.

Fluidic Interconnections

The fluidic connections are made using PEEK™ and PEEKsil™ tubing and PEEK™ fingertight connectors supplied by Trajan Scientific and Medical. Alternatively capillary stainless steel tubing is also available pre-swaged with torque limiting fittings such as those from IDEX and Thermo.

High-performance liquid chromatography can be performed using the LC system 20 by using capillary tubing; tubing that is <1.0 mm internal diameter. With capillary chromatography, the flow rates are typically in the range of 1-50 µL per minute. The preferred range is 5-30 µL per minute. The use of capillary tubing reduces the dead volume to the microlitre range. Capillary chromatography uses capillary tubing, microfluidic valves and a nano flow cell 7. All of the tubing in FIG. 1 is capillary tubing.

Capillary chromatography with capillary tubing enables the customer goal of processing time under five minutes to be achieved.

Flow rate through the column may range from 1-50 µL per minute, preferably 12-30 µL per minute for column dimensions of 0.5 mm ID, whereas 1-5 µL per minute for columns of 0.3 mm ID. These flow rates are appropriate for capillary tubing. Reducing the column ID to 0.3 mm ID requires replacement of the interconnecting capillary tubing to a smaller ID (25-250 µm depending on the specific connection; for example the refill tubing diameter is not critical whereas tubing connecting from the T-junction 32 to the column 12 and flow cell 7 should be 25-100 µm ID).

Sample Delivery

The sample is introduced into the column 12 via the injection valve 5. The column 12, together with the solvent pump module(s) 30A/30B (as user-selected) creates the backpressure in the solvent delivery. Typically this high-pressure is >500 psi. From there, the low-pressure output from the column 12 passes to the flow cell 7 and then to further instrumentation such as a mass spectrometer, or to waste.

The sample may be manually introduced into an adapter 36 from where it passes to the injection valve 5 (see dotted line in FIG. 1). Manual introduction bypasses the sample delivery manager 26 as shown.

Sample Delivery Manager

The sample delivery manager 26 includes the pump module 2, a pressure sensor 38, a 3-port auto sampler valve 3C, the diversion valve 6 and the cleaning solution vessel 40.

Diversion Valve

Like the injection valve, the diversion valve 6 is a 6-port valve. However, the diversion valve 6 has no external loop. The diversion valve 6 is used to automatically collect sample fluid from the inside of the reactor 3 and introduce the sample into the injection valve 5, thereby avoiding manual collection.

Loading Mode of the Sample Delivery Manager

The sample fluid is pushed from the reactor along capillary tube $F_1$ to the diversion valve 6 under low-pressure. Excess sample fluid goes to waste $W_R$. In this manner, the line $F_1$ will be filled with sample fluid:

$F_1 \rightarrow W_R$

Charging Mode of Sample Delivery Manager

On switching the diversion valve, the sample fluid will flow from the line F1, through the diversion valve and via line $F_2$, onto the injection port of the injection valve. This will fill the loop L of the injection valve (the loop L is explained below in connection with the FIG. 4), with the excess going to waste $W_I$ under low-pressure. This arrangement allows filling of the loop of the injection valve under low-pressure.

Cleaning Mode of the Sample Delivery Manager

In cleaning mode, the diversion valve connects the cleaning line G to $F_2$, enabling cleaning all the way through the diversion valve, and the line $F_2$ to the injection valve and through to waste. The pump module 2 draws down cleaning solution from cleaning solution vessel 40 to charge lines S, J and I. Once the autosampler valve 3C switches, the cleaning solution passes through the diversion valve 6 and the injection valve 5 and through to waste $W_I$:

$I \rightarrow J \rightarrow G \rightarrow F_2 \rightarrow W_I$

It is not necessary to clean the loop L since this is flushed with solvent during the operating mode.

Additionally, the sample delivery manager 26 could be bypassed by an alternative sample delivery module (not shown) if desired by the user. Such an alternative sample delivery module may reside outside the predetermined system envelope 22 and may have its own pump to provide the necessary pressure to inject the sample into the injection valve 5.

In this set up, a 3rd party reactor sampler such as Snapdragon or D&M Solutions takes the sample from the reactor, dilutes and filters it and then moves it to the liquid chromatography system 20 (typically by positive pressure from a pump or gas source). The samplers may reside within or outside the base module housing.

Injection Valve Loop

Figure 4A:
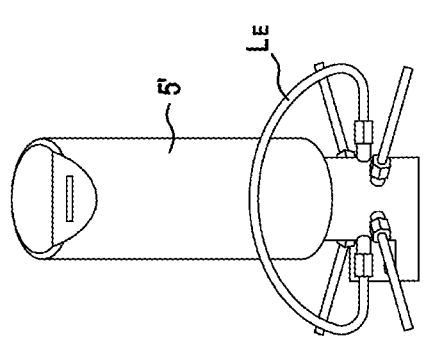
FIG. 4 (A)-(C) are perspective, plan and elevational views respectively of a valve for use in the liquid chromatography system, configured with an injection loop.
Figure 4B:
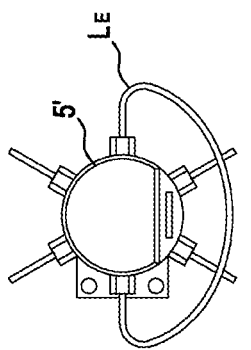
Figure 4C:
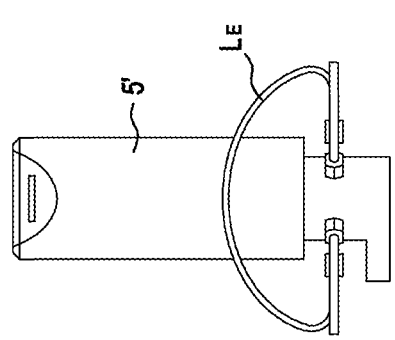

Irrespective of the method of introduction, the typical volume injected is 296 nL. This is achieved by the sample being contained within a known volume L, is made up of a combination of the tubing loop LE as shown in FIG. 4 (100 mm×50 μm ID PEEKsil tube; 196 nL) and the injection valve internal channel volume (100 nL). When the sample is introduced into the known volume, the overflow will go to waste $W_l$.

For example, with manual injection: $F_m \rightarrow L \rightarrow W_l$

With injection from the sample delivery device: $F_1 \rightarrow F_2 \rightarrow L \rightarrow W_l$ Irrespective of whether the sample is introduced directly from the reactor 3 or via the sample delivery manager 26, or some other sample delivery manager, the sample is introduced to the loop L under pressure, since the reactor sample preparation apparatus (not shown) uses pressure (typically −0-1500 psi) to deliver the sample.

Given the volume is known, calculations will enable determination of the quantity of the sample that goes to the column 12. For smaller volumes, an internal loop injection port valve 5 could be used. For larger volumes, an external loop injection port valve 5' is used. For example, see the external loop injection port valve 5' having external loop LE as depicted in FIG. 4. Either can work in the present LC system 20.

Valve companies making microelectronic HPLC injection valves 5 include VICI and IDEX (Rheodyne).

Prior to the delivery of the sample from the loop L, the injection valve 5 is in a first position and the solvent at high pressure (assuming the solvent delivery manager 24 incorporates a high-pressure pump) passes through the injection valve:

$K \rightarrow M$

When the injection valve moves to an operating position, the fluid path of the solvent is through the loop L:

$K \rightarrow L \rightarrow M$

Thus the loop L enables loading of the sample under low-pressure and introduction into the high-pressure system of the column 12. The solvent passing through the loop L also facilitates cleaning of the loop.

In order to clean the line $F_m$ and the injection valve after manual delivery, a cleaning fluid (rinsate) is passed:

$F_m \rightarrow W_l$

Cleaning of the diversion valve 6 is explained above.

Modularity

Figure 5A:
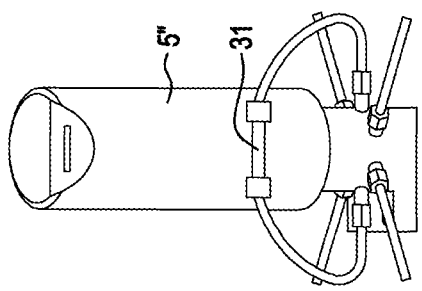
FIG. 5 (A)-(C) are perspective, plan and elevational views respectively of a valve for use in the liquid chromatography system, configured with a trap column.
Figure 5B:
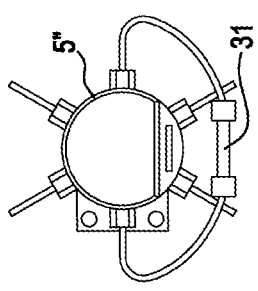
Figure 5C:
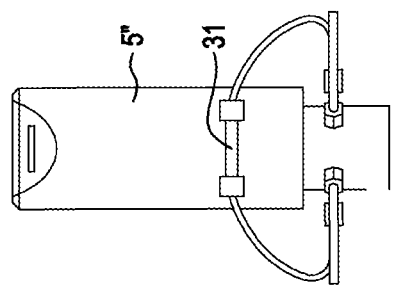

More valves can be added to the system to thereby create more complex flow paths to increase flexibility of the system. More flow paths may be needed given that the loop is limited to 296 nL. For instance, a trap column may be added to the injection valve 5" in order to concentrate the analyte as shown in FIG. 5. With such an arrangement, the external loop LE is removed from the injection valve 5' as shown in FIG. 4 and replaced by a trap column 31.

A trap column 31 may also be used to verify that the reactor is clean. In conventional processes, once the reaction is finished or the process has finished monitoring the API then it is standard operating procedure to verify that the reactor is clean of the API (or any impurity such as excipients). Typically, the reactor is washed with methanol and tested by swapping the reactor according to an established protocol. If the API and/or excipients are <0.5 ppm then the reactor is considered clean. When the swabs are sent to the lab, it takes from an hour up to a day and in this time the reactor is off-line, reducing the efficiency of the laboratory.

It should be borne in mind that the loop L for the column is limited to 296 nL. The analyte (being the APA and/or impurity) in the wash fluid (rinsate) is so dilute so as to create difficulties for detection. However, adding a trap column such as 31, to the injection valve 5" and passing the rinsate through the trap column, concentrates the analyte so that the analyte will be in concentrations sufficient for the column to detect the analyte. The analyte binds to the trap column 31 and concentrates on the head of the trap column 31. The trap column 31 is then eluted with appropriate solvent. The trap column 31 may be loaded in one direction and eluted in the same direction, or loaded in one direction and eluted in the opposite direction. This side procedure is all done at low-pressure.

The eluent from the trap column 31 is delivered to the LC column 12. Depending on the results of detection, the system can determine whether the criteria has been met to satisfy that the reactor is clean.

Figure 14:
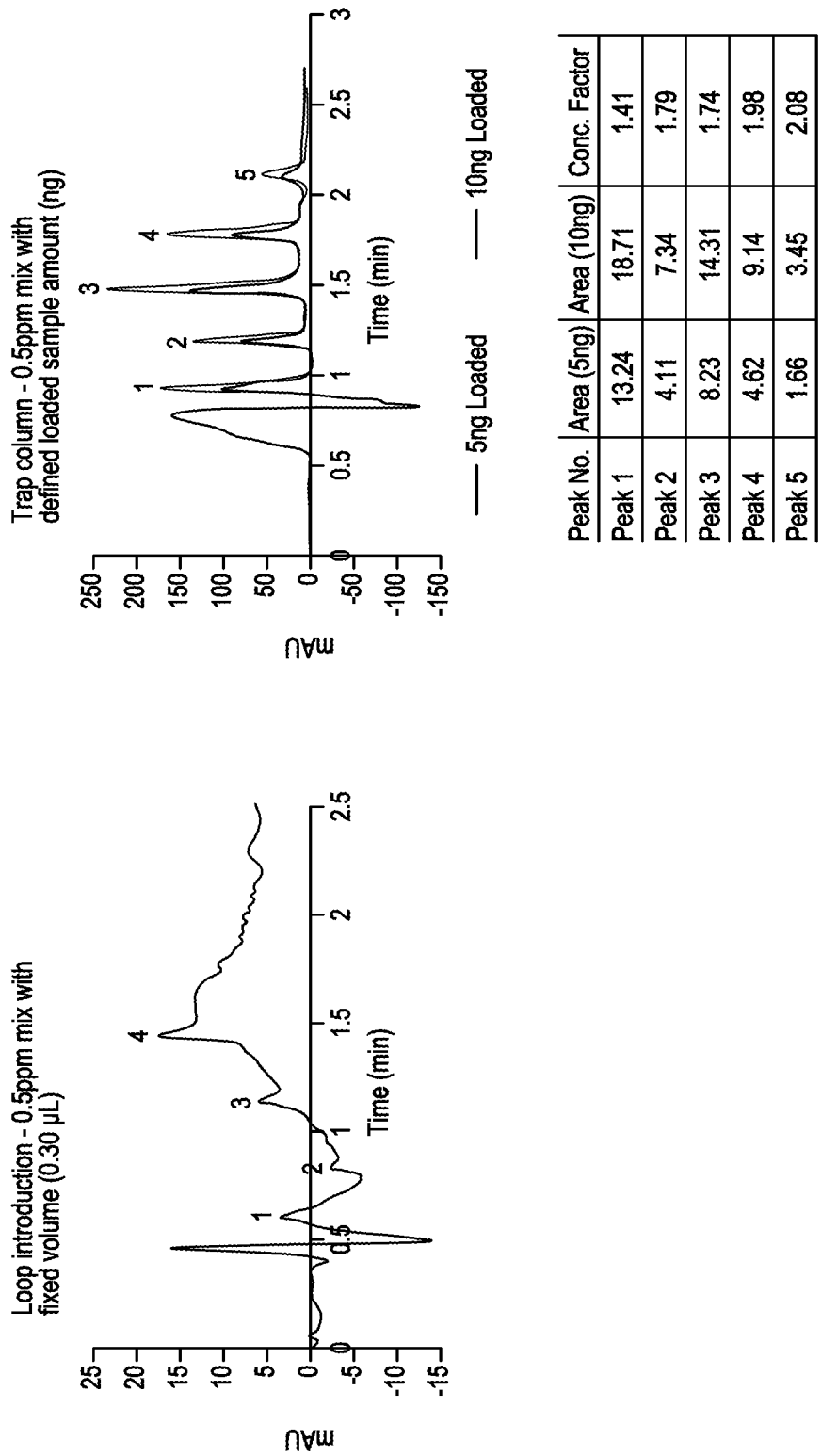
FIG. 14 illustrates the increased detection capability comparing the detection outputs in different set-ups of injection valves.

FIG. 14 illustrates the increased detection capability comparing the detection output on the left using the loop L to the detection output on the right using the trap column 31.

Control System and Electronic Connections

FIG. 2 illustrates the electrical and data connections in addition to the fluidic connections illustrated in FIG. 1. Electronically, the system uses $I_2C$ comms architecture through an Arduino Master and Arduino nano slave concept. The Arduino master is provided on the PCB 42 (within the base unit) and a slave 44 is provided on each of the respective pump module(s) including first low-pressure pump module 30A, second low-pressure pump module 30A and the third pump module 2 for the solvent delivery manager 26 (as per the user-selected low pressure binary configuration). In addition, the optical detector module 50 is also provided with a slave 45. The LED detector module 52 is also provided with a slave 45. (The LED detector module 52 may be used instead of the optical detector module 50.)

A TCP/IP switch 11 is provided to enable easy integration within the laboratory IT architecture. It also supports additional $3^{rd}$ party modules such as a miniature mass spectrometer (Microsaic 4500 MiD, not shown) or a single board computer such as Latte Panda (not shown). Note that any such mass spectrometer may not fit within the base module housing 28 or the predetermined envelope.

The LC system is operated by a Windows 10 operating system 48 which can be a free standing laptop or embedded single board computer (such as Latte Panda). The operator can easily switch between a laptop control and embedded control simply through the TCP/IP switch. This again highlights the flexible structure of the system.

The control system includes a control PCB 42 and a power supply (not shown). All software required to operate the system, including the various different configurations is preloaded on the laptop computer 48 or embedded single board computer.

The user interface may operate via the laptop 48. Specifically, programming is such that the laptop 48 displays a graphical user interface icon (GUI) 49 on which the user clicks or otherwise interfaces in order to open the program. The user interface will be explained further below in connection with FIGS. 12 and 13. At a high level, the user interface enables the user to update the config file to indicate which modules are in use in the system 20. More specifically, where the system 20 is preprogrammed with the available modules, the user may be able to enable or disable certain modules, depending upon the user-defined configuration. For example, if the user elects to use the sample delivery manager 26 then the config file can be updated through the user interface operating via the laptop 48 to enable the sample delivery manager 26.

Alternatively, an on-board user interface may be provided through an embedded single board computer and display.

Figure 9B:
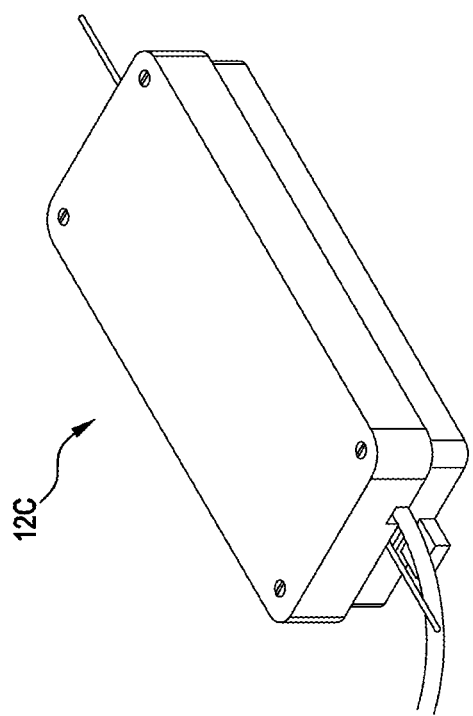
FIG. 9B is a perspective view of the column oven shown in FIG. 9A.
Figure 9A:
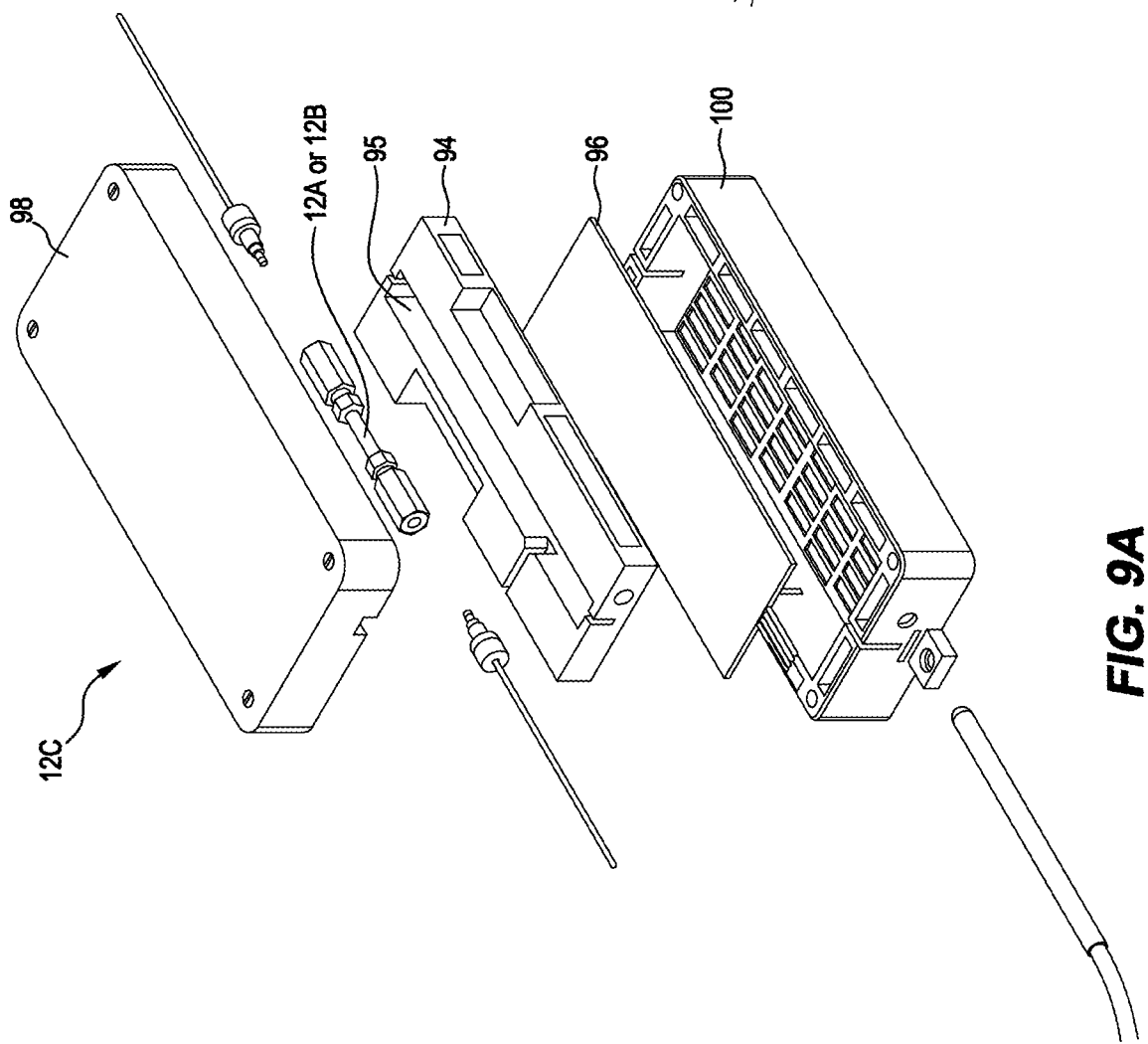
FIG. 9A is an exploded view of a column oven, including a liquid chromatography column.
Figure 10:
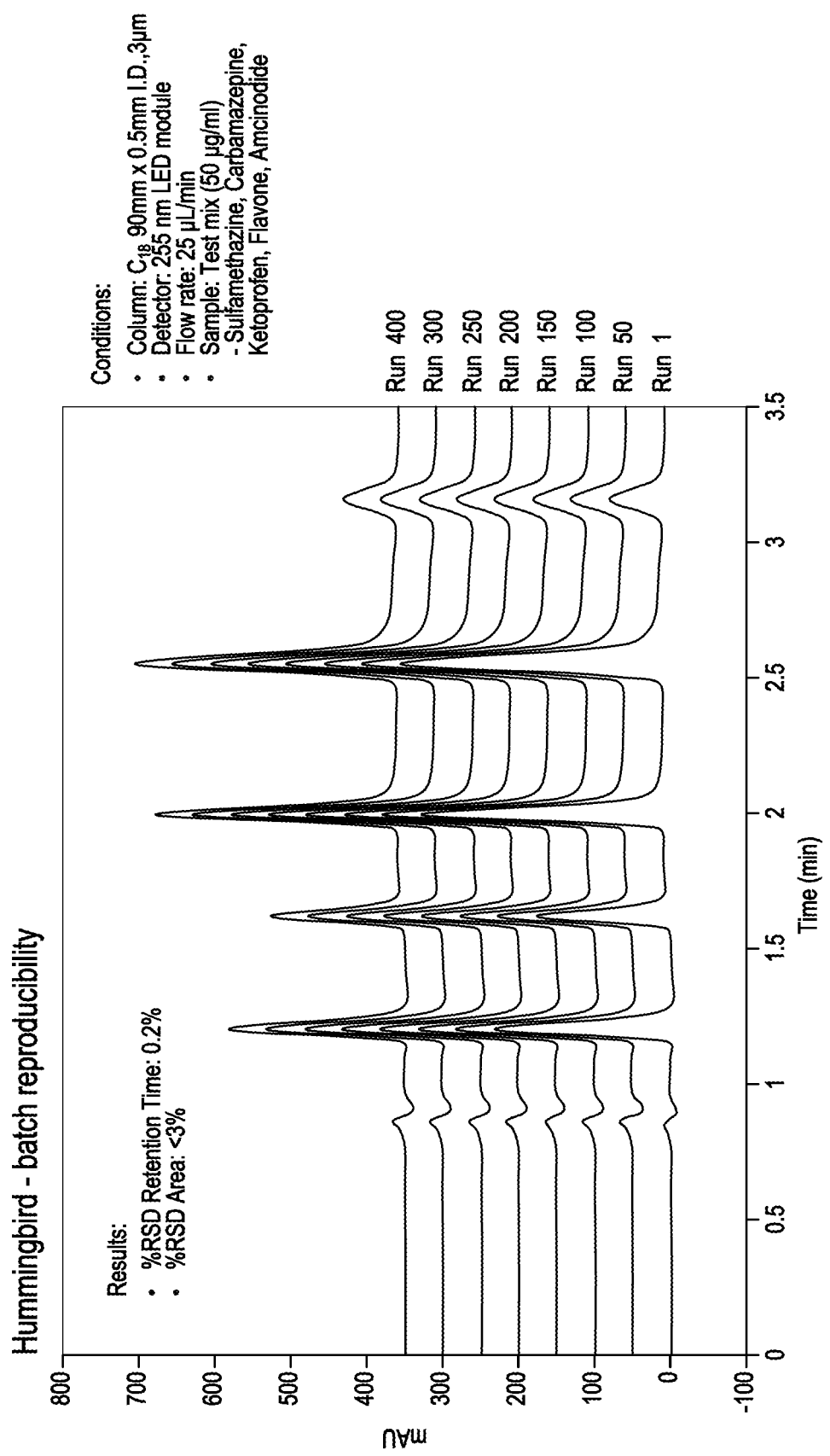
FIG. 10 is a chromatogram illustrating reproducibility of the results using a 255 nm LED photodiode detector.
Figure 11:
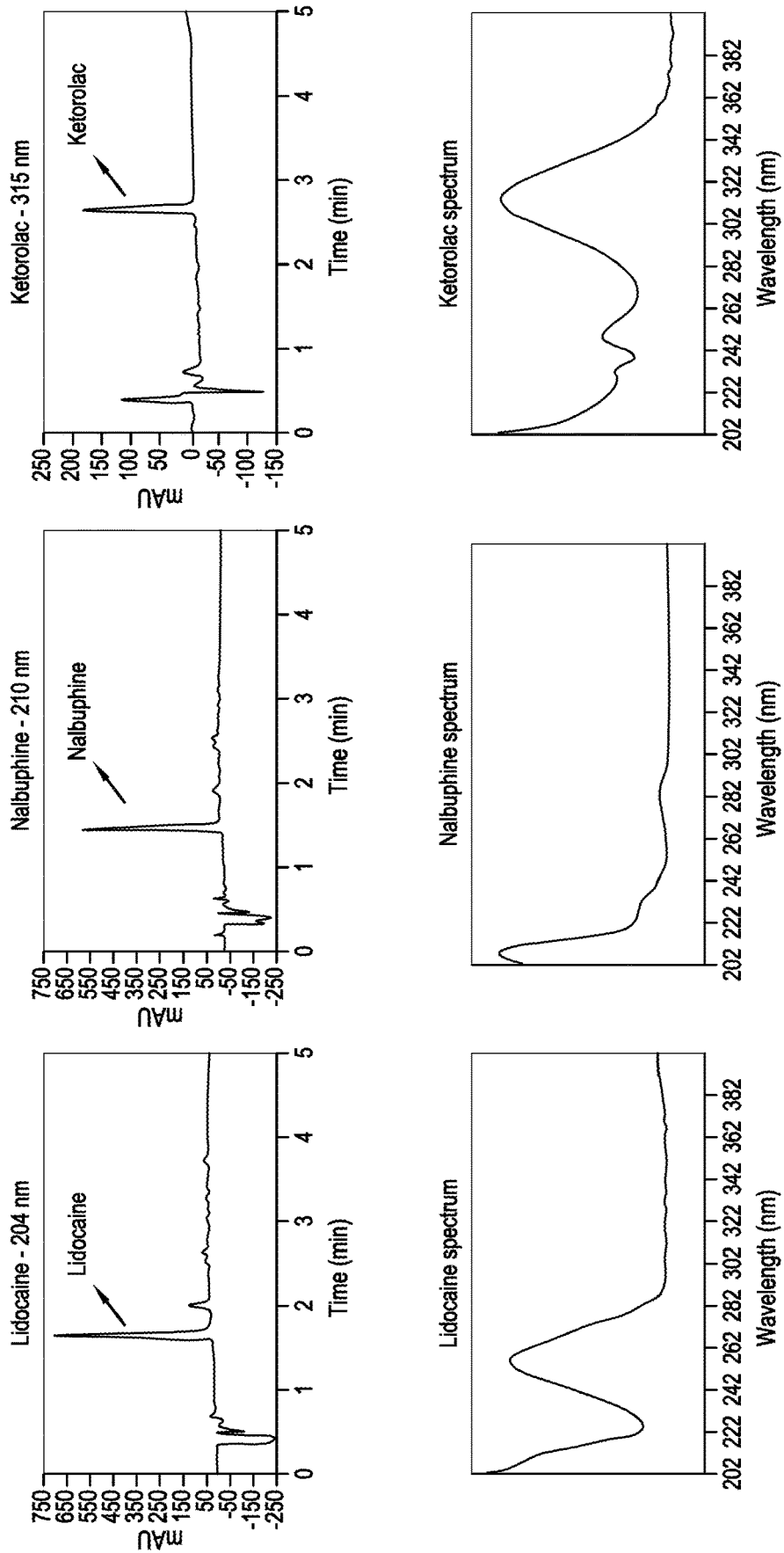
FIG. 11 shows other results using the optical detector module for three different analytes. The top spectrum is the chromatogram at the specific wavelength where it has its maximum absorbance. The lower spectrum is the full spectrum across the wavelengths 200-400 nm.

Column Oven and Column as shown in FIG. 9A, the column oven 12C has a resistive heater 96 on the bottom of a solid aluminum block 94. Specifically, the column oven 12C includes an aluminum bed 94 for the column 12A or 12B. The aluminum bed 94 provides a thermal mass to avoid fluctuations in column temperature. The aluminum bed 94 is provided with a recess 95 which is shaped to receive the column 12A or 12B. A flexible heater panel 96 is provided within the column oven 12C, underneath the aluminum bed 94. The column 12A or 12B, the aluminum bed 94 and the flexible heater panel 96 are housed within a casing. The casing includes a top cover 98 and a base 100. The casing may be 3D printed from a polymer such as nylon-12.

The resistive heater is micro controlled by MINCO embedded microcontroller (not shown) on the PCB. The microcontroller includes a driver to heat the resistor. The column oven 12C is included to maintain a desired temperature for the column 12, to obtain reproducible results.

A column 12 is typically made of any material in which particles are able to be tightly packed and which will withstand the pressure within the column. For instance, the column 12 may comprise a stainless steel tube packed with particles. It has in and out connections which are a standard thread to connect to the capillary tubing. Any column can be used in the column oven within certain dimensions. For instance, a 50 mm long column or a 100 mm long column may be used. Either can fit into the column oven. Each of these have a 0.5 mm ID.

Detection

Currently, there are two alternative detector options which are insertable into the slot 54 in the base module housing 28. The detector options include an optical detector module 50, and an LED detector module 52. The target absorbance range for most applications is 190-300 nm.

Alternatively, a 3rd detector option is possible, such as the miniature electrospray ionization single quadrupole mass spectrometer from Microsaic (4500 MiD, not shown) can be used by connecting the column outlet N into the Microsaic Split Flow Interface (SFI). Alternatively, the detector outlet tubing Q can be connected to the Microsaic SFI. The Microsaic 4500 MiD is controlled from the LC system 20 via the TCP/IP switch 11.

The most cost-effective solution for a flow cell detector is to use an LED and a photodiode. See for example, the optical detector module in the form of LED module 52 depicted in FIGS. 3, 8 and 28. However, LEDs with the appropriate power aren't available below 235 nm. In other words, there is not enough light emitted by the LED to pass through the flow cell 7, to cast enough light onto the detector. Thus, if a client wished to monitor in the vicinity of 200, 210 and/or 220 nm as the critical range, then difficulties would arise using the LED module 52. For this reason, a new optical detector module 50 (otherwise known as diode array detector (DAD) module 50) has been developed.

Components of Optical Detector Module 50 (Diode Array Detector DAD)

As shown in FIGS. 6A-6F, the fixed physical alignment of the optical components is achieved by standard optical bench. For example, optical bench components 64, 66 such as those produced by Newport Optics (64) and (66) receive alignment rods 68 which are supported by the optical alignment fittings 70. The optical alignment fittings 70 screw into the standard support table 67. The optical bench components 64 and 66 support the flow cell 7 therebetween. These optical bench component 64, 66 each include a precision-machined lens mount 67, 69, the ends of which protrude from the side of the components 64, 66.

Figure 6A:
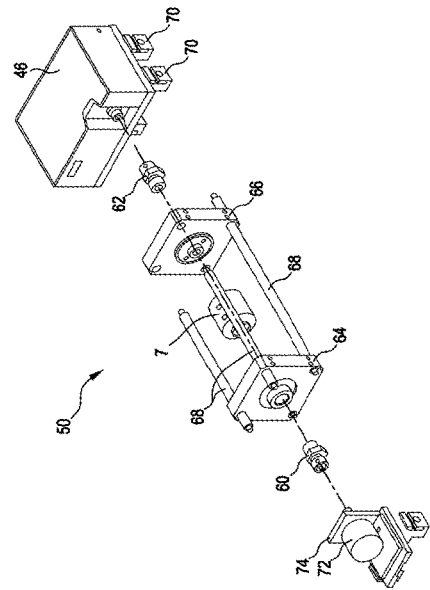
FIGS. 6 (A)-(C) are perspective, plan and elevational views respectively of an optical detector module in accordance with a preferred form of the invention, the diode array detector module including two lenses.
FIG. 6E is a perspective view of the optical detector module shown in FIGS. 6 (A)-(C), with parts removed for the purposes of clarity.
Figure 6B:
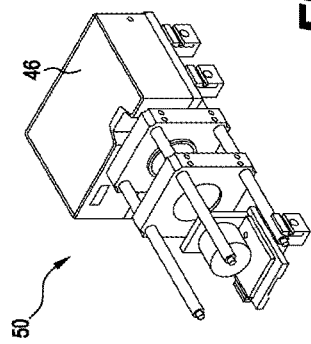
Figure 6C:
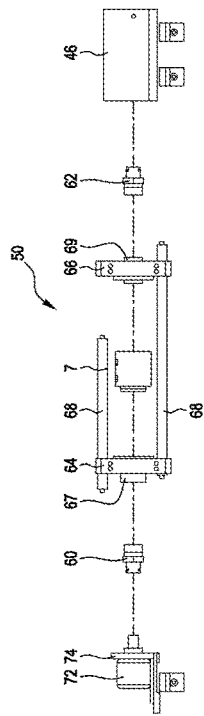
Figure 6D:
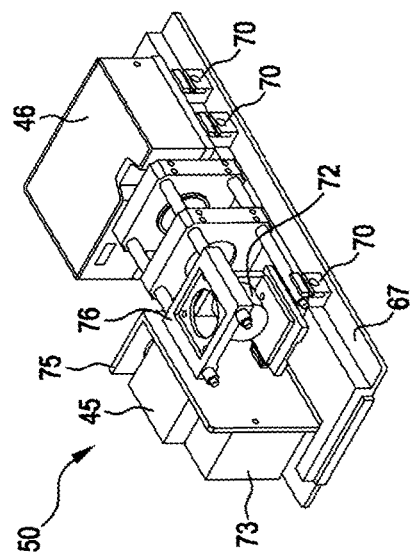
Figure 6E:
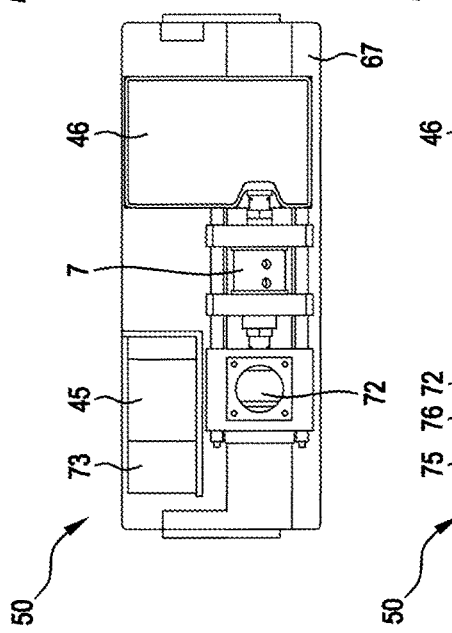
Figure 6F:
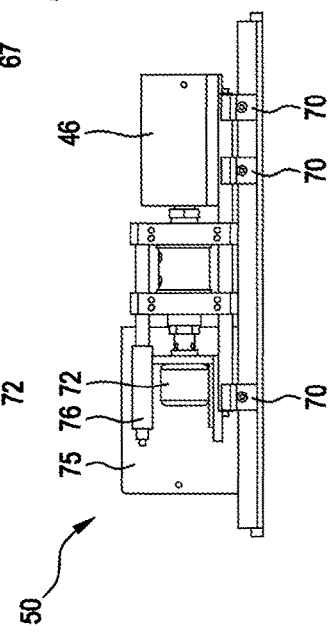

We also use a miniature deuterium lamp 72 from Hamamatsu which comes with its own power supply 73. The lamp 72 is supported by an L-shaped support bracket 74, also mounted to the table 67 by the optical alignment fittings 70, as shown in FIGS. 6D and 6F. This bracket 74 also supports the lamp cover 76 and is part of the lamp housing (74 and cover 76 is the lamp housing). The power supply 73 for the lamp is mounted to the table 67 via an L-shaped mounting bracket 75 integrally 3D printed with table 67. The slave 45, forming part of the control system referenced in FIG. 2, is mounted on top of the power supply 73.

The first collimating lens 60 is supported between the L-shaped support bracket 74 and the optical bench component 64. The second collimating lens 62 is supported between the optical bench component 66 and the miniature spectrometer 46.

The key to robustness that we have discovered is the assembling of the light source 72 and spectrometer 46 around the flow cell 7.

The flow cell 7 is an Agilent product and is 500 nL in volume and has quartz windows. The flow cell 7 is critical to enable the sample to enter the fluid path without a loss of sensitivity. There are different volume flow cells on the market including 12 nL, nL, 80 nL and 500 nL. We use the 500 nL for maximum sensitivity. However, it is possible to swap out the 500 nL flow cell for another flow cell since they are all the same size and accordingly will be accommodated between the optical bench components 64 and 66.

The first collimating lens 60 helps focus the light from the deuterium lamp 72 onto the flow cell 7 and the second collimating lens 62 helps focus the light from the flow cell 7 onto the miniature spectrometer 46. This optical detector module 50 can function as a module in its own right on any $3^{rd}$ party HPLC as the fluid connections to the flow cell are standard and Ocean Insight have available software to interpret the spectra from the spectrometer 46 via USB output.

Figure 7A:
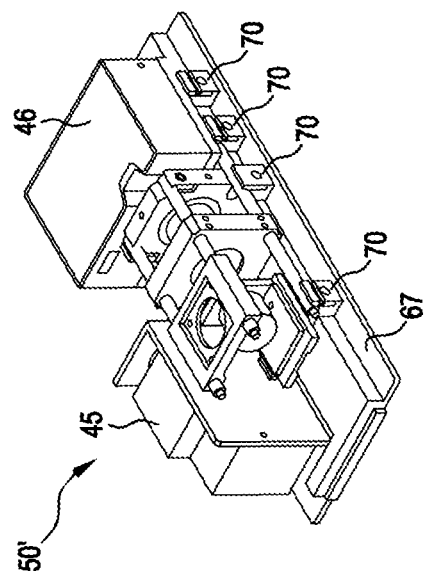
FIGS. 7 (A)-(C) are perspective, plan and elevational views respectively of an optical detector module in accordance with an alternative preferred form of the invention, the optical detector module including a lens and a rigid optical fibre coupler.
Figure 7B:
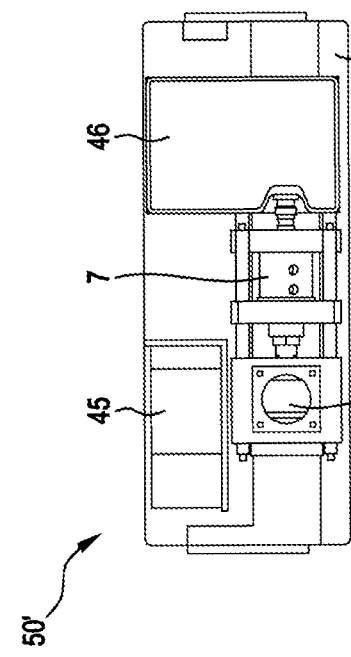
Figure 7C:
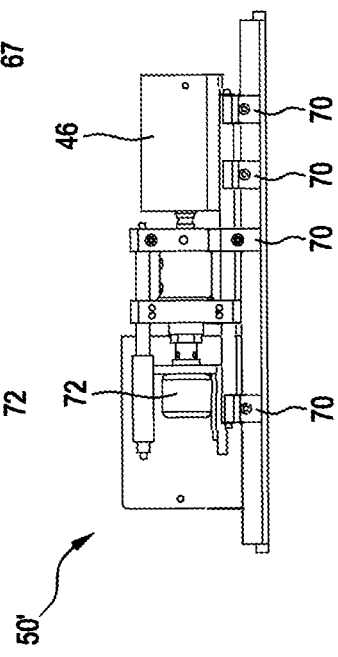

Alternatively, in place of the second collimating lens of FIG. 6, as shown in the optical detector module 50' of FIG. 7, an optical fibre coupler 78 may be provided to support the light from the flow cell 7 onto the miniature spectrometer 46. Accordingly, we are not dependent on a double lens configuration for performance. This arrangement provides excellent integration times of <30 ms. The optical fibre coupler 78 may be a rigid optical fibre coupler. Alternatively, a flexible optical fibre coupler may be provided, such as a longer flexible coupler or cable. This allows for a different configuration of the spectrometer 46, for example where the optical fibre coupler/cable needs to bend, e.g. 90°. The disadvantage with a fibre coupler is that it degrades over time due to exposure to UV (solarization). Accordingly, a double lens arrangement as disclosed in FIG. 6 is considered to be superior in allowing more light and is more robust. However, the FIG. 7 arrangement may provide additional flexibility to fit module orientation.

The rigid connector 78, otherwise known as optical fibre coupler or rigid coupler is 32 mm long which has a 1000 μm optical fibre core and is an alternative to a second collimating lens.

This module 50' of FIG. 7 can also function as a module in its own right on any $3^{rd}$ party HPLC as the fluid connections to the flow cell 7 are standard and Ocean Insight have available software to interpret the spectra from the spectrometer 46 via USB output.

FIGS. 16-27 show further versions of the optical detector module 50 and are discussed below.

The advantages of the configuration of the optical detector module 50, 50' include its flexibility and its transportability/robustness.

1. Flexibility

You can swap out the detector 46. This specific optical configuration works with a range of instruments, particularly Ocean Insight's products, such as a miniature spectrometer 46 as depicted in FIGS. 6 and 7. (Conveniently, Ocean Insight's products are all the same size for insertion into the optical detector module 50. 50' as shown in FIGS. 6 and 7).

You can also swap out the lamp 72, and/or the photodiode.

You can also swap out the flow cell 7.

2. Transportability/Robustness

It is a particularly rugged arrangement with the lamp 72, aligned collimating lenses 60, 62, the flow cell 7 and the photodiode of the spectrometer 46 in fixed physical alignment. Likewise, in the alternative embodiment of FIG. 7, the similar aligned arrangement is also particularly robust.

Miniature Spectrometer 46

A miniature spectrometer 46 was developed by incorporating a custom grating. This produced peak maxima at 240 nm and works within 200-360 nm and gives excellent performance from 200-280 nm. Accordingly, this works within the 200-220 nm target application. Notwithstanding the spectrometer 46 with the custom grating for the low UV wavelengths, the standard FLAME UV-VIS spectrometers (200-850 nm) from Ocean Insight are interchangeable within the optical detector module 50. Those skilled in the art will understand that any miniature spectrometer such as those from the Hamamatsu Mini-spectrometer range and Broadcom Qmini can be incorporated into the detector module 50, as discussed further below in connection with FIGS. 21-26.

Optical Detector Module 52 (LED Detector Module 52)

For other applications above 235 nm, an LED/photodiode detector module 52 may suffice. For some applications this module 52 may provide satisfactory light intensity at the desired wavelength. The LED detector module 52 is much less expensive.

Figure 8A:
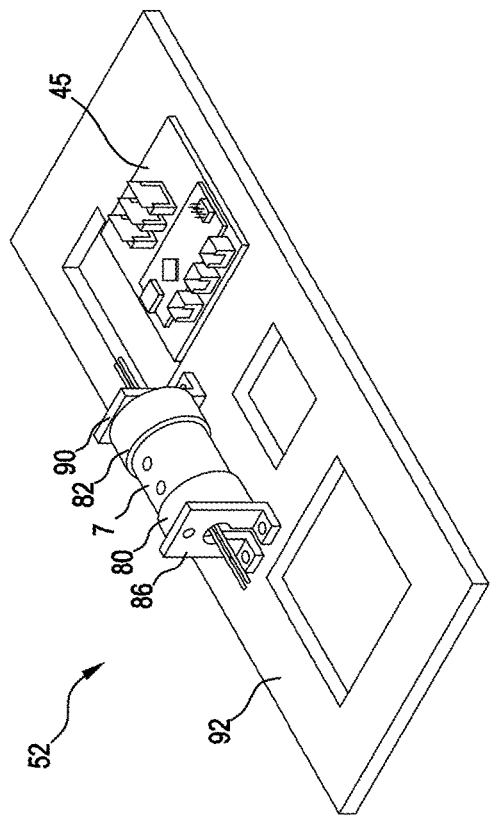
FIG. 8A is a perspective view of an optical detector module in the form of an LED detector module.
Figure 8B:
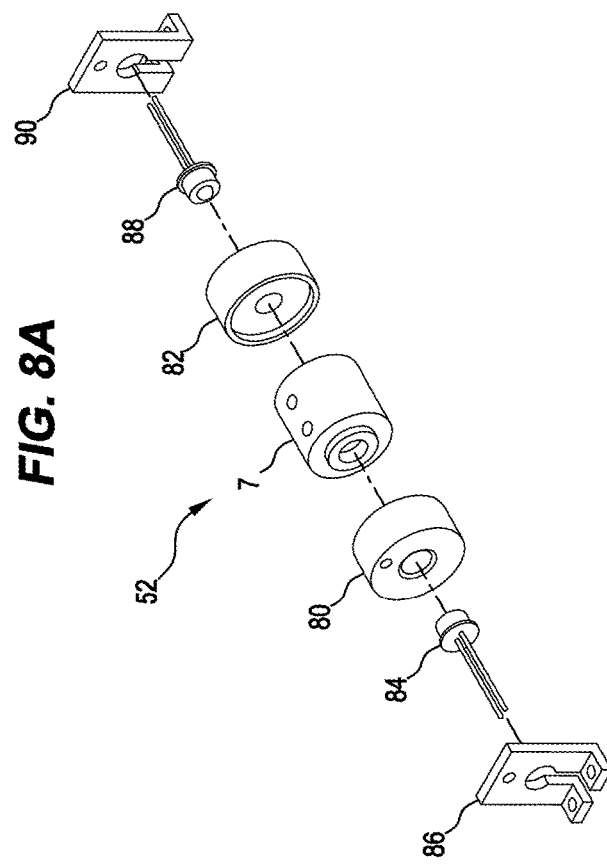
FIG. 8B is an exploded view of the LED detector module shown in FIG. 8A.

As best shown in FIG. 8B, the LED detector module 52 is made up of the flow cell 7, supported at each end by aluminium cupped collars 80, 82. On the up beam end, an LED 84 is sandwiched between a mounting bracket 86 and the up beam collar Down beam from the flow cell 7, a photodiode 88 is sandwiched between the down beam collar 82 and a mounting bracket 90. As shown in FIG. 8A, the whole assembly is sandwiched between the two mounting brackets 86, 90 which are affixed to a mounting plate 92. The mounting plate 92 may be 3D printed e.g. from nylon 12 or laser cut from acrylic. The LED detector module 52 also includes the slave 45. The slave 45 includes PCB and supplies power to the LED and the diode.

The liquid chromatography system may be designed using off-the-shelf parts including syringe pumps 1, 2, microfluidic valves 3A, 3B, 3C, 4, 5, 6, a flow cell 7 and LED detector module 52, all controlled by an Arduino master controller. We packed all of this into a briefcase.

With Trajan's reconfigurable system 20, whereby components are substitutable (swap in/out) or optionally included, the overall footprint can be managed. With this design ethos, a customized system 20 can be procured to obtain a specific analytical result and having performed the customization, the system 20 is no more sophisticated than required to achieve that result. Accordingly, without unnecessary features, the physical size of the system unit is reduced and this becomes more affordable and portable than a more complex system. With affordability and portability and size reduction comes the option of placing the system units as required where the action needs to be taken, for example, in close proximity to a reactor or inside a laboratory fume hood. By way of another example, in soil testing, the system unit may be placed out in the field.

Other

The liquid output of the flow cell 7 may pass to a mass spectrometer (not shown) for further analysis. Note that the mass spectrometer may not fit within the base module housing 28 or the predetermined envelope.

User Interface for LC System

Figure 12:
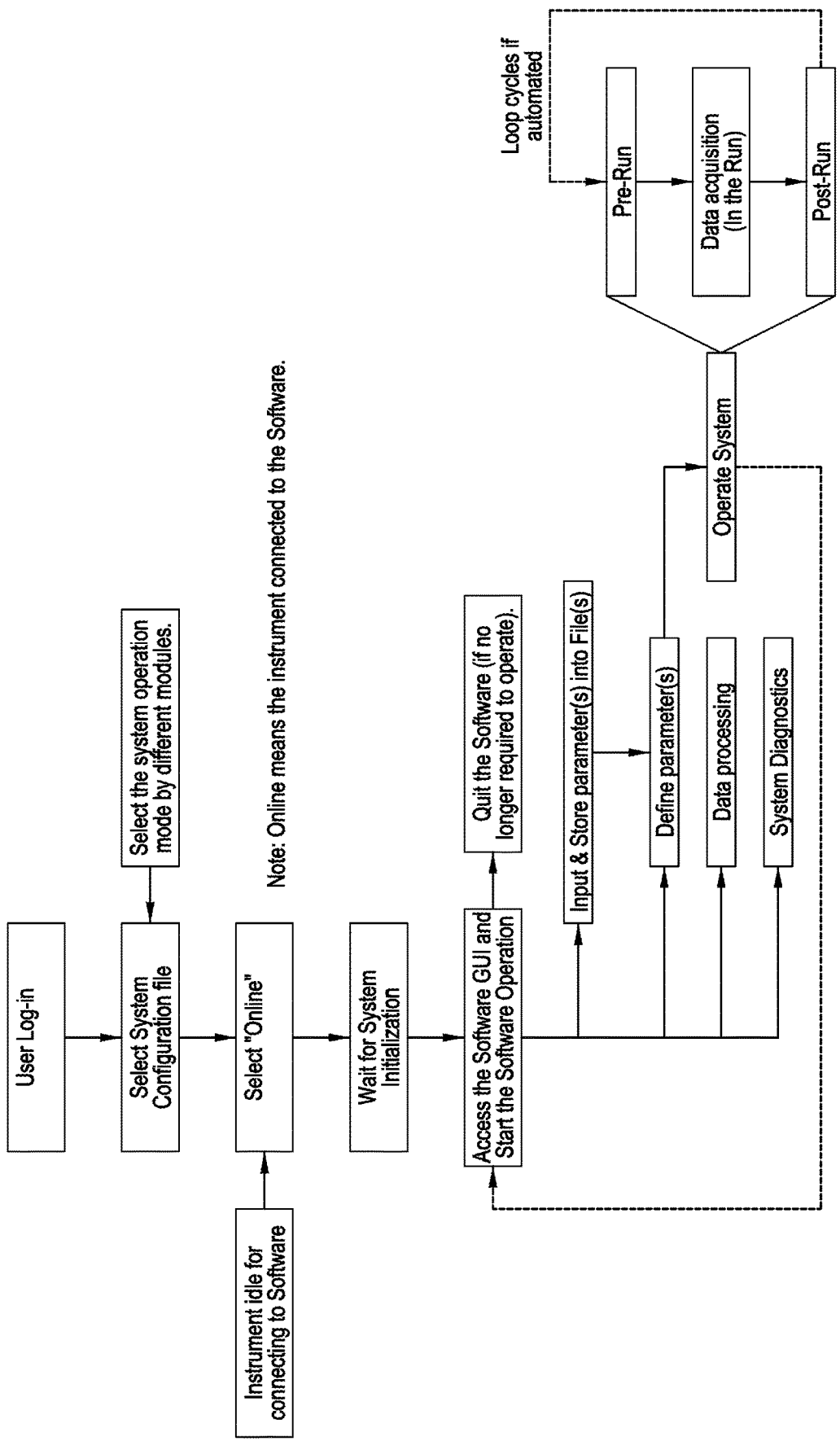
FIG. 12 is a flowchart of the online operation for the system software.

FIG. 12 is a flowchart illustrating the operation of the user interface for the LC system 20. As mentioned above, the user initialises the program by interfacing with the GUI 49 on the laptop screen 48 (FIG. 2). The user interface is Microsoft Window based. The program then prompts the user to log in. After entering the appropriate user ID and password, the program then enables the user to modify the configuration file. For example, the user can select which of the various system modules the user has elected to use and accordingly configured the system 20. This may be a menu-based selection. The program is suitably preconfigured to run any of the predetermined modules. The user simply needs to indicate which of those module(s) the user has selected.

Figure 13:
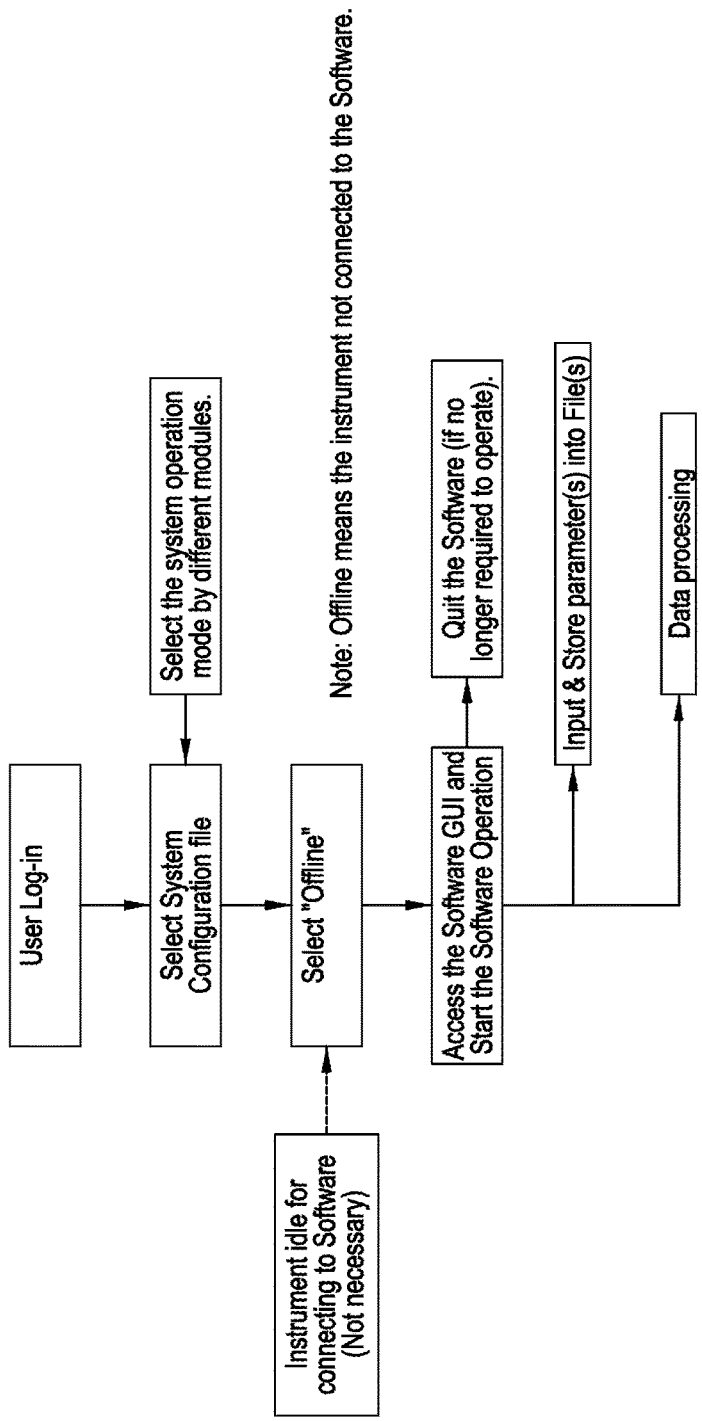
FIG. 13 is a flowchart of the off-line operation of the system software.

The program then prompts the user to indicate whether the user proposes to work online or off-line. "Online" means that the instrument is connected to the software. When the instrument is being run, it is necessary to work online for data capture and other control aspects. However, it is possible to work off-line. During off-line work, the program can perform data analysis of previous data which has been captured. (The off-line flowchart is illustrated in FIG. 13 and includes a subset of the available steps illustrated in FIG. 12.)

In the "Wait for System Initialisation" step, the software is trying to establish connection with the instrument. Once the software is initialised, the user can access four functions of the software and operate the system 20.

The software permits the user to input and store parameters of the LC process, such as indicating a flow rate of a solvent, indicating relative proportion of solvent A in relation to solvent B. Any such processing method can be run, and also stored for the purpose of rerunning the same processing method at a later time.

When the user determines that they wish to operate the system, by appropriately indicating through the user interface, the instrument enters a "pre-run" phase prior to the instrument running. Data acquisition is obtained during the run and compiled into a file. At the end of the run, the "Post-Run" step enables the instrument to return to its pre-run configuration. If the running of the instrument is automated, for example using an autosampler, the run cycle on the right may be repeated.

The data file acquired may be processed by the software in the "Data processing" option. As per FIG. 12, "System Diagnostics" is also an option.

It is noted that the system operation may be set to automatic mode by which it returns to the earlier part of the cycle (see dotted line on the right). Alternatively, the user can opt to manually quit.

Hardware Overview

According to one embodiment, the techniques described herein may be implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 15A:
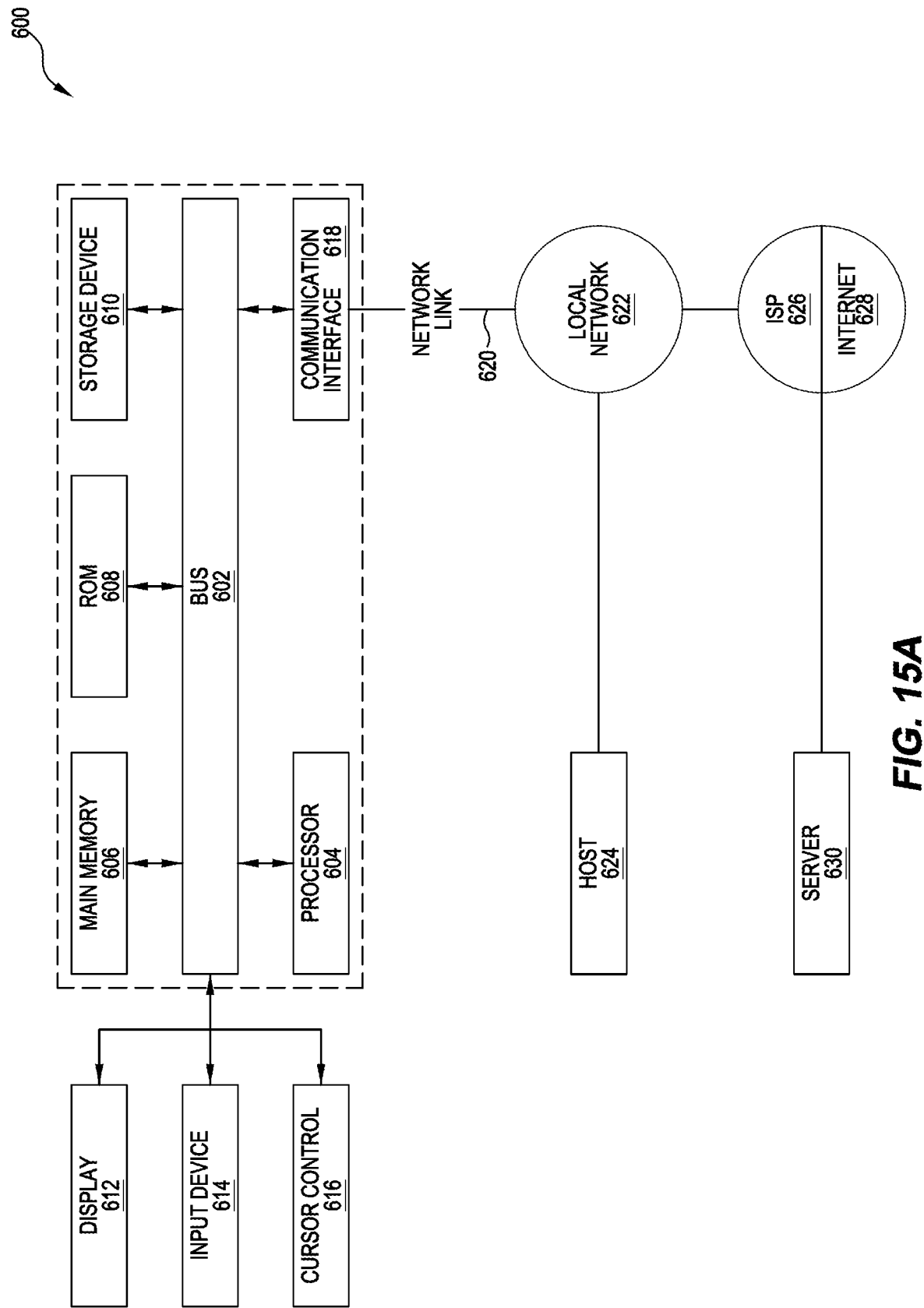
FIG. 15A is a diagram of a computer system upon which one or more of the various steps may be performed.

For example, FIG. 15A is a block diagram that illustrates a computer system 600 upon which one or more steps described above may be implemented. Server computer 102 and/or user computer 112 may be computer systems such as 600.

Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to one more output devices such as a display 612 for displaying information to a computer user. Display 612 may, for example, be a cathode ray tube (CRT), a liquid crystal display (LCD), a light emitting diode (LED display), or a touch screen display. An input device 614, including alphanumeric and other keys, may be coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. Additional and/or alternative input devices are possible, for example touch screen displays.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

A computer system as described herein may be configured in a plurality of useful arrangements. In one approach, a data processing method comprises using a server computer, obtaining from one or more non-transitory computer-readable data storage media a copy of one or more sequences of instructions that are stored on the media and which when executed using a particular user computer among a plurality of user computers cause the particular user computer to perform, using the particular user computer alone or in combination with the server computer, the techniques that are described herein; and using the server computer, downloading the copy of the one or more sequences of instructions to any user computer among the plurality of user computers.

In another approach, a computer system comprises a server computer comprising one or more non-transitory computer-readable data storage media stored with one or more sequences of instructions which when executed using a particular user computer among a plurality of user computers cause the particular user computer to perform: using the particular user computer, alone or in combination with the server computer, the techniques that are described herein; and in the server computer, stored downloading instructions which, when executed using the server computer, cause downloading a plurality of copies of the one or more sequences of instructions to the plurality of user computers.

Control Block Diagram

Figure 15B:
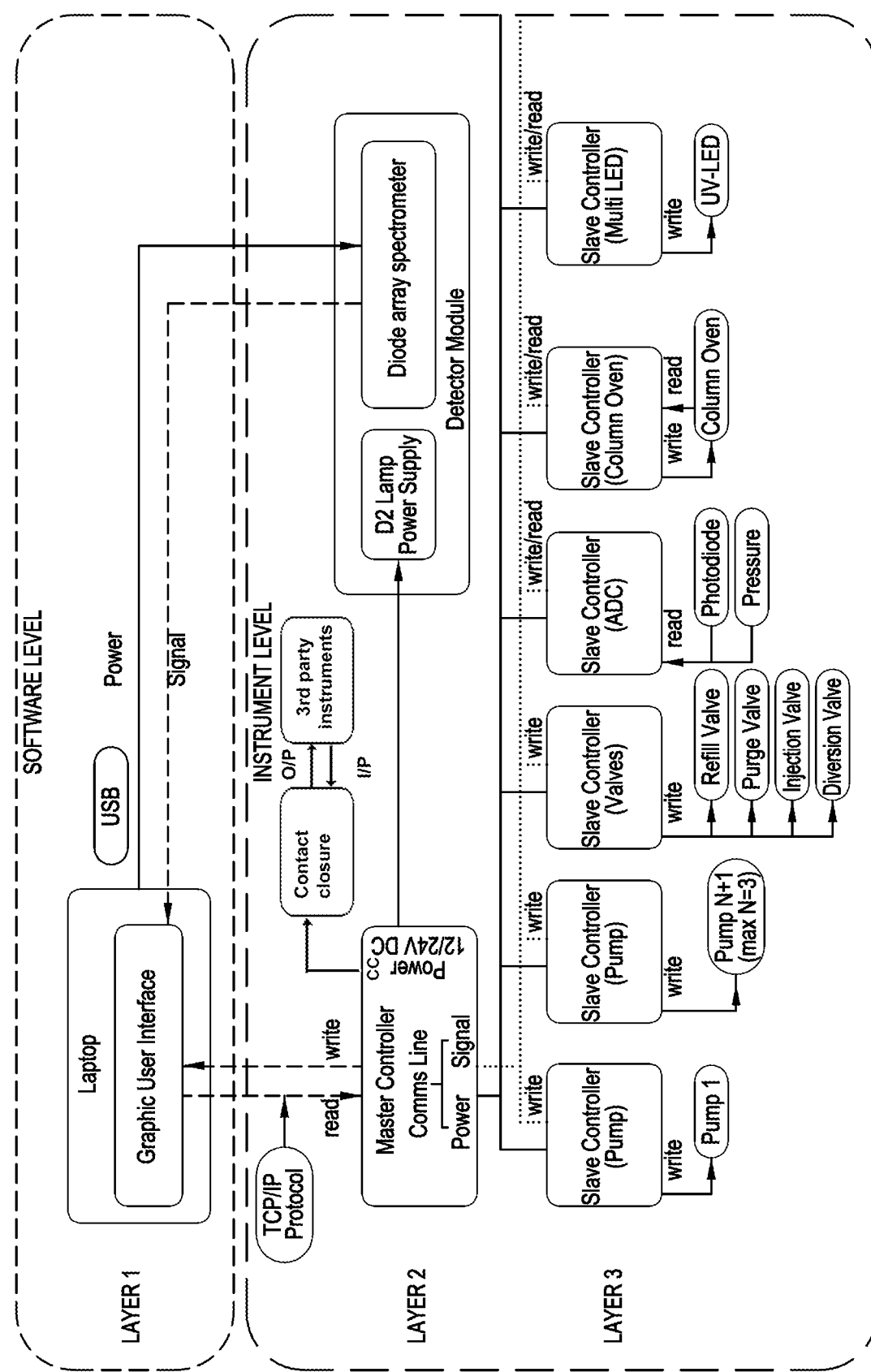
FIG. 15B is a control block diagram for the liquid chromatography system shown in FIG. 1.
Figure 16B:
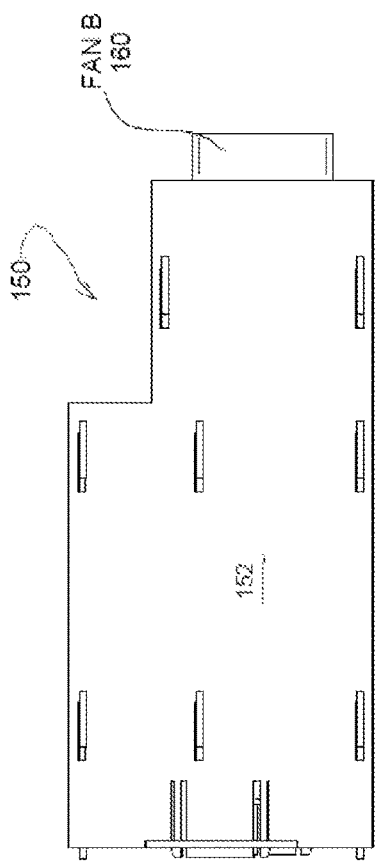
FIGS. 16A-D are various views of an optional housing for an optical detector module.
Figure 16C:
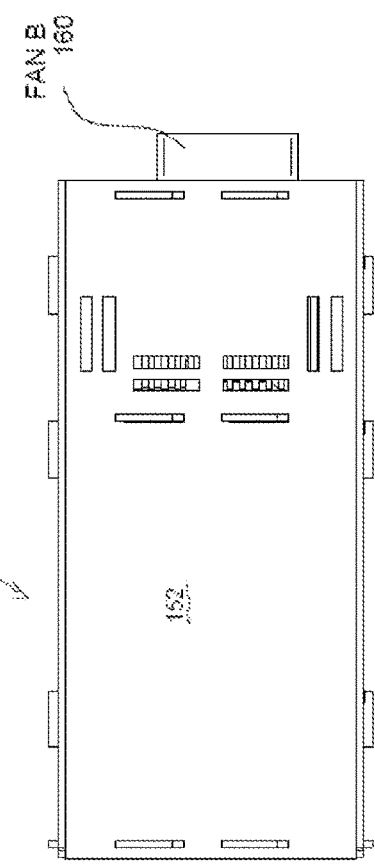
Figure 16A:
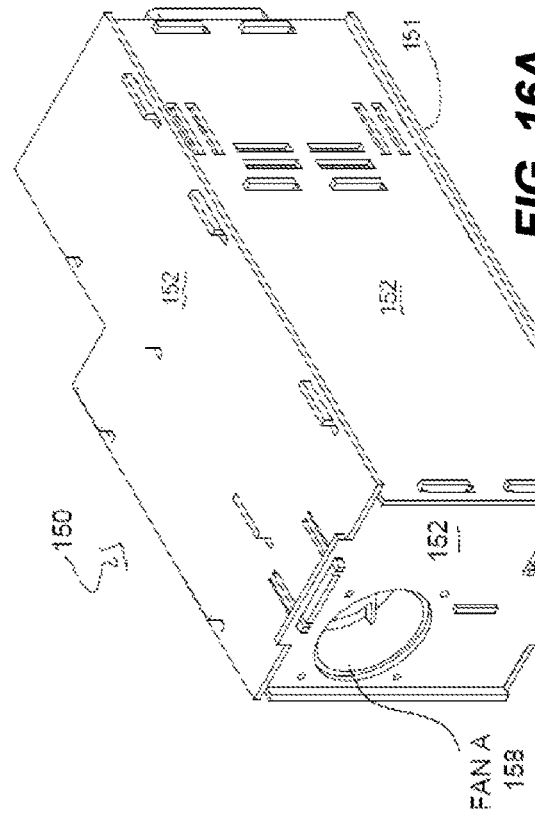
Figure 16D:
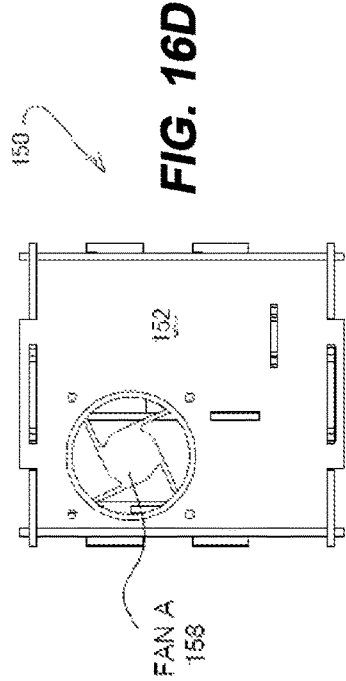

FIG. 15B is a control block diagram for the liquid chromatography system shown in FIG. 1.

List of Abbreviations

TCP/-P—Transmission Control Protocol/Internet Protocol
–C—Direct Current
L-D—Light Emitting Diode
–2—Deuterium
U-B—Universal Serial Bus
A-C—Analog to Digital converter The Liquid Chromatography System 20 is controlled in a hierarchical fashion. A windows-based Graphics User Interface (GUI) was developed to communicate with the master microcontroller board through Transmission Control Protocol/Internet Protocol (TCP/IP). The inter-integrated communication protocol ($I^2C$) was implemented for the Liquid Chromatography System 20 component control allowing a fully modular structure to be implemented, thereby enabling the user to configure the system hardware for a given separation requirement. The master board received and parsed information from the GUI software and transferred relevant information to the slave boards controlling the individual system components (pumps, valves, photodiode, column oven, pressure sensor, UV-LED). Pump slave processors will receive their individual gradient parameters from master and will determine the time delay between steps of the stepper motor at any given time of the gradient and actuate the stepper motor. Delay intervals are re-calculated once a second. Valves have their own processor with embedded software libraries dictating the communication. The master controller also communicated with the on board 16-bit Analog to Digital Converter (ADC) to get photodiode and pressure sensor data and passed it to GUI software for data plotting. The Multi-Light Emitting Diode (LED) slave controller was designed to control up to three ultraviolet LED's (235 nm, 255 nm, and 275 nm) from a single slave controller. The column oven was controlled through an onboard proportional controller installed on the master, the temperature and feedback control were set and processed through Serial Peripheral Interface (SPI) protocol. The diode array spectrometer was controlled by vendor provided control libraries which are developed into in GUI software. Power and data transfer is through Universal Serial Bus (USB). The GUI control software sends setup parameters and receives spectrometer data. The Deuterium lamp (D2) was controlled through a dedicated power supply board and was powered from master controller.

Optical Detector Module 150

FIGS. 16 to 26 disclose additional variations for the optical detector module 50. While the previous variations were referenced in the drawings as 50 and '50', given the number of variations, this nomenclature would become clumsy. Accordingly, these optical detector modules are now referenced as 150, 251, 350, 450, 550 and 650. Like numerals will be used to represent like parts.

Detector Module Housing 151

FIGS. 16 and 17 show the form of an optional detector module housing 151 for the optical detector modules 150, 250, 350, 450, 550 and 650, 52'. The same housing 151 may be used irrespective of the form of the detector module 150, 251, 350, 450, 550 and 650, 52'. Alternatively, the housing 151 may be omitted. As shown in FIGS. 16 and 17, the housing is made up of seven interconnected panels 152. There is one panel for each of the top, bottom and ends, with two panels on one side to increase accessibility and one panel on the other side is depicted. The top panel 152 is inessential but assists to define the boundary of the volume in which the internal components must fit.

Each panel 152 is planer and includes peripheral engagement slots 154 and engagement prongs 156. The engagement prongs lay 156 in the same plane as the panel 152 itself and are formed as cutouts at the edge of the panel 152. The engagement prongs 156 engage with the engagement slots 154 of an adjacently located panel 152. The form of the prongs 156 and slots enables the panels to slide relative to one another, to interconnect the panels and to disconnect the panels for user access inside the detector module housing 151.

Additional slots intermediate the edges of the panels 152 provide for airflow, particularly adjacent the heat producing components such as the lamp and power supplies.

The end panels 152 accommodate the fans 158, 160. From the point of view of FIG. 17, the near end panel 152 includes a circular aperture 162. The fan 158 is mounted internally of the housing 151 as will be subsequently explained. The fan 160 may be mounted to the far end panel 152, externally of the housing 151. The fan 160 is to extract heat from the lamp and the fan 158 is to extract heat from the lamp power supply.

Mounting Bracket 162

The remainder of the various components of the optical detector module 150 are mounted inside the housing 151. For this purpose, and the optical detector module includes a three-dimensional mounting bracket 162. The mounting bracket 162 forms part of the detector component mount for mounting the various components of the detector in the assembled configuration. The detector component mount also includes the alignment mount as will be described below.

The mounting bracket 162 may include intersecting wall portions 164, 166, 168, 170, 172, 174, 176, 180. Some of these wall portions can be seen in FIG. 17. Also refer to FIG. 28E which shows an alternative form of the mounting bracket 162' and labels the various walls. These intersecting wall portions intersect at right angles. The rectangular cross section formed by the intersecting walls in the base of the mounting bracket 162' provide structural rigidity. As will be understood from FIGS. 22-28, the mounting bracket 162' is the same for the different assembled forms of the optical detector module 150, 250, 350, 450, 550 and 650 and is also used for the optical detector module in the form of LED detector module 52' shown in FIG. 28.

The mounting bracket 162 may also include engagement prongs 184 which engage with corresponding slots 186 in the top, bottom side and end panels 152. The variant 162' does not incorporate these engagement prongs and slots 184/186.

Flow Cell Submodule 190

FIG. 18 discloses the mounting of the flow cell 7 within the flow cell submodule 190. The flow cell submodule 190 includes the flow cell 7 between two lenses 60, 62. The flow cell 7 is supported in this configuration by means of an alignment mount 192. The alignment mount 192 is comprised of two spaced alignment brackets or blocks 64, 66 which are held on spaced configuration by four alignment rods, two of which are short alignment rods 194 and two of which are long alignment rods 196.

The alignment blocks 64, 66 are of each of planer or plate-like configuration having a square shape with four corners. A through-aperture 198 is disposed adjacent to each of the four corners to allow for passage of either a long rod 196 or short rod 194. Each of the rods 194, 196 passes through a respective through-aperture 198 of each of the alignment blocks 60, 64. Accordingly, the through-apertures 198 of both alignment blocks, 64, 66 are aligned by the passage of the associated rod, 194/196.

The short rods 194 are such that they leave room for the photodiode array submodule as will be explained subsequently.

Each of the alignment blocks 64, 66 are fitted with a respective flow cell and lens interface. The lenses 60, 62 are threadedly connected with the corresponding flow cell and lens interfaces 67, 69. The alignment blocks 64, 66 are slidable relative to the rods 194, 196 and may be fixed into their desired position by grub screws (not shown). The flow cell 7 is held in compression between the alignment blocks 64, 66, with there being a close fit between the flow cell 7 and the corresponding alignment blocks 64, 66.

Light Source Submodules 200/210

FIGS. 19 and 20 illustrate two alternative light source submodules 200, 210. The light source submodule 200 is comprised of a L2D2 lamp 202 as supplied by the manufacturer Hamamatsu, a custom lens interface 204 and a custom lamp housing 206 which also functions as a heat sink. The components of the light source submodule 200 are assembled as a subassembly of the optical detector module. The light source submodule 200 may be removably mounted on the detector mount, enabling removal and substitution for an alternative light source submodule. For example, it may be necessary to substitute an alternative light source submodule with different characteristics to suit the selected flow cell 7 and/or the selected photodiode/photodiode array submodule.

The L2D2 lamp 202 has a dedicated power supply 208. The power supply 208 is not preassembled with the light source submodule 200 but is mounted independently to the mounting bracket 162' as will be discussed subsequently.

The light source submodule 210 is comprised of an S2D2 lamp 212, which is assembled together with a lamp housing in the form of a lamp housing cover 213 and a lamp housing base 215, as supplied by the manufacturer Hamamatsu. The light source submodule 210 further comprises a custom lens interface 214 and a custom mounting plate 219. The light source submodule 200 may be removably mounted on the detector mount, enabling removal and substitution for an alternative light source submodule. For example, it may be necessary to substitute an alternative light source submodule with different characteristics to suit the selected flow cell 7 and/or the selected photodiode/photodiode array submodule.

The S2D2 lamp 202 has a dedicated power supply 218. The power supply 218 is not preassembled with the light source submodule 200 but is mounted independently to the mounting bracket 162' as will be discussed subsequently.

Photodiode Array Submodules 220, 230, 240, 251, 260

The optical detector module 150, 250, 350, 450, 550 and 650 may each be configured with a different type of photodiode array submodule. The particular photodiode array submodule depends on the selected photodiode array unit. Five user-selectable photodiode array units 222, 232, 242, 252 and 262 are shown in FIG. 21. These are as follows:

FIG. 21A: Q Mini 222;
FIG. 21B: OI ST 232;
FIG. 21C FLAME 242;
FIG. 21D AVANTES OEM-MINI 252; and
FIG. 21E PACTO.

Each of the photodiode array units 222, 232, 242, 252 and 262 are of a different shape as shown. Accordingly, each of the photodiode array units require a support of a particular configuration to accommodate the photodiode array units within the optical detector module. The supports 224, 234, 244, 254, 256, 264, 266 are illustrated in FIG. 21. It will be noted that the AVANTES OEM-MINI and the PACTO are of similar configuration and accordingly, the supports 254, 256 and 264, 266 are of the same configuration. Typically, each of the supports 224, 234, 244, 254, 256, 264, 266 include a base on which the photodiode array units are seated 222, 232, 252 and 262, with upstanding side supports, such that the supports 222, 232, 252 and 262 generally conform to a U-shape in cross-section. The exception to this is the FLAME support 242 because of the size of the FLAME photodiode array unit 242. Each of the supports 224, 234, 244, 254 and 264 include a through aperture 227, 237, 247, 257 267. In some cases there are 2 through apertures 227, 257, 267. Each of these apertures allows passage of a respective alignment rod 194, 196 as will be discussed subsequently.

Additionally, it will be noted that the supports 254, 256 and 264, 266 for the AVANTES OEM-MINI and the PACTO are of a two-piece configuration. The upper supports 256, 266 include dual through apertures 258, 268 for passage of a respective alignment rod, 194, 196 as will be discussed subsequently.

Exemplary Optical Detector Module 251

FIG. 22 is representative of the way that the photodiode array submodule 260 is assembled in the optical detector module 251. FIGS. 23-26 show assembly of the other photodiode array submodules 220, 230, 240, 251 into the corresponding optical detector modules respectively 550, 450, 350, 150. The assembly of the optical detector modules 550, 450, 350, 150 is substantially the same as to be discussed in connection with FIG. 22.

Replaceable Flow Cell Submodule 190 or Replaceable Flow Cell 7

The flow cell submodule 190 shown in FIG. 18 may or may not constitute a separate divisible module from the optical detector module in which it is installed. Potentially, the flow cell 7 together with the alignment blocks 64, 66 and the rods 194, 196 could be provided in modular form as shown in FIG. 18. This ensures factory alignment of the various components in the flow cell submodule 190.

The light source submodule may be submodule 200 or 210 and the photodiode array submodule may be any of 220, 230, 240, 251 or 260. For the purpose of this discussion however reference will be made to FIG. 22 which employs the light source submodule 200 and the photodiode array submodule 251. As all be appreciated, the light source submodule 200 and the photodiode array submodule 251 are also aligned by way of the alignment rods 194, 196. Therefore, in order to replace the flow cell submodule 190, it would be necessary to remove the light source submodule 200, and the photodiode array submodule to 251 from the alignment rods 194, 196. The newly selected flow cell submodule 190 can then be assembled together with the selected light source submodule and the selected photodiode array submodule, which may or may not be the same as the original light source submodule and the photodiode array submodule.

However, in another form of the invention, the flow cell 7 could be replaced separately from the remainder of the components in the flow cell submodule 190. In such a case, the flow cell submodule 190 does not practically exist as a divisible submodule which can be removed from the optical detector module and replaced.

Assembly of the Optical Detector Module 251

Figure 22A:
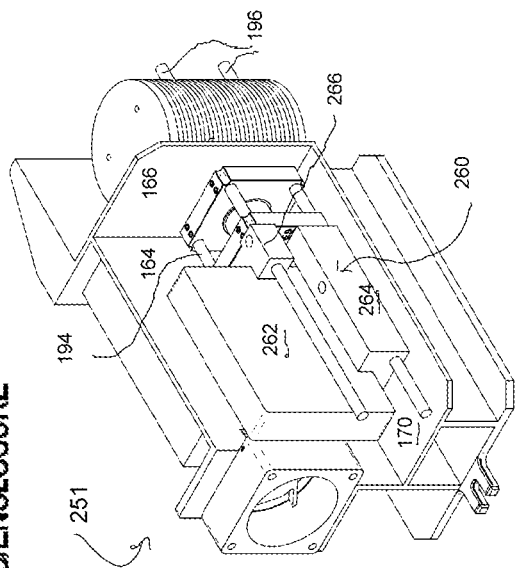
FIGS. 22A-22C are various perspective views of one kind of mini spectrometer, the PACTO shown in assembled configuration within an optical detector module.
Figure 22B:
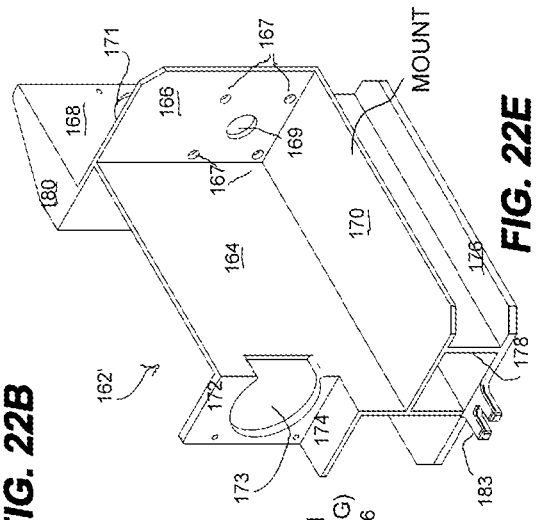
Figure 22C:
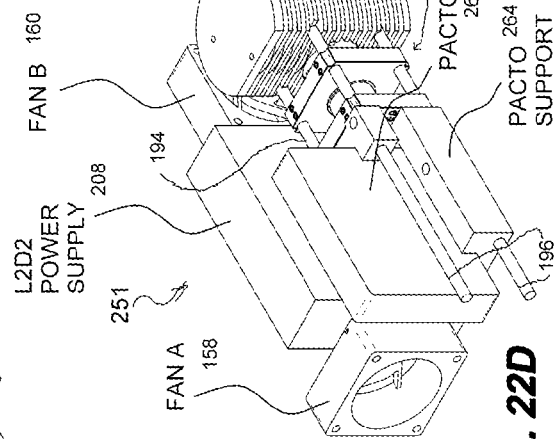
Figure 22D:
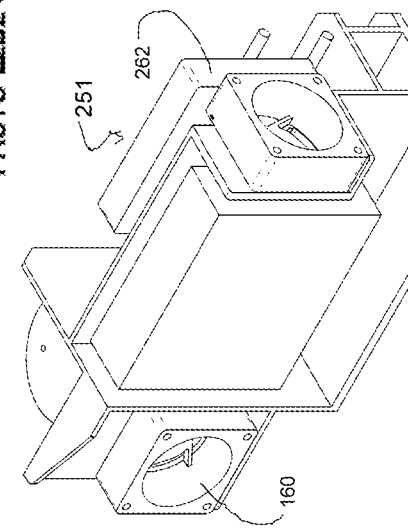
FIG. 22D is a perspective view of one kind of mini spectrometer, the PACTO shown in assembled configuration within an optical detector module, without the mounting bracket.
Figure 22E:
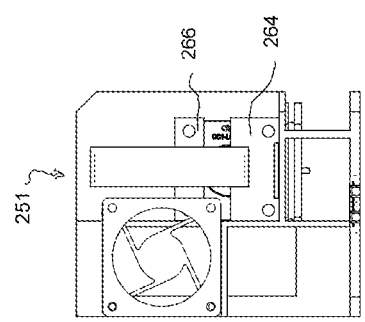
FIG. 22E is a perspective view of one kind of mini spectrometer, the PACTO shown in assembled configuration within an optical detector module, with the mounting bracket.
Figure 27A:
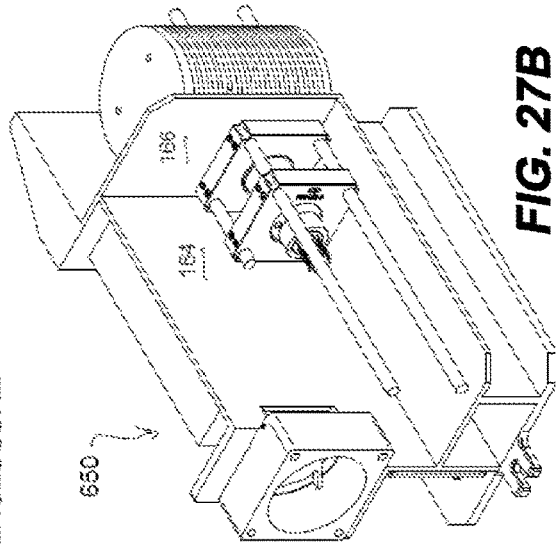
FIGS. 27A-27C are various perspective views of an optical detector module including a photodiode.
Figure 27B:
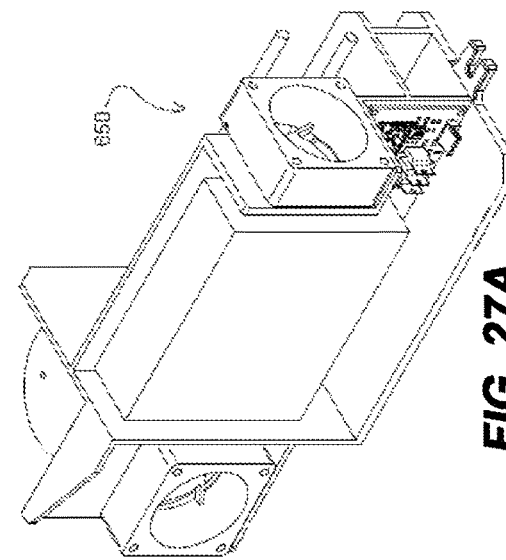
Figure 27C:
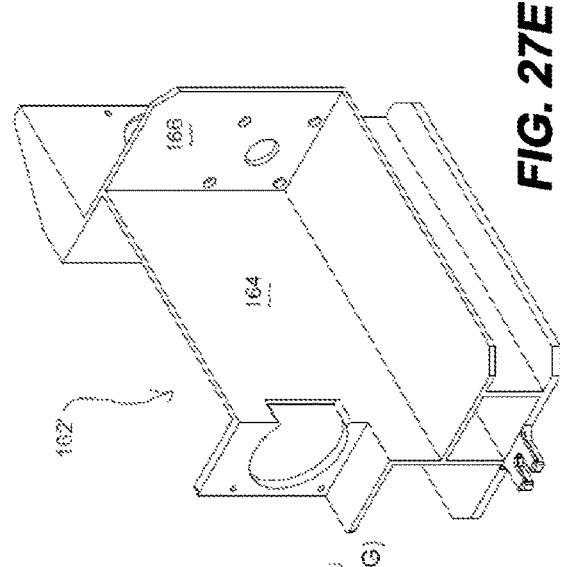
Figure 27D:
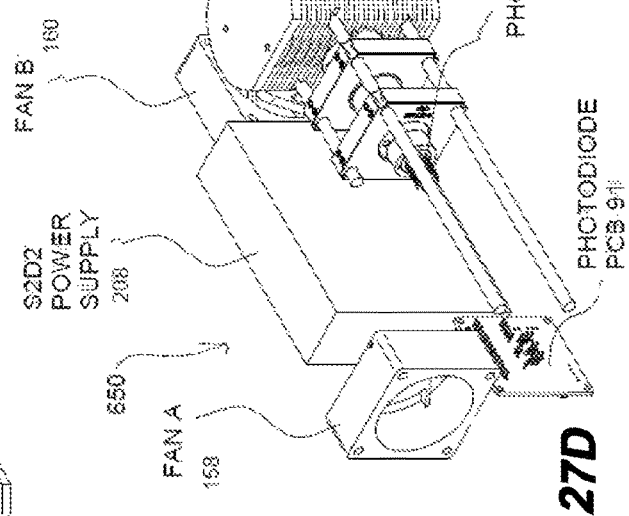
FIG. 27D is a perspective view of the components of an optical detector module utilising the photodiode, without the mounting bracket.
Figure 27E:
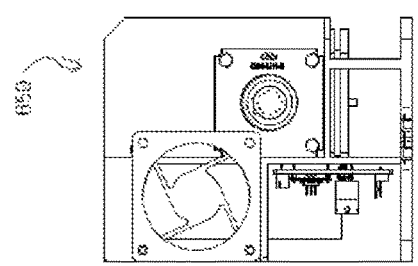
FIG. 27E is a perspective view of the optical detector module utilising the photodiode, with the mounting bracket.
Figure 27F:
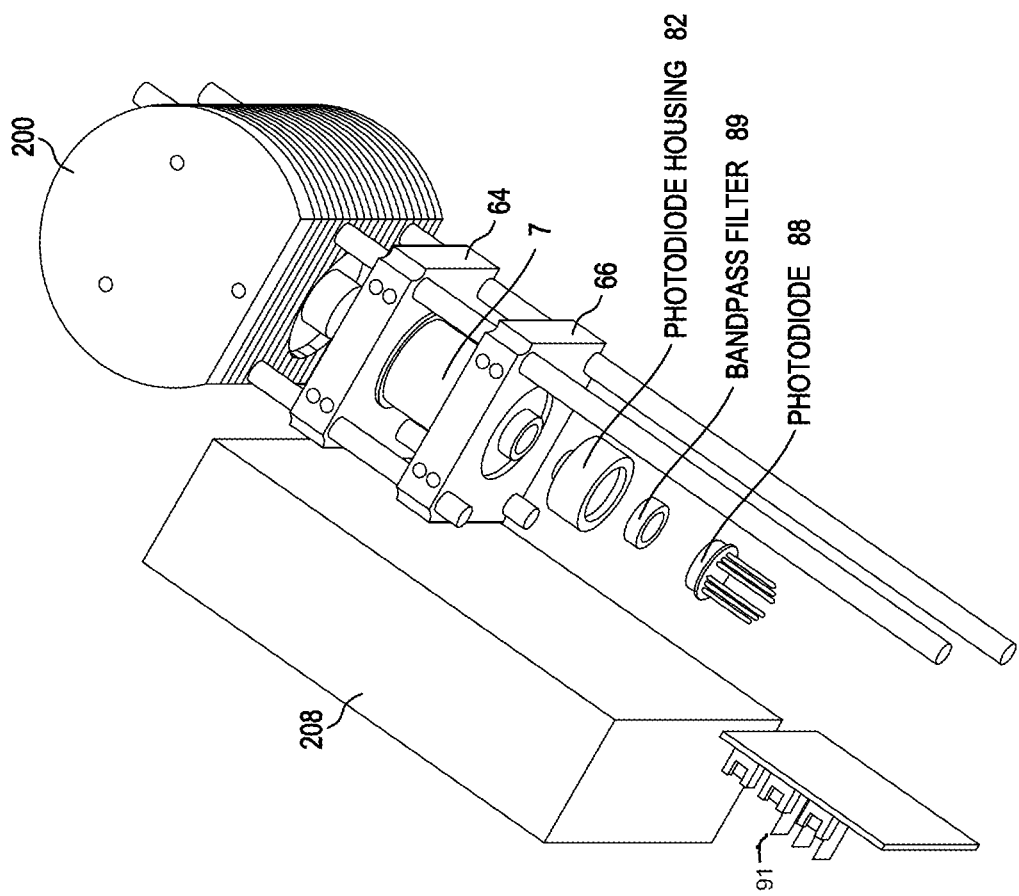
FIG. 27F is an exploded view of the optical detector module utilising the photodiode.
Figure 28A:
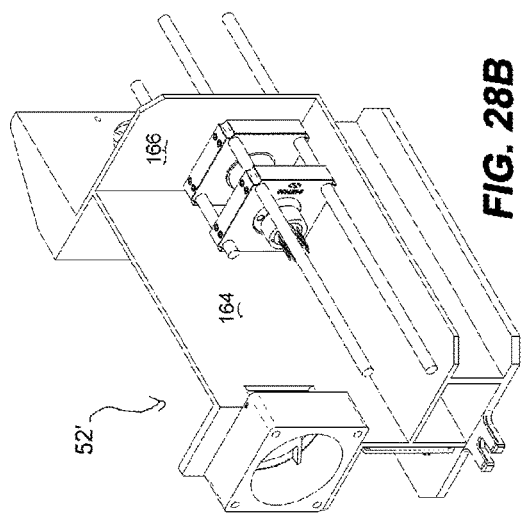
FIGS. 28A-28C are various perspective views of an optical detector module in assembled configuration utilising an LED light source and a photodiode.
Figure 28C:
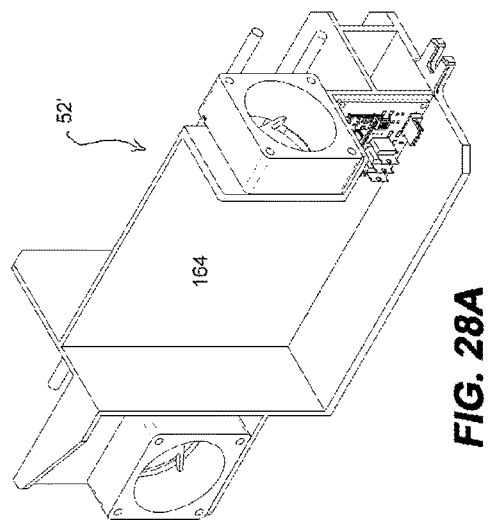
Figure 28B:
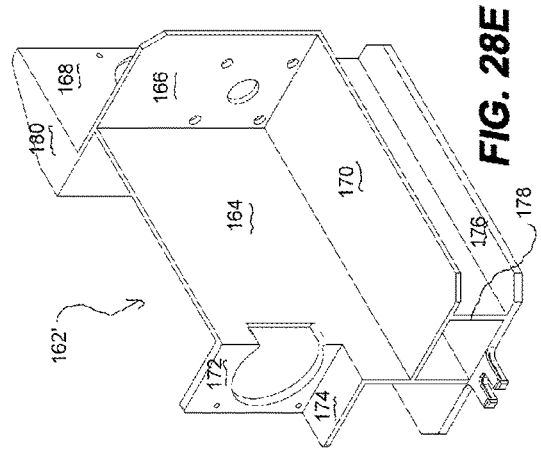
Figure 28D:
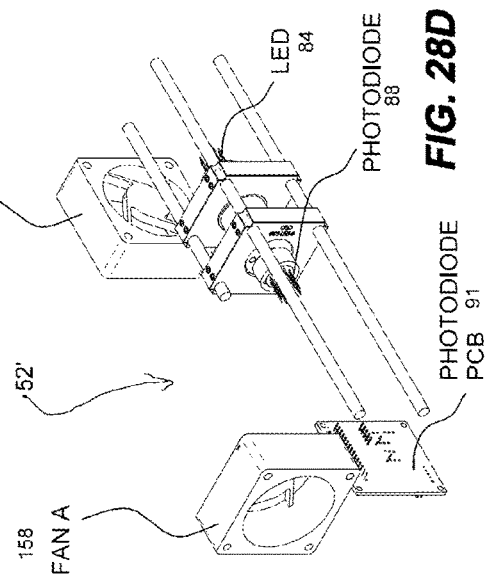
FIG. 28D is a perspective view of the optical detector module utilising the LED light source and photodiode, shown in assembled configuration, without the mounting bracket.
Figure 28E:
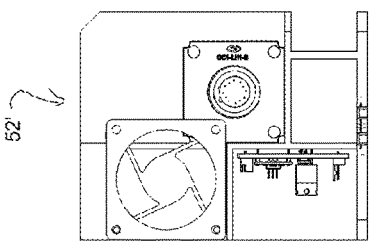
FIG. 28E is a perspective view of the optical detector module utilising the LED light source and photodiode, shown in assembled configuration, with the mounting bracket.
Figure 28F:
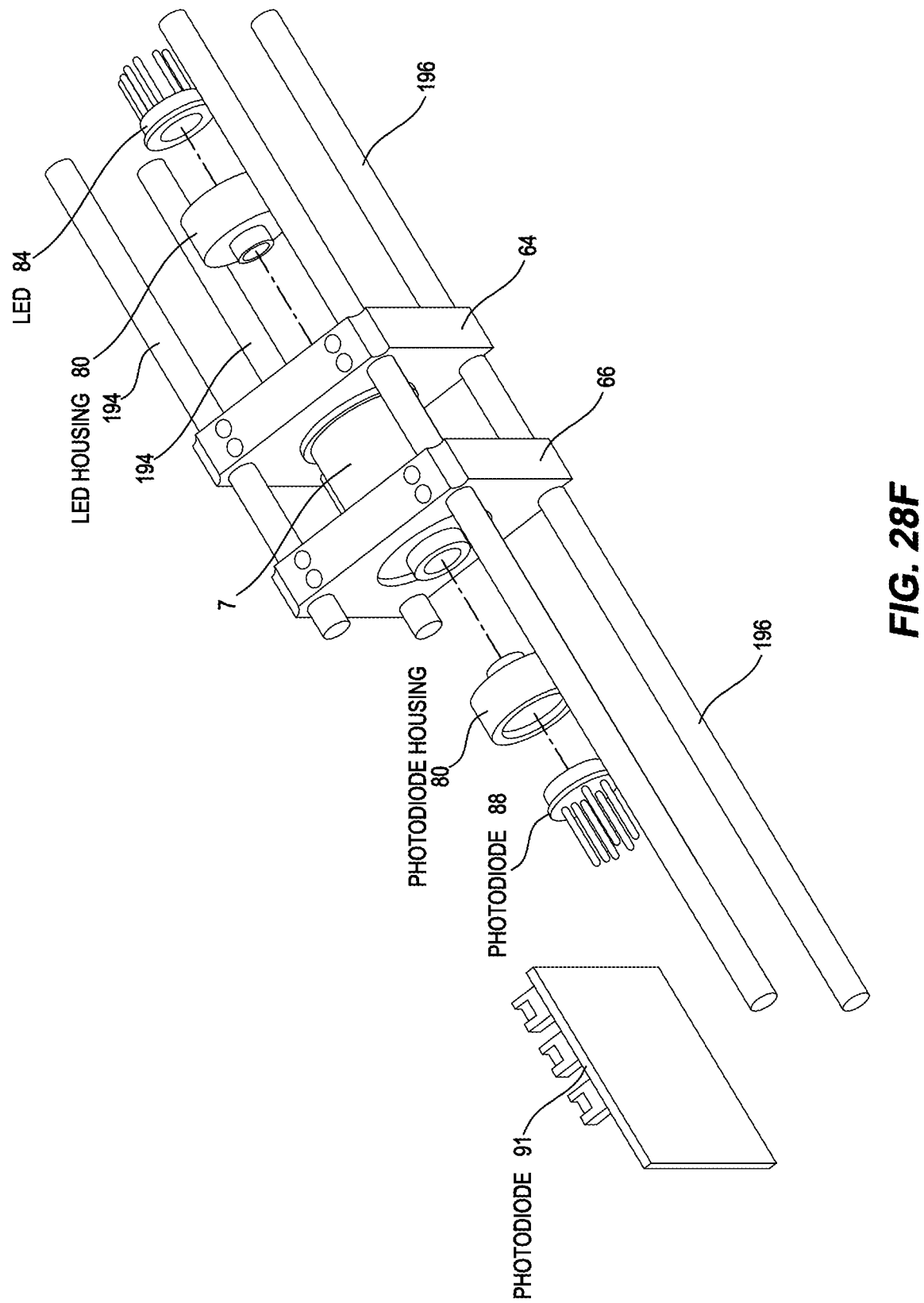
FIG. 28F is an exploded view of the optical detector module utilising the LED light source and photodiode.

Reverting to FIG. 22, FIG. 22D illustrates the arrangement of the various components and submodules of the optical detector module 251, whereas FIGS. 22A-C illustrate the assembly of the components and submodules on the mounting bracket 162'. The mounting bracket 162' includes a the relatively of wall portions 164, 166, 168, 170, 172, 174, 176, 178, 180 which are arranged substantially at right angles to each other as shown in FIG. 22E.

The wall portions 164, 166 and substantially horizontal wall portion 170 define a corner in which a substantial portion of the flow cell submodule 190 is located. The alignment blocks 64, 66 at their bottom bear against the wall portion 170, and along one side bear against the wall portion 164. These wall portions 164, 170 may locate the position of the flow cell submodule 190 relative to the mounting bracket 162'. The alignment blocks 64, 66 may be attached to the mounting bracket 162', with fasteners (not shown) either extending through the wall portion 170, or the wall portion 164, or both.

Additionally, the flow cell submodule 190 includes four alignment rods 194, 196, each of which extends through the wall portion 166, since the wall portion 166 is provided with four through-apertures 167. The through-apertures 167 align with the apertures 198 in the alignment block. Accordingly, the flow cell submodule 190 will be located relative to the mounting bracket 162'.

Additionally, with reference to FIG. 19, it can be seen that the lamp housing 206 includes four spaced apertures 207 extending therethrough. The spacing of the other pictures 207 corresponds to the arrangement of the alignment rods 194, 196, which pass through the apertures 207. Accordingly, the light source submodule 200 will be located relative to the flow cell submodule and the mounting bracket 162'. The light source submodule 200 is slid into position along the alignment rods 194, 196. This arrangement ensures that the light source submodule 200 is suitably aligned with the flow cell submodule 190. Larger aperture 169 is provided for passage of the light beam from the light source submodule 200 through to the flow cell submodule 190.

Additionally, the wall portion 166 defines a barrier between the heat producing light source submodule 200 and the flow cell submodule 190.

Additionally, the photodiode array submodule 260 is also mounted on the alignment rods 194, 196 as explained previously. As will be appreciated, for the lower support 264, one long rod 196 in one short rod 194 passes through respective apertures 267. For the upper support 266, one long rod 196 and one short rod 194 passes through respective apertures 268. The upper and lower supports 266, 264 may be slid into position along the alignment rods 194, 196. The lower support may be secured to the wall portion 170, or other attachments to the mounting bracket 162' may be made. The supports 264 and 266 may be initially positioned on the rods and then the photodiode array unit 262 positioned on the supports 264, 266. This arrangement ensures that the photodiode array unit 262 is suitably aligned with the flow cell 7. Accordingly, the arrangement aligns all of the optical components including the lamp 202, the lenses 60, 62, the flow cell 7 and the photodiode array unit 262.

If it is desired to change the flow cell 7 then either the flow cell 7 may be separately removed (in a first embodiment), or the flow cell submodule 190 can be wholly removed and replaced (in a second embodiment). In the first embodiment, in order to remove the flow cell 7, it would be necessary to remove the photodiode array unit 262, either separately or together with the supports 264, 266, by sliding the supports 264, 266 of the alignment rods 194, 196. Then, the alignment block 64, (the one most remote from the light source submodule 200) is removed, such that the flow cell 7 can be removed and replaced with a substitute flow cell 7.

In a second embodiment, once the photodiode array unit 262 and the supports 264, 266 have been removed, then the entire flow cell submodule 190 may be removed and replaced with a substitute flow cell submodule 190. This maintains the factory alignment of the optical components in the flow cell submodule 190.

Mounting of Fans 158, 160 and Power Supply 208

The mounting bracket 162' also provides for mounting of the power supply 208 for the light source submodule 200. The power supply 208 is mounted to the wall portion 164 on the opposite side of the flow cell submodule 190. Accordingly, the wall portion 164 shields the optical components from any heat from the power supply 208.

Wall portion 172 is arranged substantially at right angles to the wall portion 164. The wall portion 174 is arranged at right angles to wall portions 172, 164. The wall portion 174 defines a step on which the first fan 158 can be mounted. The first fan 158 is mounted against the wall portion 172. Accordingly, the wall portion 172 has an aperture 173 aligned with the central opening in the fan 158. The fan 158 draws heat away from the power supply 208, external to the detector module housing 151 (shown in FIG. 16).

The fan 160 may be mounted externally of the detector module housing 151 (as shown in FIG. 16). Alternatively, the fan 160 may be mounted on the wall portion 168. The wall portion 168 lies in a substantially parallel plane to wall portion 164 at substantial right angles to wall portion 166. The wall portion 168 includes a circular aperture 171 aligned with the opening in the fan 160. The fan 160 provides airflow to draw heat away from the light source submodule 200.

The base wall portion 176 is spaced vertically spaced below the substantially horizontal wall portion 170 and a substantially parallel thereto. The spacing is provided by a lower portion of the wall portion 164 and a substantially parallel upright wall portion 178. This provides a rigidity for the mounting bracket 162'. At a forward end of the base wall portion 176 is an engagement feature 183 in the form of spaced prongs which engage with a complementary engagement feature provided within the detector module housing 151, to locate the mounting bracket 162' within the base module housing 28.

The foregoing describes the assembly of the optical detector module 251 and once assembled, the detector module housing 151 is assembled around the optical detector module 251. The optical detector module 251 is then inserted into the base module housing 28 of the liquid chromatography system 20 and secured in position. As previously described in connection with FIG. 3A, the optical detector module 251 is inserted through the slot 54 and the necessary fluidic and optical connections are made. In one form of the invention, the optical detector module 251 could be a standalone operating module which collects data. The data could be downloaded as required via USB.

While the foregoing describes the assembly of the optical detector module 251 shown in FIG. 22, the optical detector modules 350, 450, 550, 150, 650 as shown in FIGS. 23-27 are similarly assembled. Each of these optical detector modules 350, 450, 550, 150, 650 are alternatives for the optical detector module 151 or 50 inserted through the slot 54 into the base module housing 28.

The only difference between the various configurations is the selected photodiode array unit and the corresponding complementary support.

Alternative Light Source Submodule 210

While all of the variants shown in FIGS. 22-24, 27 employ the light source submodule 200, it is also possible to construct these optical detector modules using the light source submodule 210. Reference is made to FIG. 20. As can be seen, the mounting plate 219 to which the lamp 212 and lamp housing components 213, 215 are mounted, has to spaced through-apertures 211. These apertures 211 received the lower two alignment rods (one of which will be short rod 194 and the other of which will be long rod 196). Accordingly, the light source submodule 210 can be assembled, in place of the light source submodule 200. The light source submodule 210 is installed by sliding the light source submodule 210 along the alignment rods 194, 196. See for instance FIGS. 25 and 26 which illustrate the light source submodule 210.

The light source submodule 210 may be employed with any of the photodiode array units and the light source submodule 200 may be employed with any of the photodiode array units.

Photodiode Detector

FIG. 27 illustrates the optical detector module 650 employing the light source submodule 200 but without a photodiode array submodule. Instead, the optical detector module 650 employs a single photodiode. Reference is made to FIG. 27F which shows in exploded configuration the photodiode 88, bandpass filter 89 and photodiode housing 80, which are mounted in place of the photodiode array submodule of previous embodiments.

The photodiode PCB 91 is also visible in FIG. 27.

Photodiode Detector and LED Light Source

FIG. 28 illustrates the optical detector module 52' employing an LED 84 for the light source and a single photodiode 88. As best shown in FIG. 28F, photodiode housing 80 holds the photodiode 88, whereas the LED housing 80 holds the LED 84. The photodiode housing 80 is secured to the alignment block 66, for example by threaded engagement with an interface provided on the alignment block 66. The LED housing 80 is similarly secured to the alignment block 64, for example by threaded engagement with an interface provided on the alignment block 64.

The photodiode 88 is connected via a cable to the master PCB. The LED is also connected via a cable to the master PCB.

Second Embodiment of Liquid Chromatography System 20'

FIGS. 30-41 illustrates a second embodiment of a liquid chromatography system 20' with an even greater level of modularity compared to the first embodiment shown in FIGS. 1-3. FIGS. 30-41 has many similar components as per the first embodiment and therefore like reference numerals are used to represent like parts. Similar reference numerals may use the prime symbol (C) to indicate a changed or updated part for the second embodiment 20'.

As shown in FIG. 31, the components of the liquid chromatography system 20' are supported by a base module bracket 300. The base module bracket 300 includes a base module base plate 310, a first upstanding wall 312, second upstanding wall 320, sample delivery module ledge 316, column oven ledge 318 and zigzag wall 314.

The sample delivery module ledge 316 is supported by the first upstanding wall 312. As will be understood in connection with FIG. 36, the sample delivery module ledge 316 supports at least a portion of the sample delivery module 326. It may be possible to incorporate third-party sample delivery modules (not shown) into the liquid chromatography system 20' and accommodate them within the base module bracket 300.

Underneath the sample delivery module ledge 316 is a first gap 324 defined above the base plate 310 and sided by the first upstanding wall 312. The first gap 324 defines a space in which a portion of the solvent delivery module 324 is inserted. Various different configurations for the sample delivery module 324, 324' can be inserted in the first gap 324. Additionally, it may be possible to incorporate third-party solvent delivery modules (not shown) into the liquid chromatography system 20' and accommodate them within the base module bracket 300.

On the other side of the first upstanding wall 312, is a second gap 322. As will be appreciated from FIG. 36, any one of the foregoing described optical detector modules 50/150/251/350/450/550 may be inserted into the second gap 322.

The column oven ledge 318 supports the column oven 12C. The first upstanding wall 312 and the second upstanding wall 320 provides a niche around two sides of the column oven ledge 318 and creates a heat barrier around the column oven 12C.

The injection valve 5, the injection valve controller 5A, and the purge valve 4 are also supported on the base module base plate 310, adjacent to the second upstanding wall 320. Zigzag wall 314 creates a niche to accommodate the injection valve 5.

Figure 36:
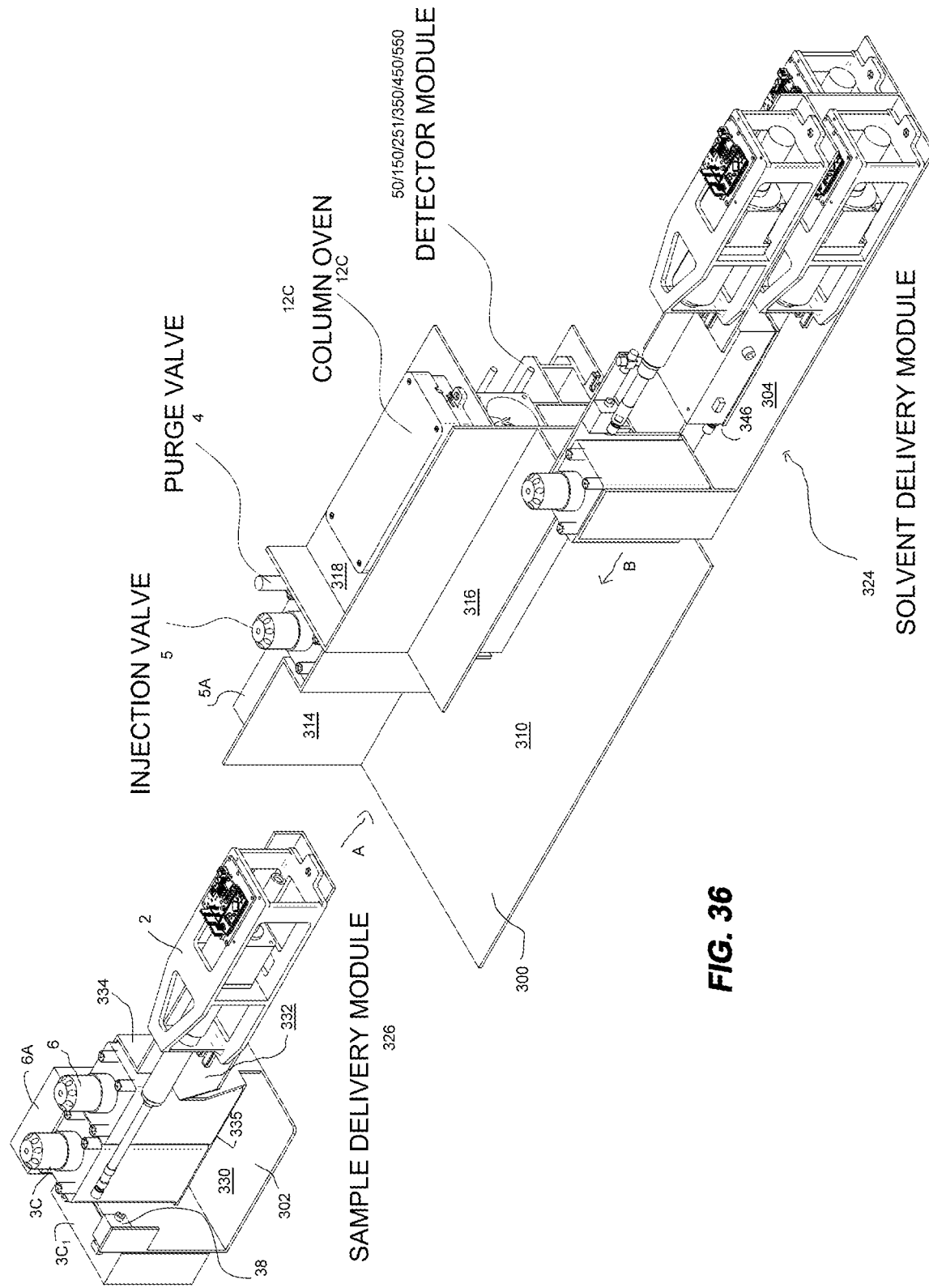
FIG. 36 is a perspective and exploded view illustrating the assembly of the sample delivery module shown in FIG. 33 and the solvent delivery module shown in FIG. 34.

FIG. 33 illustrates the sample delivery module 326. The sample delivery module includes the sample pump (assembly) module 2, and the other sample delivery components including the diversion valve 6, the diversion valve controller 6A, refill valve 3C, refill valve controller $3C_1$, pressure sensor 38. The sample delivery components are mounted on the sample delivery module mount 302. The form of the sample delivery module mount 302 is best seen in FIG. 36. As seen, it includes sample delivery module base plate 330 and forwardly projecting sample delivery module pump rest 332. The sample delivery module 326 is inserted into the base module mounting bracket 300 in the direction indicated by arrow A, such that the pump rest 332 is supported by the sample delivery module ledge 316. Additionally, the sample delivery module mount 302 includes a peripheral C-shaped wall 334 which extends around the diversion valve 6 and the refill valve 3C. The diversion valve controller 6A is supported on the other side of the peripheral C-shaped wall 334. The diversion valve 6 and the refill valve 3C are mounted on a valve ledge 335.

Additionally, the pressure sensor 38 and the refill valve controller $3C_1$ are supported from the peripheral C-shaped wall 334.

Referring to FIG. 34, a 3-pump solvent delivery module 324 is depicted. As can be seen, the module 324 includes 3 solvent pump assemblies (modules) 30B of the same type shown in the first embodiment 20. In this case, the solvent pump assemblies are of the high-pressure type 30B. FIG. 35 illustrates a 2-pump solvent delivery module 324'. In this figure, only two solvent pump assemblies 30B are shown. Therefore, the solvent delivery module mount 304 can be more readily seen in this version. The solvent delivery module mount 304 includes a base plate 340, a partition wall 344, a solvent pump assembly rest 342 and a wall portion 347 on one side of the refill valve 303 and supporting the pressure sensor 34 and the mixing junction 32. Opposed to the wall portion 347 is an opposing wall portion 349. Extending between wall portion 347 and 349 is a refill valve ledge 348, upon which the refill valve 303 is supported.

Additionally, the solvent delivery module mount 304 includes a refill valve controller ledge 346 for supporting the refill valve controller 303. While FIG. 35 does not show the third solvent pump module 30B, this is shown in the solvent delivery module 324 of FIG. 34, where it can be seen that the third solvent pump module 30B rests upon the solvent pump assembly rest 342.

The 3-pump solvent delivery module 324 and the 2-pump solvent delivery module 324' may be alternative modules that can be inserted into the base module mounting bracket 300. For instance, if it is desired to perform ternary gradient elution, then the 3-pump solvent delivery module 324 may be selected. Alternatively, if binary gradient elution is required then the 2-pump solvent delivery module 324' may be selected. Additionally, isocratic elution may be performed using a 1-pump solvent delivery module (not shown). This is essentially the same as the 2-pump solvent delivery module, except with a single pump assembly 306/30A. In making these substitutions, the only part that needs to be disconnected and reconnected is the mixer/T-junction 32.

Figure 29:
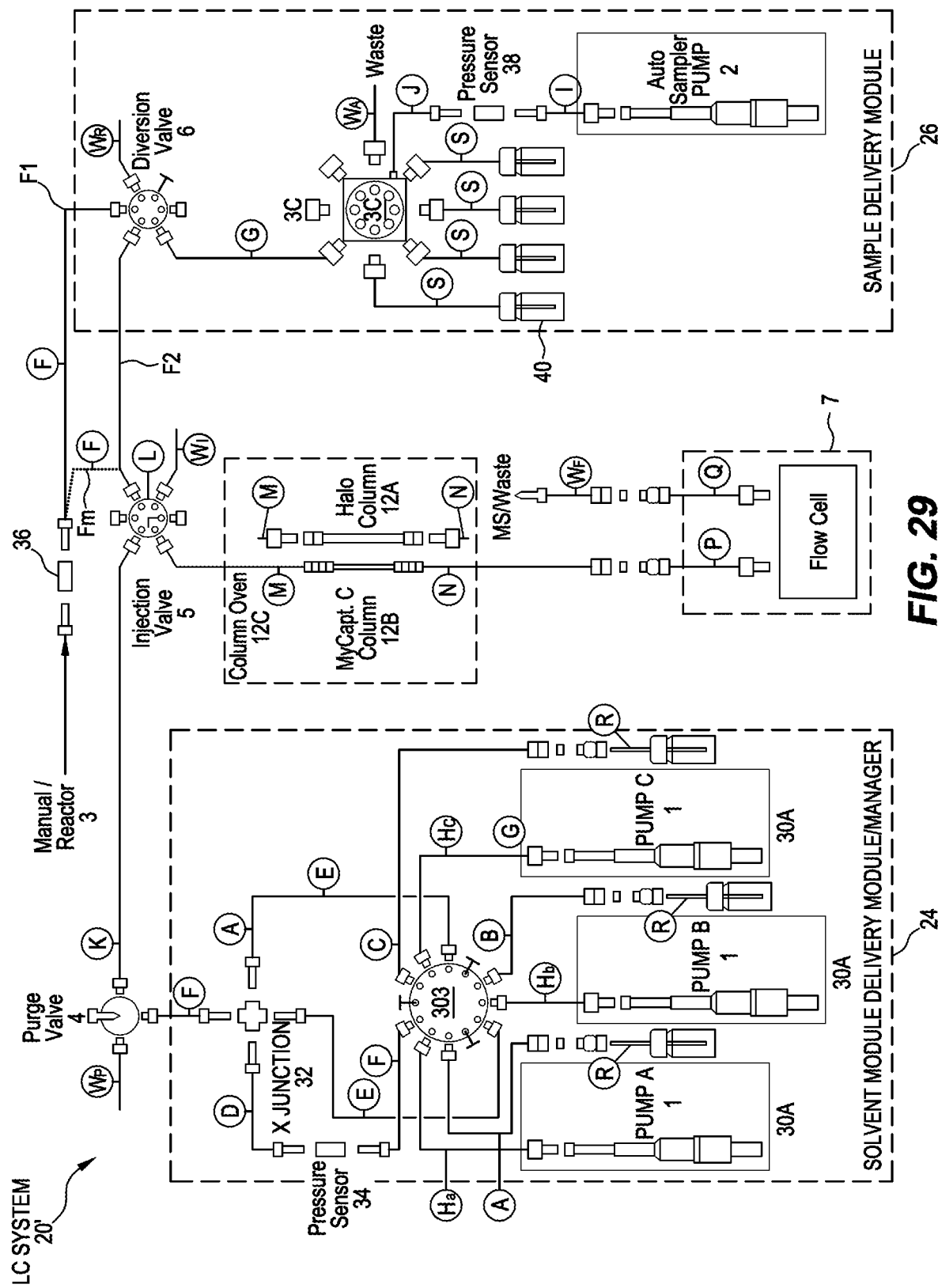
FIG. 29 is a diagram illustrating a liquid chromatography system in accordance with a second preferred embodiment of the present invention.

Each of the 1-pump solvent delivery module, the 2-pump solvent delivery module 324' or the 3-pump solvent delivery module 324 includes a refill valve 303. For the 1-pump solvent delivery module, the refill valve 303 may be a 3-port valve (for instance as shown in FIG. 1). For the 2-pump solvent delivery module 324', the refill valve may be an 8-port valve. For the 3-pump solvent delivery module 324, the refill valve 303 may be a 12-port valve, as depicted in FIG. 29.

Additionally, it is also possible to have a single version of the solvent delivery module 324". For instance, a 1-pump solvent delivery module may initially be provided, with a single solvent pump assembly 30B (or 30A). The user may optionally select one or two additional solvent pump assemblies 30B (or 30A) to upgrade from a 1-pump solvent delivery module to a 2-pump solvent delivery module 324' or a 3-pump solvent delivery module 324 as required. For the variable solvent delivery module 324", a 12-port valve may be provided (as per FIG. 29). This provides the flexibility for the variable solvent delivery module 324" to selectively accommodate either 1, 2 or 3 solvent pump assemblies 30B (or 30A, as the case may be—bearing in mind that all pumps must be either low-pressure 30A or high-pressure 30B).

As shown in FIG. 36, the solvent delivery module 324 is inserted into the base module bracket 300 in the direction of arrow B and is supported on the base module bracket base plate 310.

The assembled configuration of the liquid chromatography system 20' is shown in FIG. 30, with the removably mounted solvent and sample delivery modules 324, 326 and the removably mounted detector module (as selected from 50/150/251/350/450/550), the removably mounted components such as column oven 12C and the additional fixed components such as injection valve 5, purge valve 4 and injection valve controller 5A. Thus, it will be appreciated in this second embodiment of the liquid chromatography system 20', the sample delivery module 26 is a removable and separate module. Likewise, the solvent delivery module 324 is a removable and separate module.

Figure 37:
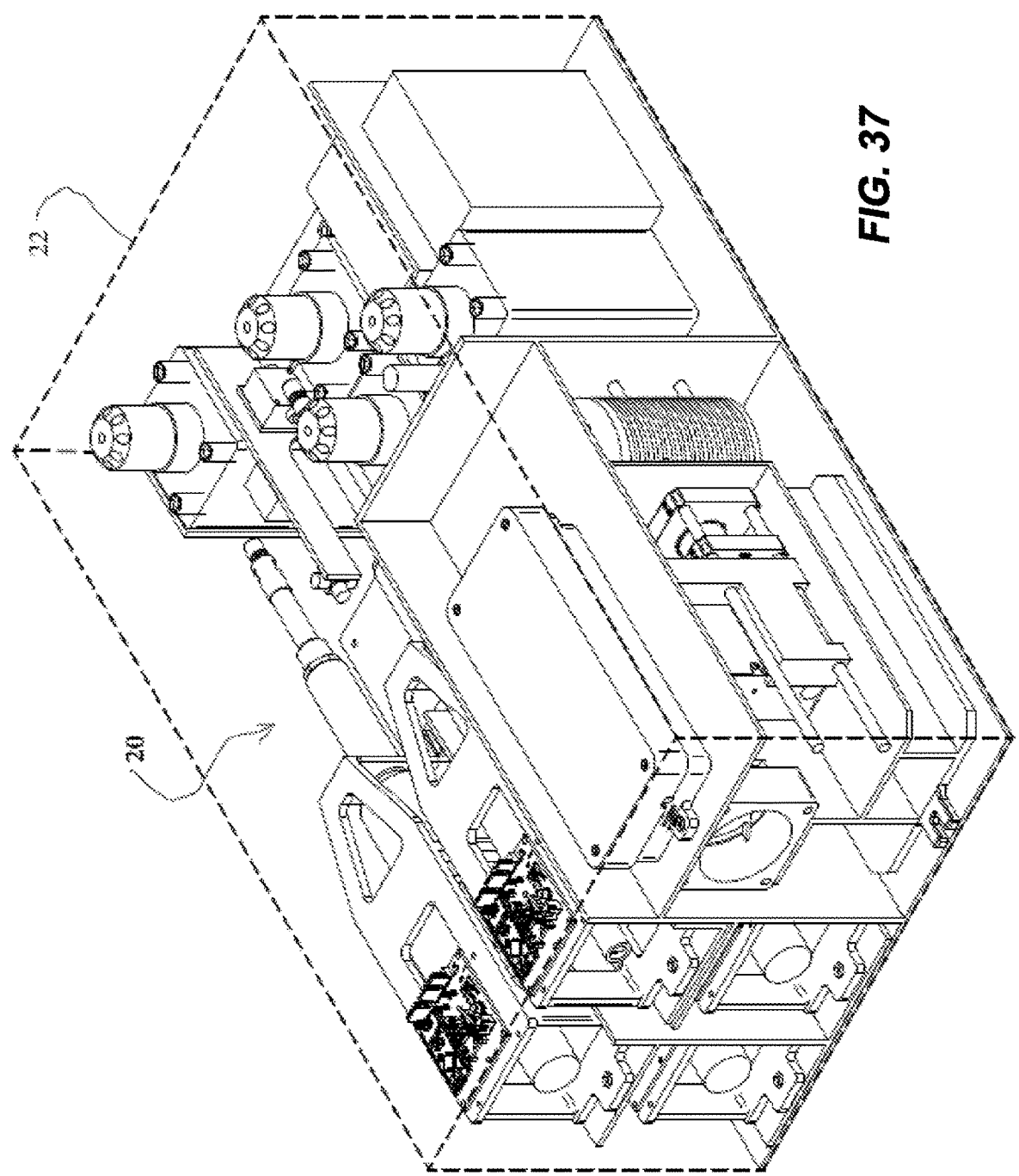
FIG. 37 is a perspective view illustrating the liquid chromatography system shown in FIG. 30 within a predetermined system envelope.

FIG. 37 shows the liquid chromatography system 20' within the predetermined system envelope 22. The predetermined system envelope may be a theoretical constraint. Alternatively, the predetermined system envelope 22 may be a Pelican housing/case or a custom enclosure such as base module housing 28. Accordingly, the base module housing 28 of the first embodiment 20 is optional. The predetermined system envelope 22 is the same as that described above for the first embodiment with the parameters as described elsewhere.

FIG. 38 illustrates the module mounts 302, 304, 162' nested within the base module bracket 300, with the remaining components removed for clarity.

FIG. 29 is a diagram illustrating fluidic connections for the second embodiment Like reference numerals illustrate like parts. It can be seen that the refill valve 3C is an 8 port valve which may be connected to vials with internal standards or the cleaning solution vial 40.

The foregoing describes only one embodiment of the present invention and modifications may be made thereto without departing from the scope of the invention.

The invention claimed is:

1. A reconfigurable capillary liquid chromatography system including:
    a solvent delivery manager including a first solvent pump assembly including a first pump housing or mount; and
    a base module including a base module housing which is user accessible, or a base module bracket, and an injection valve for sample injection to a liquid chromatography column, wherein the injection valve has an inlet port for receiving a sample, and the injection valve is mounted in or on the base module housing or the base module bracket, the solvent delivery manager being configured to deliver solvent to the injection valve;

a reconfigurable control system for controlling the reconfigurable capillary liquid chromatography system;

wherein the system is selectively user configurable to removably add any one or more additional components to the system such that the base module including the base module housing or bracket, the first pump housing or mount, and the user selected additional components fit within a predetermined system envelope, the additional components including any one or more of the following:
- a second solvent pump assembly having a second pump housing or mount, such that the selected second pump assembly is removably mountable on or within the base module housing or bracket for incorporation within the solvent delivery manager;
- a third pump assembly for a sample delivery module, the third pump assembly having a third pump housing or mount, such that the selected third pump assembly is removably mountable on or within the base module housing or bracket;
- a sample delivery module which is adapted for fluidic connection to the injection valve, wherein the selected sample delivery module is removably mountable on or within the base module housing or bracket; and
- an optical detector module having a detector housing or mount, such that the selected optical detector housing or mount is removably mountable on or within the base module housing or bracket;

wherein the control system is reconfigurable according to the user selected additional components.

2. The reconfigurable capillary liquid chromatography system as claimed in claim 1 wherein the predetermined system envelope is defined by an external housing or casing.

3. The reconfigurable capillary liquid chromatography system as claimed in claim 1 wherein the volume of the predetermined system envelope is less than approximately 65,000 $cm^3$.

4. The reconfigurable capillary liquid chromatography system as claimed in claim 1, wherein the predetermined system envelope has a volume of approximately 30,000 $cm^3$.

5. The reconfigurable capillary liquid chromatography system as claimed in in claim 1 wherein the volume of the predetermined system envelope is within the range of about 25,000 $cm^3$ to about 66,000 $cm^3$.

6. The reconfigurable capillary liquid chromatography system as claimed in claim 1 wherein the first solvent pump assembly includes a first pump housing or mount which is insertable through a slot or opening in the base module housing or bracket such that the mounted first pump housing or mount fits within the predetermined envelope.

7. The reconfigurable capillary liquid chromatography system as claimed in claim 1 wherein the second pump housing or mount is insertable through a slot or opening in the base module housing or bracket.

8. The reconfigurable capillary liquid chromatography system as claimed in claim 1 wherein the detector housing or mount is insertable through a slot or opening in the base module housing or bracket.

9. The reconfigurable capillary liquid chromatography system as claimed in claim 1 wherein the control system is user reconfigurable.

* * * * *